US006911520B2

(12) United States Patent
Fukui et al.

(10) Patent No.: US 6,911,520 B2
(45) Date of Patent: Jun. 28, 2005

(54) POLYHYDROXYALKANOATE, METHOD OF PRODUCING THE SAME, CHARGE CONTROLLING AGENT CONTAINING POLYHYDROXYALKANOATE, TONER BINDER AND TONER, AND IMAGE FORMATION METHOD AND IMAGE FORMING APPARATUS USING TONER

(75) Inventors: Tatsuki Fukui, Kanagawa (JP); Etsuko Sugawa, Kanagawa (JP); Tetsuya Yano, Kanagawa (JP); Chieko Mihara, Kanagawa (JP); Takeshi Imamura, Kanagawa (JP); Takashi Kenmoku, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 158 days.

(21) Appl. No.: 10/373,851

(22) Filed: Feb. 27, 2003

(65) Prior Publication Data

US 2004/0005290 A1 Jan. 8, 2004

(30) Foreign Application Priority Data

Feb. 28, 2002 (JP) ........................................ 2002-054906
Feb. 28, 2002 (JP) ........................................ 2002-054908
Feb. 10, 2003 (JP) ........................................ 2003-032701

(51) Int. Cl.$^7$ .............................................. C08G 63/02
(52) U.S. Cl. ................ 528/272; 424/78.37; 430/108.22; 430/110.2; 528/271; 528/274
(58) Field of Search .................... 424/78.37; 430/108.22; 430/110.2; 528/271, 272, 274

(56) References Cited

U.S. PATENT DOCUMENTS

| | | | |
|---|---|---|---|
| 4,393,167 A | 7/1983 | Holmes et al. ................ 525/64 |
| 4,876,331 A | 10/1989 | Doi ............................ 528/361 |
| 5,004,664 A | 4/1991 | Fuller et al. ............. 430/106.6 |
| 5,135,859 A | 8/1992 | Witholt et al. .............. 435/135 |
| 5,147,750 A | 9/1992 | Nakanishi ................... 430/110 |
| 5,200,332 A | 4/1993 | Yamane et al. ............. 435/135 |
| 5,292,860 A | 3/1994 | Shiotani et al. ............. 528/361 |
| 5,502,118 A | 3/1996 | Macholdt et al. ........... 525/437 |
| 5,667,927 A | 9/1997 | Kubota et al. .............. 430/109 |
| 5,849,450 A | 12/1998 | Wilson et al. .............. 430/110 |
| 6,521,429 B2 | 2/2003 | Honma et al. .............. 435/135 |
| 2003/0013841 A1 | 1/2003 | Imamura et al. ........... 528/271 |
| 2003/0118931 A1 * | 6/2003 | Yano et al. ............ 430/108.22 |
| 2003/0180899 A1 | 9/2003 | Honma et al. .............. 435/135 |

FOREIGN PATENT DOCUMENTS

| | | | |
|---|---|---|---|
| EP | 0432946 | 6/1991 | .......... G03G/9/087 |
| EP | 1118629 | 7/2001 | .......... G08G/63/06 |
| JP | 5-7492 | 1/1993 | |
| JP | 5-93049 | 4/1993 | |
| JP | 5-155919 | 6/1993 | |
| JP | 6-15604 | 3/1994 | |
| JP | 6-289644 | 10/1994 | |
| JP | 7-14352 | 2/1995 | |
| JP | 7-120975 | 5/1995 | |
| JP | 7-265065 | 10/1995 | |
| JP | 8-19227 | 2/1996 | |
| JP | 8-262796 | 10/1996 | |
| JP | 9-191893 | 7/1997 | |
| JP | 2642937 B2 | 8/1997 | |
| JP | 9-274335 | 10/1997 | |
| JP | 9-281746 | 10/1997 | |
| JP | 2989175 B1 | 12/1999 | |
| JP | 02-80751 | 3/2002 | |

OTHER PUBLICATIONS

Fritzsche, et al; An Unusual Bacterial Polyester . . . pendant group; Makromol. Ch m. vol. 191, 1957–1965 (1990).

Kim, et al.; Preparation and Characterization of . . . n–alkanoic acids; Macromolecules, vol. 24, No. 19, 5256–5260 (1991).

Ramsay, et al.; Effect of Nitrogen Limitation . . . Pseudomonas resinovorans; Appl. & Environ. Microb. vol. 58, No. 2, 744–749 (1992).

Kim, et al.: Bioengineering of poly(B–hydroxyalkanoates) for . . . chain substituents; Can. J. Mi robiol., vol. 41; Suppl. 1, pp. 32–43 (1995).

deKoning, et al.; "A biodegradable rubber . . . oleovorans"; Polymer, vol. 35, No. 10, 2090–2097.

Gross, et al.; "Cyanophenoxy–Containing Microbial Polyesters: . . . Biodegradability;" Polym r Int'l vol. 39, 205–213 (1996).

Curley, et al.; "Production of Poly(3–hydroxyalkanoates) . . . oleovorans;" Macromol cul s, vol. 29, 1762–1766.

Park, et al.; "Epoxidation of Bacterial Polyesters . . . 10–undecenoic acid;" Macromolecules, vol. 31, 1480–1486 (1998).

Lee, et al.; "Crosslinking of microbial copolyesters . . . by diamine"; Polymer, vol. 40, 3787–3793.

Arostegui, et al.; "Bacterial Polyesters Produced . . . Nitrophenyl Groups;" Macromolecules, vol. 32, 2889–2895 (1999).

Lee, et al.; "Hydrophilic bacterial polyesters . . . hydroxyl groups"; Polymer, vol. 41, 1703–1709 (2000).

Database WPI, Sec.Ch, WL 200144, Derwent Publ. XP–002239665 for JP 2001–188386.

Database WPI, Sec. Ch. Wk 199311, Derwent Publ. XP002239667 for JP 05 034982.

Database WPI, Sec. Ch. Wk. 200168, Derwent Publ. XP002239666 for JP 2001–206923.

Hazar et al., "Bacterial Production of . . . groups", POLYMER, vol. 37, No. 26, 1996 (pp. 5851–5957).

Constantin et al., "Chemical modification . . . sugars", Macromol.: Rapid Communications, vol. 26, No. 2, 1999.

* cited by examiner

Primary Examiner—Terressa Boykin
(74) Attorney, Agent, or Firm—Fitzpatrick, Cella, Harper & Scinto

(57) ABSTRACT

Provided is a polyhydroxyalkanoate containing in a molecule thereof one or more units each selected from the following formulae (1) (2), (3) and (4):

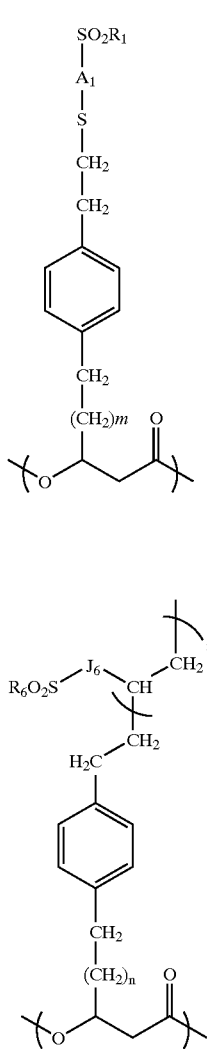 (1)
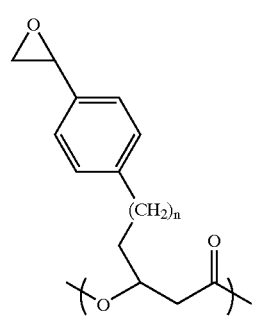 (3)
(2)
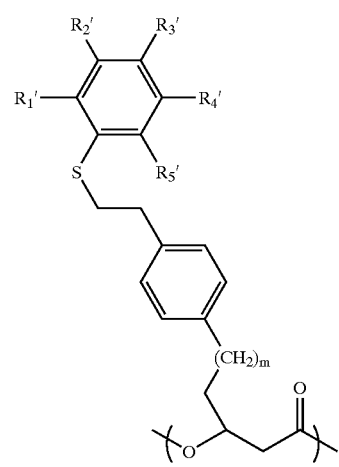 (4)
wherein $R_1$ and $R_6$ are each OH, halogen, ONa, OK, $OCH_3$ or $OC_2H_5$; $A_1$ and $J_6$ are each a substituted or unsubstituted aliphatic hydrocarbon; m and n are each 0 to 7; r is 1 to 500; and $R_1'$ to $R_5'$ are each hydrogen or halogen.
61 Claims, 12 Drawing Sheets

POLYHYDROXYALKANOATE, METHOD OF PRODUCING THE SAME, CHARGE CONTROLLING AGENT CONTAINING POLYHYDROXYALKANOATE, TONER BINDER AND TONER, AND IMAGE FORMATION METHOD AND IMAGE FORMING APPARATUS USING TONER

BACKGROUND OF THE INVENTION

1. Field of the Invention

The present invention relates to an innovative polyhydroxyalkanoate, particularly to a polyhydroxyalkanoate containing units each having on the side chain a substituted phenyl structure and a method of producing the same.

In addition, the present invention relates to a charge controlling agent for use in electrophotography, electrostatic recording, magnetic recording and the like, a toner binder, an electrostatic latent image developing toner, an image formation method using the toner, and an image forming apparatus for use therein.

2. Related Background Art

Polyhydroxyalkanoate (PHA)

Resins that can be decomposed with time by the action of microorganisms and the like, namely biodegradable resins are under development in terms of environmental protection, and for example, many types of microorganism have been reported to produce biodegradable resins having polyester structures (polyhydroxyalkanoate: hereinafter abbreviated as PHA) and accumulate the resin in the cell (Biodegradable Plastic Handbook, Biodegradable Plastic Research Associate, N.T.S. Co., Ltd., p. 178–197 (1995)).

These polymers such as PHA produced by microorganisms may be used for production of various kinds of products through melt processing as in the case of conventional plastics, and have biodegradability, namely an advantage that they are fully decomposed by microorganism in the natural environment. Therefore, for example, PHA produced by microorganisms never remains in the natural environment to cause contamination when it is disposed of, unlike many synthetic polymer compounds. In addition, in general, PHA produced by microorganisms is also excellent in biocompatibility, and is expected to be applied as medical flexible members and the like.

It is known that such PHA may have various compositions and structures depending on the type of microorganism to be used for the production of the PHA, the culture medium composition and the culture condition, and hitherto studies have been conducted mainly on control of the composition and structure of PHA to be produced in terms of improvements of properties of PHA.

[1] First, the biosynthesis of PHA obtained by polymerizing a monomer unit with a relatively simple structure such as 3-hydroxybutyric acid (hereinafter abbreviated as 3HB) is exemplified as follows:

(a) those containing 3HB and 3-hydroxyvaleric acid (hereinafter abbreviated as 3HV) (Japanese Patent Publication No. 6-15604, Japanese Patent Publication No. 7-14352, Japanese Patent Publication No. 8-19227 and Japanese Patent Application Laid-Open No. 5-7492);

(b) those containing 3HB and 3-hydroxyhexanoic acid (hereinafter abbreviated as 3HHx) (Japanese Patent Application Laid-Open No. 5-93049 and Japanese Patent Application Laid-Open No. 7-265065);

(c) those containing 3HB and 4-hydroxybutyric acid (hereinafter abbreviated as 4HB) (Japanese Patent Application Laid-Open No. 9-191893);

(d) those containing 3-hydroxyalkanoate having 6 to 12 carbon atoms (Japanese Patent No. 2642937); and (e) biosynthesis using a single aliphatic acid as a carbon source (the resulting product is almost same as those of (d)) (Appl. Environ. Microbiol, 58(2), 746 (1992)).

They are all PHA composed of monomer units each having an alkyl group in the side chain, synthesized by β-oxidation of hydrocarbons and the like or synthesis of fatty acids from saccharides by microorganism, namely "usual PHA".

Such PHA has already found considerable applications with proven performance particularly Also, in the field of agriculture, the biodegradable resin is used in mulch files, horticulture materials, slow-releasable agricultural chemicals, fertilizers and the like. Also, in the leisure industry, the biodegradable resin is used in fishing lines, fishing tackles, golf requites and the like.

However, if considering a wide range of application as a plastic, it cannot be the above described that PHA is fully usable in terms of properties in the present situation. For further expanding the range of application of PHA, it is important to conduct a wide range of studies on the improvement of properties, and for this purpose, development and search of PHA including monomer units of a variety of structures is prerequisite.

On the other hand, PHA with a substituent group introduced in the side chain ("unusual PHA") can be expected to be developed as a "functional polymer" with very useful functions and properties originating from the introduced substituent group by selecting the introduced substituent group according to desired characteristics and the like. That is, it is also an important challenge to conduct of development and search of excellent PHA enabling such functionality and biodegradability to be compatible with each other.

[2] Examples of substituent groups include groups containing aromatic rings (phenyl group, phenoxy group, etc.), unsaturated hydrocarbons, ester groups, allyl groups, cyano groups, halogenated hydrocarbons and epoxide. Among them, studies on PHA having an aromatic ring are particularly vigorously conducted.

(a) PHA containing a phenyl group or its partially substituted group

It is reported that *Pseudomonas oleovorans* produces PHA containing 3-hydroxy-5-phenylvaleric acid as a unit using 5-phenylvaleric acid as a substrate in Markromol. Chem., 191, 1957–1965 (1990) and Macromolecules, 24, 5256–5260 (1991).

It is reported that *Pseudomonas oleovorans* produces PHA containing 3-hydroxy-5-(4'-tolyl)valeric acid as a unit using 5-(4'-tolyl) valeric acid as a substrate in Macromolecules, 29, 1762–1766 (1996).

It is reported that *Pseudomonas oleovorans* produces PHA containing 3-hydroxy-5-(2',4'-dinitrophenyl)valeric acid and 3-hydroxy-5-(4'-nitrophenyl)valeric acid as a unit using 5-(2',4'-dinitrophenyl)valeric acid as a substrate in Macromolecules, 32, 2889–2895 (1999).

(b) PHA containing a phenoxy group or its partially substituted group

It is reported that *Pseudomonas oleovorans* produces a PHA copolymer of 3-hydroxy-5-phenoxyvaleric acid and 3-hydroxy-9-phenoxynonanoic acid using 11-pheoxyundecanoic acid as a substrate in Macromol. Chem. Phys., 195, 1665–1672 (1994).

Japanese Patent No. 2989175 discloses a homopolymer consisting of 3-hydroxy-5-(monofluorophenoxy)pentanoate (3H5(MFP)P) units or 3-hydroxy-5-(difluorophenoxyl) pentanoate (3H5(DFP)P) units, a copolymer containing at least (3H5(MFP)P) units or (3H5(DFP)P) units; *Pseudomonas putida* synthesizing these polymers; and a method of producing the above described polymers using *Pseudomonas species*, and it is described that as an advantage of the above invention, a long chain aliphatic acid having substituent groups can be metabolized to synthesize a polymer having a phenoxy group substituted with 1 or 2 fluorine atoms at the side chain terminal, and stereoregularity and water repellency are provided while maintaining a high melting point and good processability.

Studies are conducted on cyano-substituents and nitro-substituents in addition to the fluorine-substituent described above.

In Can. J. Microbiol, 41, 32–43 (1995) and Polymer International, 39, 205–213 (1996), it is reported that PHA containing 3-hydroxy-p-cyanophenoxyhexanoic acid or 3-hydroxy-p-nitrophenoxyhexanoic acid as a monomer unit is produced with octanoic acid and p-cyanophenoxyhexanoic acid or p-nitrophenoxyhexanoic acid as substrates using a *Pseudomonas oleovorans* ATCC 29347 strain and a *Pseudomonas putida* KT 2442 strain.

These reports are useful in obtaining polymers each having an aromatic ring in the side chain of PHA and having properties derived therefrom unlike general PHA whose side chain contains an alkyl group. That is, such PHA containing units each having an aromatic ring having a substituent group on the ring is a multifunctional PHA given an additional function derived from the substituent group existing on the aromatic ring while maintaining polymeric characteristics of high melting point and good processability derived from the aromatic ring.

[3] In addition, on the other hand, studies are vigorously conducted for the purpose of obtaining multifunctional PHA by introducing an optional functional group in the polymer side chain a chemical reaction using a vinyl group for a produced polymer, based on PHA having the vinyl group in the unit.

It is reported in Polymer, 41, 1703–1709 (2000) that a change of solubility in solvents has been found such that 3-hydroxyalkanoic acid having diol on the side chain terminal, synthesized by an oxidation reaction using potassium permanganate after producing PHA containing as a monomer unit 3-hydroxyalkenoic acid having an unsaturated bond in the terminal of the side chain terminal using 10-undecenoic acid as a substrate, is rendered soluble in polar solvents such as methanol, acetone-water mixture (80/20, v/v) and dimethylsulfoxide, and insoluble in nonpolar solvents such as chloroform, tetrahydrofuran and acetone.

It is reported in Macromolecular chemistry, 4, 289–293 (2001) that an improvement in speed of decomposition has been found for PHA containing 3-hydroxy-9-carboxynonanoic acid as a monomer unit, synthesized by an oxidization cleavage reaction using potassium permanganate after producing PHA containing as a monomer unit 3-hydroxy-10-undecenoic acid using 10-undecenoic acid as a substrate.

It is reported in Macromolecules, 31, 1480–1486 (1998) that a polyester having an epoxy group on the side chain has been obtained by producing a polyester having a vinyl group on the side chain by means of Pseudomonas olevorans and then epoxidizing the vinyl group.

A report on a crosslinking reaction carried out by heating together with hexamethylene diamine a polymer having an epoxy group on the side chain, obtained in the same manner, and the analysis of the product from the reaction is provided in Polymer, 40, 3787–3793 (1999).

A report on a research achieving improvements of properties of polyester by making a crosslinking reaction proceed in polyester molecules using the vinyl group on the polyester side chain is provided in Polymer, 35, 2090–2097 (1994).

As shown from the researches described above, the vinyl group exhibits high reactivity in an addition reaction or crosslinking reaction.

On the other hand, a polymer having an aromatic ring on the side chain has thermal stability, and therefore introduction of the vinyl group being an active group capable of enduring various applications in units constituting PHA together with the aromatic ring can be expected to improve the thermal stability, and thus can be very useful in terms of application of polymers as functional materials.

General Technical Background of Toner

So far, many methods have been known for electrophotography, and those methods are generally carried out in such a manner that an electric latent image is formed on an image carrier (photoconductor) by a variety of means using a photoconductive substance, the latent image is then developed with a toner to form a visible image, and the toner image is transferred onto an object transfer material such as a paper as necessary, followed by fixing the toner image on the object transfer material by heat and/or pressure or the like to obtain a copy. For the method for visualizing the electric latent image, a cascade development method, a magnetic brush development method, a pressurizing development method and the like are known. Further, a method using a magnetic toner and a rotary development sleeve with a magnetic pole placed at the center thereof in which the magnetic toner is caused to fly from the development sleeve onto the photoconductor by a magnetic field is also used.

Development systems for use in development of an electrostatic latent image include a two-component development system using a two-component type developer constituted by a toner and a carrier, and a one-component development system using a one-component type developer constituted only by a toner and using no carrier.

Here, the coloring fine particle generally called as a toner has a binder resin and a coloring material as essential components, and in addition thereto, magnetic powders and the like as necessary. For the method for imparting an electric charge to the toner, the electrifiability of the binder resin itself may be used without using a charge controlling agent, but in this method, charge stability with time and humidity resistance are compromised, thus making it impossible to obtain high quality images. Therefore, the charge controlling agent is usually added for the purpose of maintaining and controlling the charge of the toner.

Charge controlling agents well known in the art today include, for example, azo dye metal complexes, aromatic dicarboxylic acid-metal complexes and salicylic acid derivative-metal complexes as negative friction charging agents. In addition, as positive friction charging agents, nigrosine-based dyes, triphenylmethane-based dyes, various types of quaternary ammonium salts and organic tin compounds such as dibutyl tin oxide are known, but toners containing these substances as the charge controlling agent do not necessarily fully satisfy quality characteristics required for the toner such as the electrifiability and stability with time depending on their compositions.

For example, a toner containing an azo dye metal complex known as a negative charge controlling agent has an acceptable charge level, but may have reduced dispersibility depending on the type of binder resin to be combined because the azo dye metal complex is a low-molecular crystal. In this case, the negative charge controlling agent is not uniformly distributed in the binder resin, the charge level distribution of the obtained toner is significantly lacking in sharpness, and the obtained image has a low gray-level, resulting in a poor image formation capability. In addition, the azo dye metal complex has a unique color tone, and is thus presently used only for toners having limited colors around black, and if the azo dye metal complex is used as a color toner, its lack in clarity as a coloring agent required for obtaining an image having a high level of requirement for the color tone is a serious problem.

In addition, examples of almost colorless negative charge controlling agents include aromatic dicarboxylic-acid metal complexes, but they may be disadvantageous due to the fact that they are not perfectly colorless, and that they have low dispersibility peculiar to low-molecular-weight crystals.

On the other hand, nigrosine based dyes and triphenylmethane based dyes are presently used only for toners having limited colors around black because they are colored themselves, and may be poor in time stability of toners for continuous copying. In addition, conventional quaternary ammonium salts may have insufficient humidity resistance when formed into toners, and in this case, the stability with time may be so poor that high quality images are not provided as they are repeatedly used.

In addition, in recent years, attention has been given worldwide to reduction of wastes and improvement of safety of wastes in terms of environmental protection. This problem applies to the field of electrophotography as well. That is, as imaging apparatuses have been widely used, the amounts of wastes of printed papers, discarded toners and copying papers have increased year by year, and the safety of such wastes is important from a viewpoint of protection of global environment.

Application of Biodegradable Resin to Toner Application of a biodegradable resin to a binder resin particularly in production of toners is proposed in the field of electrophotography as well. For example, U.S. Pat. No. 5,004,664 discloses a toner having as its composition a biodegradable resin, particularly polyhydroxy butyric acid and polyhydroxy valeric acid, a copolymer thereof or a blend thereof.

In addition, Japanese Patent Application Laid-Open No. 6-289644 discloses an electrophotographic toner particularly for heated roll fixation characterized in that at least the binder resin contains a plant based wax and a biodegradable resin (e.g. polyester produced by microorganism, and natural polymer material of plant or animal origin), and the above described plant based wax is added in the above described binder in an amount of 5 to 50% by weight.

In addition, Japanese Patent Application Laid-Open No. 7-120975 discloses an electrophotographic toner characterized by containing a lactic acid based resin as a binder resin. In addition, Japanese Patent Application Laid-Open No. 9-274335 discloses an electrostatic latent image developing toner characterized by containing a polyester resin obtained by dehydrating polycondensation of a composition containing lactic acid and tri- or higher functional oxycarboxylic acid and a coloring agent.

In addition, Japanese Patent Application Laid-Open No. 8-262796 discloses an electrophotographic toner containing a binder resin and a coloring agent, characterized in that the binder resin is composed of a biodegradable resin (e.g. aliphatic polyester resin), and the coloring agent is composed of non-water soluble pigments. In addition, Japanese Patent Application Laid-Open No. 9-281746 discloses an electrostatic latent image developing toner characterized by containing an urethane-modified polyester resin obtained by cross-linking polylactic acid with a tri- or higher functional polyvalent isocyanate and a coloring agent.

Any one of the above described electrophotographic toners contains a biodegradable resin as binder resin, and is regarded to be effective to contribute to preservation of environments and the like.

However, reports of examples of using a biodegradable resin in the charge controlling agent have not been known, and there is a room for further improvement for contribution to preservation of environments.

A polyester obtained by subjecting to a chemical reaction/treatment a polyester having the vinyl group reported so far can be given a variety of functions, but does not necessarily have satisfactory thermal characteristics because of the existence of a middle to long alkyl chain in the side chain. That is, the glass transition temperature and melting point of the polyester is low, resulting in significant limitations to the range of applications as moldings and films.

On the other hand, a polyester having an aromatic ring on the side chain generally has a high melting point and thus finds a wide range of applications as moldings and films as described previously. However, the polyhydroxyalkanoate having units each containing an aromatic ring substituted with a functional group capable of enduring a variety of applications includes only examples described above, and further more functional polyhydroxyalkanoates have been desired.

In addition, for solving the above described problems, the present invention provides a negatively charged charge controlling agent being more contributable to preservation of environments and the like, and having high performance (high charge level, quick start of charge, excellent stability with time, and high environmental stability) and improved dispersibility in the aspect of functionality, a toner binder containing the charge controlling agent, an electrostatic latent image developing toner containing the charge controlling agent, and an image formation method and an image forming apparatus using the electrostatic latent image developing toner.

For solving the above problems, the inventors have vigorously conducted studies, and found that a polyhydroxyalkanoate having units each containing an aromatic ring substituted with a functional group capable of enduring a variety of applications can be prepared by making a polyhydroxyalkanoate containing units each having a vinyl phenyl structure react with a compound having desired functional groups.

In addition, the inventors have found that the above polyhydroxyalkanoate has excellent characteristics as a charge controlling agent, and has a high level of safety for human bodies and environments, and that a significant effect can be exhibited when an electrostatic latent image developing toner containing the charge controlling agent and the electrostatic latent image developing toner are used in an image forming apparatus having a certain development system.

That is, the present invention relates to an innovative polyhydroxyalkanoate (PHA) containing units each having a substituted phenyl structure on the side chain and a method of producing the same. More particularly, the present invention relates to a method of producing the polyester using, as a raw material, PHA containing 3-hydroxy-ω-(4-vinylphenyl) alkanoic acid units.

In addition, the present invention relates to a charge controlling agent for use in electrophotography, electrostatic recording, magnetic recording and the like, a toner binder, an electrostatic latent image developing toner, an image formation method using the toner, and an image forming apparatus for use therein. Particularly, the present invention relates to a charge controlling agent for use in electrophotography, electrostatic recording and electrostatic printing in a copying apparatus, a printer, a facsimile machine and the like for forming an image in such a manner that a toner image is previously formed on an electrostatic latent image carrier (hereinafter, referred to simply as image carrier) and thereafter the image is transferred onto an object transfer material, a toner binder, an electrostatic latent image developing toner, an image formation method using the toner and an image forming apparatus for use therein. More particularly, the present invention relates to a negatively charged charge controlling agent safer for the human body/environment, a toner binder using the agent, an electrostatic latent image developing toner, an image formation method using the toner, and an image forming apparatus for use therein.

SUMMARY OF THE INVENTION

The outline of the present invention will be described below.

First, the present invention is a polyhydroxyalkanoate containing in a molecule thereof one or more units each selected from the group consisting of the following formulae (1), (2), (3) and (4):

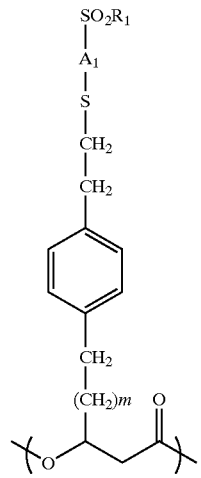

(1)

wherein $R_1$ is selected from the group consisting of OH, a halogen atom, ONa, OK, $OCH_3$ and $OC_2H_5$; $A_1$ represents a substituted or unsubstituted aliphatic hydrocarbon structure; m is an integer selected from 0 to 7; and in the case where there exists a plurality of units, $R_1$, $A_1$ and m represent the above described definements independently for each unit,

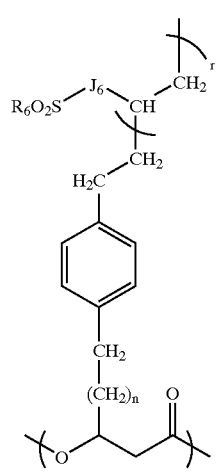

(2)

wherein $R_6$ is selected from the group consisting of OH, a halogen atom, ONa, OK, $OCH_3$ and $OC_2H_5$; $J_6$ represents a substituted or unsubstituted aliphatic hydrocarbon structure; n is an integer selected from 0 to 7; r is an integer selected from 1 to 500; and in the case where there exists a plurality of units, $R_6$, $J_6$, n and r represent the above described definements independently for each unit, (3)

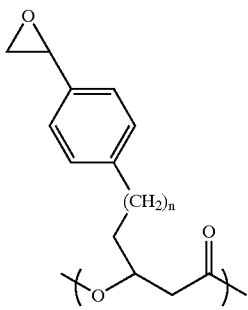

wherein n represents an integer of 0 to 7; and n represents the above described definements independently for each unit, and (4)

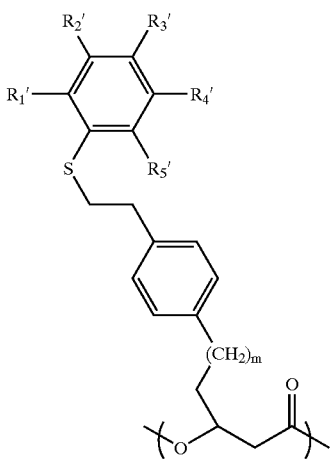

wherein m represents an integer of 0 to 7; $R_1'$ to $R_5'$ represent independently H or a halogen atom; and in the case where there exists a plurality of units, m and $R_1'$ to $R_5'$ represent the above described definements independently for each unit.

Also, the present invention is a method of producing polyhydroxyalkanoate containing a unit of formula (1), the method comprising reacting polyhydroxyalkanoate containing a unit of formula (5) with at least one type of compounds of formula (6), wherein said formulae (5) and (6) are:

(5)

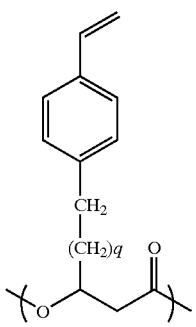

wherein q is an integer selected from 0 to 7, and in the case where there exist a plurality of units, q represents the above described number independently for each unit; and $$HS-A_{25}-SO_2R_{25} \quad (6)$$

wherein $R_{25}$ is selected from the group consisting of OH, a halogen atom, ONa, OK, $OCH_3$ and $OC_2H_5$; $A_{25}$ represents substituted or unsubstituted aliphatic hydrocarbon structures; and in the case where there exist a plurality of types of compounds, $R_{25}$ and $A_{25}$ each represent the above described respective constituent independently for each compound.

In addition, the present invention is a method of producing a polyhydroxyalkanoate containing a unit of formula (2), wherein a polyhydroxyalkanoate containing a unit of formula (5) is reacted with at least one compound of formula (7):

(7)

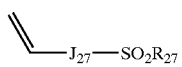

wherein $R_{27}$ is selected from the group consisting of OH, a halogen atom, ONa, OK, $OCH_3$ and $OC_2H_5$; $J_{27}$ represents a substituted or unsubstituted aliphatic hydrocarbon structure; and in the case where there exist a plurality of compounds, $R_{27}$ and $J_{27}$ represent the above described definements independently for each compound.

In addition, the present invention is a method of producing polyhydroxyalkanoate containing in the molecule one or more units of formula (3), characterized by comprising a step of treating with an oxidizing agent polyhydroxyalkanoate containing in the molecule one or more units of formula (5) to convert the unit of formula (5) into the unit of formula (3).

In addition, the present invention is a method of producing polyhydroxyalkanoate containing in the molecule one or more units of formula (4), characterized by comprising a step of making polyhydroxyalkanoate containing in the molecule one or more units of formula (5) react with at least one type of compounds of formula (8) shown below to convert the unit of formula (5) into the unit of formula (4), wherein said formula (8) is:

(8)

wherein $R_1'$ to $R_5'$ represent independently a hydrogen atom or a halogen atom; and in the case where there exists a plurality of compounds, $R_1'$ to $R_5'$ represent the above described definement independently for each compound.

Also, the present invention is a charge controlling agent controlling the charged state of powdered particles, characterized by containing polyhydroxyalkanoate containing in the molecule one or more units each selected from the group consisting of formulas (1), (2) and (4), a toner binder containing the same and an electrostatic latent image developing toner. In addition, the present invention is an image formation method and an image forming apparatus using them.

Also, the present invention is a method of controlling the charged state of powdered particles, characterized in that polyhydroxyalkanoate containing in the molecule one or more units each selected from the group consisting of those of formulae (1), (2) and (4) is contained in the powdered particles.

DETAILED DESCRIPTION OF THE PREFERRED EMBODIMENTS

Figure 1:
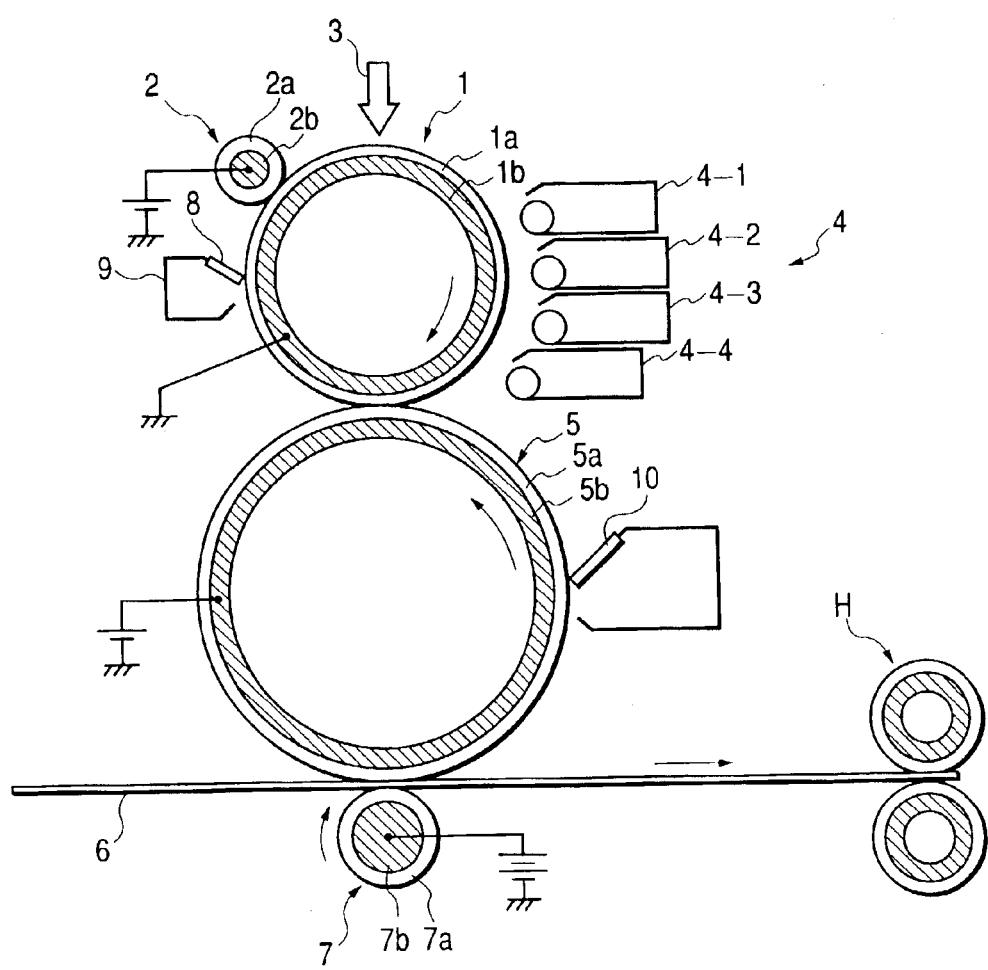
FIG. 1 is a schematic explanatory view of an image forming apparatus used in Examples 15 to 26 and Comparative Examples 7 to 12.

Detailed description of the invention will be described below.

PHA

The compound above described in the present invention has a basic skeleton as a biodegradability resin, and is therefore capable of being used for producing various kinds of products through melt-processing and the like as in the case of conventional plastics, and also has a remarkable characteristic such that it is decomposed by microorganism and involved in the material cycle in the natural world unlike synthetic polymers derived from oil. The compound of the present invention is obtained, in any case, by making a polyhydroxyalkanoate containing units each having a vinyl phenyl structure react with a compound having a desired functional group as will be described with its production method below.

The polyhydroxyalkanoate of the present invention contains any of four unit types as described previously. The units will specifically be described below.

PHA Having First Unit

The first polyhydroxyalkanoate of the present invention comprises the unit of formula (1).

The unit of formula (1) may take a form of the unit of formula (9):

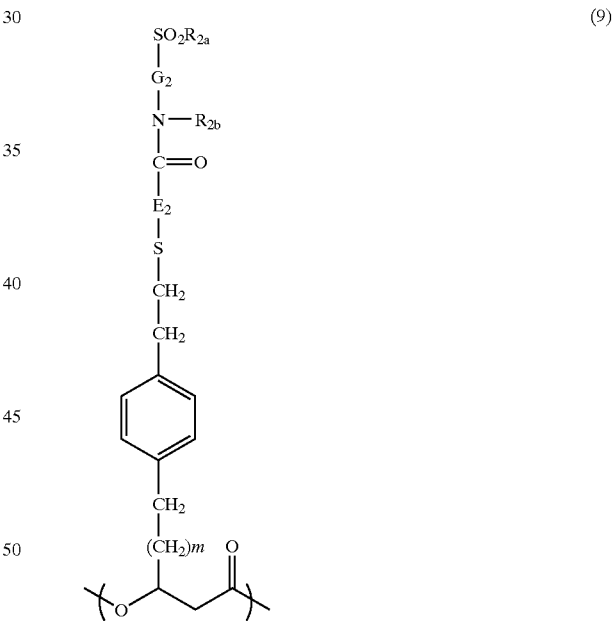

(9)

wherein $R_{2a}$ is selected from the group consisting of OH, a halogen atom, ONa, OK, OCH$_3$ and OC$_2$H$_5$; $R_{2b}$ is H or CH$_3$; E$_2$ and G$_2$ each represent a substituted or unsubstituted aliphatic hydrocarbon structure; m is an integer selected from 0 to 7; and in the case where there exists a plurality of units, $R_{2a}$, $R_{2b}$, E$_2$, G$_2$ and m represent the above described definements independently for each unit.

Further, the unit expressed by the formula (9) may take a form of a unit of formula (10):

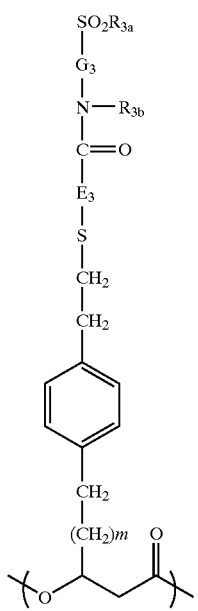

(10)

wherein $R_{3a}$ is selected from the group consisting of OH, a halogen atom, ONa, OK, $OCH_3$ and $OC_2H_5$; $R_{3b}$ is H or $CH_3$; $E_3$ and $G_3$ each represent a straight-chain or branched alkylene group having 1 to 8 carbon atoms; m is an integer selected from 0 to 7; and in the case where there exists a plurality of units, $R_{3a}$, $R_{3b}$, $E_3$, $G_3$ and m represent the above described definements independently for each unit.

Furthermore, the unit expressed by the formula (10) may take a form of a unit of formula (11):

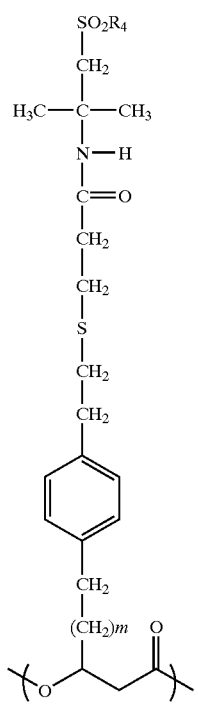

(11)

wherein $R_4$ is selected from the group consisting of OH, a halogen atom, ONa, OK, $OCH_3$ and $OC_2H_5$; m is an integer selected from 0 to 7; and in the case where there exists a plurality of units, $R_4$ and m represent the above described definements independently for each unit.

Also, the unit expressed by the formula (11) may take a form of a unit of formula (12):

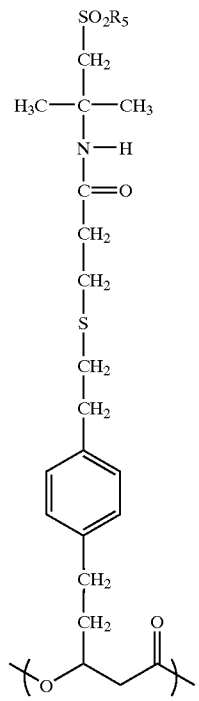

(12)

wherein $R_5$ is selected from the group consisting of OH, a halogen atom, ONa, OK, $OCH_3$ and $OC_2H_5$; and in the case where there exists a plurality of units, $R_5$ represents the above described definement for each unit.

PHA Having Second Unit

The second polyhydroxyalkanoate of the present invention comprises the unit of formula (2).

The unit of formula (2) may take a form of a unit of formula (13):

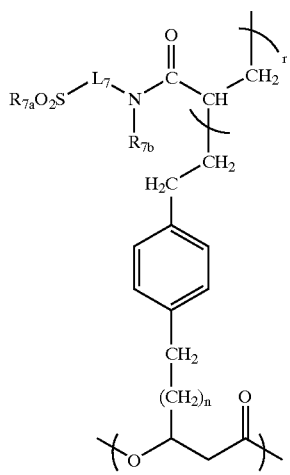

(13)

wherein $R_{7a}$ is selected from the group consisting of OH, a halogen atom, ONa, OK, $OCH_3$ and $OC_2H_5$; $R_{7b}$ is H or CH$_3$; L$_7$ represents a substituted or unsubstituted aliphatic hydrocarbon structure; n is an integer selected from 0 to 7; r is an integer selected from 1 to 500; and in the case where there exists a plurality of units, R$_{7a}$, R$_{7b}$, L$_7$, n and r represent the above described definements independently for each unit.

The unit expressed by the formula (13) may take a form of a unit of formula (14):

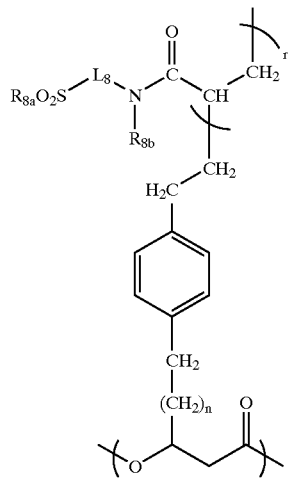

(14)

wherein R$_{8a}$ is selected from the group consisting of OH, a halogen atom, ONa, OK, OCH$_3$ and OC$_2$H$_5$; R$_{8b}$ is H or CH$_3$; L$_8$ represents a straight-chain or branched alkylene group having 1 to 8 carbon atoms; n is an integer number selected from 0 to 7; r is an integer selected from 1 to 500; and in the case where there exists a plurality of units, R$_{8a}$, R$_{8b}$, L$_8$, n and r represent the above described definements independently for each unit.

Further, the unit expressed by the formula (14) may take a form of a unit of formula (15):

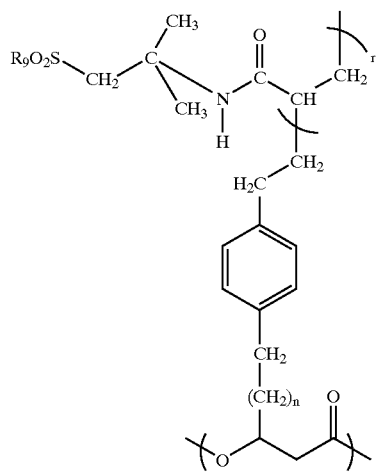

(15)

wherein R$_9$ is selected from the group consisting of OH, a halogen atom, ONa, OK, OCH$_3$ and OC$_2$H$_5$; n is an integer selected from 0 to 7; r is an integer selected from 1 to 500; and in the case where there exists a plurality of units, R$_9$, n and r represent the above described definements independently for each unit.

Furthermore, the unit expressed by the formula (15) may take a form of a unit of formula (16):

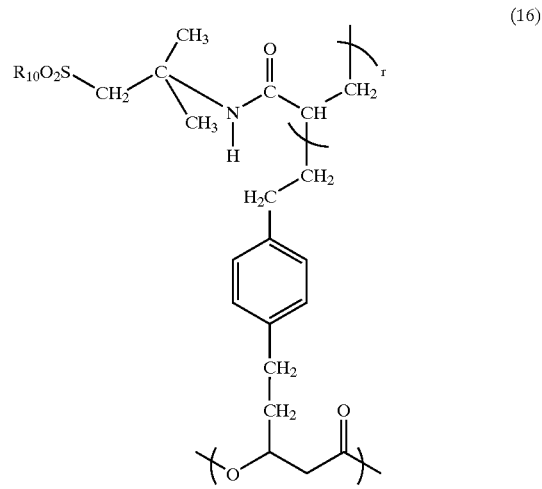

(16)

wherein R$_{10}$ is selected from the group consisting of OH, a halogen atom, ONa, OK, OCH$_3$ and OC$_2$H$_5$; r is an integer selected from 1 to 500; and in the case where there exists a plurality of units, R$_{10}$ and r represent the above described definements independently for each unit.

PHA Having Third Unit

The third polyhydroxyalkanoate of the present invention comprises the unit of formula (3).

In formula (3), n is preferably 1.

PHA Having Fourth Unit

The fourth polyhydroxyalkanoate of the present invention comprises the unit of formula (4).

In formula (4), the halogen atom may be replaced by a fluorine atom.

Alternatively, in formula (4), m may be 1.

Also, in formula (4), R$_1$' to R$_5$' may preferably fluorine atoms.

In addition, in formula (4), R$_1$', R$_2$', R$_4$' and R$_5$' may be hydrogen atoms and R$_3$' may be a fluorine atom.

Other Units

The PHA of the present invention contains in the molecule at least one unit selected from the group consisting of formulae (1), (2), (3) and (4), but may contain, in addition thereto, any one of units of the following formula (17):

(17)

wherein k is an integer number selected from 1 to 8; R$_{11}$ contains a residue having a ring structure of phenyl structure or thienyl structure; and in the case where there exists a plurality of units, k and R$_{11}$ represent the above described respective constituent and number independently for each unit, and 3-hydroxy-ω-cyclohexylalkanoic acid units each expressed by the following formula (18):

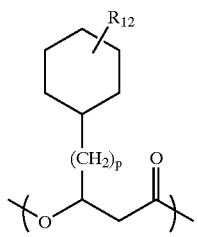

(18)

wherein $R_{12}$ represents a substituent group in the cyclohexyl group; $R_{12}$ is selected from the group consisting of H, CN, $NO_2$, a halogen atom, $CH_3$, $C_2H_5$, $C_3H_7$, $CF_3$, $C_2F_5$ and $C_3F_7$; and p is an integer number selected from 0 to 8; and in the case where there exits a plurality of units, $R_{12}$ and p represent the above described respective constituent and number independently for each unit.

Here, $R_{11}$ in formula (17) may be any one of the groups of formulae (19), (20), (21), (22), (23), (24), (25), (26), (27), (28) and (29), and in the case where there exists a plurality of units of formula (17) in the molecule, $R_{11}$ represents the above described formula independently for each unit;

a group of unsubstituted or substituted phenyl groups each expressed by

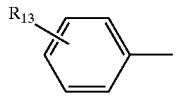

(19)

wherein $R_{13}$ represents a substituent group in the aromatic ring, $R_{13}$ is selected from the group consisting of H, a halogen atom, CN, $NO_2$, $CH_3$, $C_2H_5$, $C_3H_7$, $CH=CH_2$, $COOR_{13a}$ ($R_{13a}$ represents any one of H, Na and K), $CF_3$, $C_2F_5$ and $C_3F_7$, and in the case where there exist a plurality of units, $R_{13}$ represents the above described constituent independently for each unit;

a group of unsubstituted or substituted phenoxy groups each expressed by

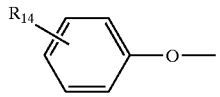

(20)

wherein $R_{14}$ represents a substituent group in the aromatic ring, $R_{14}$ is selected from the group consisting of H, a halogen atom, CN, $NO_2$, $CH_3$, $C_2H_5$, $C_3H_7$, $SCH_3$, $CF_3$, $C_2F_5$ and $C_3F_7$, and in the case where there exist a plurality of units, $R_{14}$ represents the above described constituent independently for each unit;

a group of unsubstituted or substituted benzoyl groups each expressed by

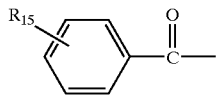

(21)

wherein $R_{15}$ represents a substituent group in the aromatic ring, $R_{15}$ is selected from the group consisting of H, a halogen atom, CN, $NO_2$, $CH_3$, $C_2H_5$, $C_3H_7$, $CF_3$, $C_2F_5$ and $C_3F_7$, and in the case where there exist a plurality of units, $R_{15}$ represents the above described constituent independently for each unit;

a group of unsubstituted or substituted phenylsulfanyl groups each expressed by

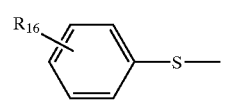

(22)

wherein $R_{16}$ represents a substituent group in the aromatic ring, $R_{16a}$ is selected from the group consisting of H, a halogen atom, CN, $NO_2$, $COOR_{16a}$, $SO_2R_{16b}$ ($R_{16a}$ represents any one of H, Na, K, $CH_3$ and $C_2H_5$, and $R_{16b}$ represents any one of OH, ONa, OK, a halogen atom, $OCH_3$ and $OC_2H_5$), $CH_3$, $C_2H_5$, $C_3H_7$, $(CH_3)_2$—CH and $(CH_3)_3$—C p, and in the case where there exist a plurality of units, $R_{16}$ represents the above described constituent independently for each unit;

a group of unsubstituted or substituted (phenylmethyl) sulfanyl groups each expressed by

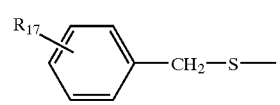

(23)

wherein $R_{17}$ represents a substituent group in the aromatic ring, $R_{17}$ is selected from the group consisting of H, a halogen atom, CN, $NO_2$, $COOR_{17a}$, $SO_2R_{17b}$ ($R_{17a}$ represents any one of H, Na, K, $CH_3$ and $C_2H_5$, and $R_{17b}$ represents any one of OH, ONa, OK, a halogen atom, $OCH_3$ and $OC_2H_5$), $CH_3$, $C_2H_5$, $C_3H_7$, $(CH_3)_2$—CH and $(CH_3)_3$—C, and in the case where there exist a plurality of units, $R_{17}$ represents the above described constituent independently for each unit;

2-thienyl group expressed by

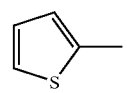

(24)

2-thienylsulfanyl group expressed by

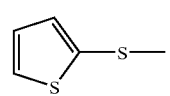

(25)

2-thienylcarbonyl group expressed by

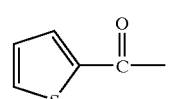

(26)

a group of unsubstituted or substituted phenylsulfinyl groups each expressed by

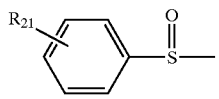
(27)

wherein $R_{21}$ represents a substituent group in the aromatic ring, R21 is selected from the group consisting of H, a halogen atom, CN, $NO_2$, $COOR_{21a}$, $SO_2R_{21b}$ ($R_{21a}$ represents any one of H, Na, K, $CH_3$ and $C_2H_5$, and $R_{21b}$ represents any one of OH, ONa, OK, a halogen atom, $OCH_3$ and $OC_2H_5$), $CH_3$, $C_2H_5$, $C_3H_7$, $(CH_3)_2$—CH and $(CH_3)_3$—C, and in the case where there exist a plurality of units, $R_{21}$ represents the above described constituent independently for each unit);

a group of unsubstituted or substituted phenylsulfonyl groups each expressed by

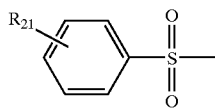
(28)

wherein $R_{22}$ represents a substituent group in the aromatic ring, $R_{22}$ is selected from the group consisting of H, a halogen atom, CN, $NO_2$, $COOR_{22a}$, $SO_2R_{22b}$ ($R_{22a}$ represents any one of H, Na, K, $CH_3$ and $C_2H_5$, and $R_{22b}$ represents any one of OH, ONa, OK, a halogen atom, $OCH_3$ and $OC_2H_5$), $CH_3$, $C_2H_5$, $C_3H_7$, $(CH_3)_2$—CH and $(CH_3)_3$—C, and in the case where there exist a plurality of units, $R_{22}$ represents the above described constituent independently for each unit; and a group of (phenylmethyl)oxy groups each expressed by

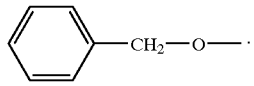
(29)

The method of producing these PHAs according to the present invention will now be described.

In the production method according to the present invention, polyhydroxyalkanoate containing units of formula (5) is used as a raw material. First, the method of producing the PHA as a raw material will be described below.

Method of Producing Polyhydroxyalkanoate Containing Units of Formula (5)

The polyhydroxyalkanoate containing a unit of formula (5), which is used as a raw material in the method of producing PHA according to the present invention, can be produced using, but not limited to, a method of production by microorganism, a method of production by a gene-manipulated plant crop system and a method of production by chemical polymerization. Preferably, the method of production by microorganism is used. The method of production by microorganism will be described in detail below.

The polyhydroxyalkanoate as a starting material is produced by a method characterized in that the microorganism is cultured in a culture medium containing at least one type of ω-(4-vinylphenyl) alkanoic acids expressed by the following formula (30):

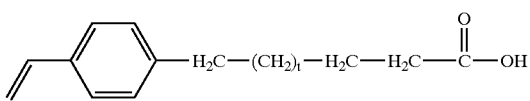
(30)

wherein t is an integer number selected from 0 to 7.

The microorganism for use in the method of producing polyhydroxyalkanoate containing units of formula (5) as a starting material according to the present invention may be any microorganism as long as it is a microorganism capable of producing PHA, namely a microorganism capable of producing a PHA type polyester containing 3-hydroxy-ω-(4-vinylphenyl) alkanoic acid units each expressed by general formula (5) by culturing the microorganism in a culture medium containing ω-(4-vinylphenyl) alkanoic acid expressed by general formula (30). A suitable example of usable microorganisms capable of producing PHA may be a microorganism belonging to Pseudomonas genus. Above all, more preferable are microorganism which are capable of producing PHA while having no enzyme reactivity to oxidize or epoxidized the vinyl group existing as a substituent on the phenyl group.

More specifically, among microorganisms belonging to Pseudomonas, more preferable species as the microorganism for use in the production method of the present invention may include *Pseudomonas cichorii, Pseudomonas putida, Pseudomonas fluorecense, Pseudomonas oleovolans, Pseudomonas aeruginosa, Pseudomonas stutzeri* and *Pseudomonas jessenii*.

More particularly, microorganism includes *Pseudomonas cichorii* YN2 (FERM BP-7375), *Pseudomonas cichorii* H45 (FERM BP-7374), *Pseudomonas jessenii* P161 (FERM BP-7376) and *Pseudomonas putida* P91 (FERM BP-7373). These four types of microorganism are deposited at International Patent Organism Depositary, National Institute of Advanced Industrial Science and Technology (independent administrative corporation) and described, in Japanese Patent Laid-Open No. 2002-80751.

In the production method of the present invention, any culture medium may be used for the culture medium for use in the process of culturing a microorganism as long as the culture medium is an inorganic salt culture medium containing a phosphate and a nitrogen source such as an ammonium salt or nitrate, and in the process of producing PHA in the microorganism, the productivity of PHA can be improved by adjusting the concentration of the nitrogen source.

In addition, nutrients such as an yeast extract, polypeptone and a meat extract can be added to the culture medium as a matrix for promoting the propagation of the microorganism. That is, peptides may be added as an energy source and a carbon source in the form of nutrients such as an yeast extract, polypeptone and a meat extract.

Alternatively, for the culture medium, saccharides, for example, aldoses such as glyceroaldehyde, erythrose, arabinose, xylose, glucose, galactose, mannose and fructose, alditols such as glycerol, erythritol and xylitol, aldonic acids such as gluconic acid, uronic acids such as glucuronic acid and galacturonic acid, and disaccharides such as maltose, sucrose and lactose may be used as an energy source and a carbon source consumed with propagation of the microorganism.

Instead of the above described saccharides, organic acids or salts thereof, more specifically organic acids involved in the TCA cycle and organic acids derived from a biochemical reaction with less steps by one or two steps than the TCA cycle, or water soluble salts thereof may be used. As the organic acid or salt thereof, hydroxycarboxylic acids and oxocarboxylic acids such as pyruvic acid, oxalacetic acid, citric acid, isocitric acid, ketoglutaric acid, succinic acid, fumaric acid, malic acid and lactic acid or water soluble salts thereof can be used. Alternatively, amino acids or salts thereof, for example amino acids such as asparaginic acid and glutamic acid or salts thereof can be used. When the organic acid or salt thereof is added, it is more preferable that one or more types are selected from a group consisting of pyruvic acid, oxalacetic acid, citric acid, isocitric acid, ketoglutaric acid, succinic acid, fumaric acid, malic acid, lactic acid and salts thereof, and are added to the culture medium and dissolved therein. Alternatively, when the amino acid or salt thereof is added, it is more preferable that one or more types are selected from a group consisting of asparaginic acid, glutamic acid and salts thereof, and are added to the culture medium and dissolved therein. At this time, as required, all or part thereof can be added in the form of a water soluble salt to be dissolved uniformly without affecting the pH of the culture medium.

It is desirable that the concentration of the above coexisting substrate added to the culture medium as a carbon source for growth of the microorganism and energy source for production of polyhydroxyalkanoate is usually selected so that it is in the range of from 0.1 to 5% (w/v), more preferably 0.2 to 2% (w/v) per culture medium. That is, for peptides, yeast extracts, organic acids or salts thereof, amino acids or salts thereof, and saccharides that are used as the above coexisting substrates, one or more types thereof may be added, and at this time, it is desirable that the total concentration of these added substrates is with in the above described range of total concentrations.

It is desirable that the content of the matrix for production of desired polyhydroxyalkanoate, namely ω-(4-vinylphenyl) alkanoic acid expressed by general formula (30) is selected so that it is in the range of from 0.01 to 1% (w/v), more preferably 0.02 to 0.2% (w/v) per cultural medium.

Also, at least one type of ω-substituted alkanoic acid compounds expressed by the following formula (31):

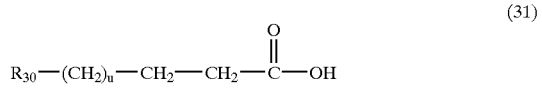

(31)

wherein u is an integer number selected from 1 to 8; $R_{30}$ contains a ring structure of phenyl structure or thienyl structure, and is any one of groups expressed by (19), (20), (21), (22), (23), (24), (25), (26), (27), (28) and (29); and in the case where there exists a plurality of compounds, u and $R_{30}$ represent the above described respective number and constituent independently for each compound, or at least one type of ω-cyclohexylalkanoic acid compounds each expressed by the following formula (32):

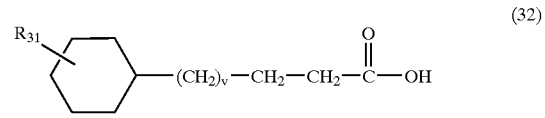

(32)

wherein $R_{31}$ represents a substituent group in the cyclohexyl group; $R_{31}$ is selected from the group consisting of H, CN, $NO_2$, a halogen atom, $CH_3$, $C_2H_5$, $C_3H_7$, $CF_3$, $C_2F_5$ and $C_3F_7$; and v is an integer number selected from 0 to 8, is made to coexist in the culture in addition to a medium for producing desired polyhydroxyalkanoate, namely at least one type of ω-(4-vinylphenyl) alkanoic acids of formula (5), whereby polyhydroxyalkanoate containing 3-hydroxy-ω-substituted alkanoic acid units of formula (17) or 3-hydroxy-ω-cyclohexylalkanoic acid units of formula (18) as well as 3-hydroxy-ω-(4-vinylphenyl) alkanoic acid units of formula (5) can be produced.

Any temperature at which microorganism strains to be used can suitably be propagated may be selected as a culture temperature, and an appropriate temperature is usually in the range of from about 15 to 37° C., more preferably from about 20 to 30° C.

Any culture method such as liquid culture and solid culture may be used for the culture as long as it allows propagation of microorganism and production of PHA. In addition, any type of culture method such as batch culture, fed-batch culture, semi-continuous culture and continuous culture may be used. Forms of liquid batch culture include a method of supplying oxygen while shaking the microorganism in a shaking flask, and a method of supplying oxygen adopting a stirring ventilation system with a jar fermenter.

For the method of making the microorganism produce and accumulate PHA, a two-step culture method in which the microorganism is cultured by two steps may be adopted other than the one-step culture method in which the microorganism is cultured in an inorganic salt culture medium containing a phosphate and a nitrogen source such as an ammonium salt or a nitrate with a matrix added therein in a predetermined concentration as described above. In this two-step culture method, the microorganism is once propagated sufficiently in the inorganic salt culture medium containing a phosphate and a nitrogen source such as an ammonium salt or a nitrate with a matrix added therein in a predetermined concentration as a primary culture, and thereafter cells obtained by the primary culture are relocated to a culture medium with a matrix added therein in a predetermined concentration after limiting the amount of nitrogen source such as ammonium chloride contained in the culture medium, and are further cultured as a secondary culture, thereby making the microorganism produce and accumulate PHA. Use of this two-step culture method may improve the productivity of desired PHA.

Generally, a produced PHA type polyester has reduced water solubility because of the presence of hydrophobic atom groups such as a 4-vinylphenl group derived from a 3-hydroxy-ω-(4-vinylphenyl)akanoic acid unit in the side chain, and is accumulated in cells of the microorganism capable of producing PHA, and therefore can easily be separated from the culture medium by collecting cells propagated by culture and involved in production and accumulation the desired PHA type polyester. After the collected cells are washed and dried, the desired PHA type polyester can be collected.

In addition, polyhydroxyalkanoate is usually accumulated in cells of such a microorganism capable of producing PHA. For the method of collecting desired PHA from these microorganism cells, a method that is usually used may be adopted. For example, extraction with organic solvents such as chloroform, dichloromethane and acetone is most convenient. Other than the above described solvents, dioxane, tetrahydrofuran and acetonitrile may be used. In addition, in a working environment in which use of any organic solvent is not preferred, a method in which in stead of solvent extraction, any one of a treatment by surfactants such as SDS, a treatment by enzymes such as lysozyme, a treatment by chemicals such as hypochlorites, ammonium and EDTA, an ultrasonic crashing method, a homogenizer method, a pressure crushing method, a bead impulse method, a grinding method, an immersion method and a freeze-thaw method is used to physically crush microorganism cells, followed by removing cell components other than PHA to collect PHA may be adopted.

As one example of inorganic salt culture media capable of being used in the production method of the present invention, the composition of the inorganic salt culture medium (M9 culture medium) used in Examples described later is shown below.

Composition of M9 Culture Medium
- $Na_2HPO_4$: 6.3
- $KH_2PO_4$: 3.0
- $NH_4Cl$: 1.0
- NaCl: 0.5

(by g/L, at pH=7.0).

Further, for ensuring satisfactory propagation of cells and associated improvement of productivity of PHA, an essential trace element such an essential trace metal element should be added in an appropriate amount to an inorganic salt culture medium such as the above described M9 culture medium, and it is very effective to add about 0.3% (v/v) trace component solution of which composition is shown below. The addition of such a trace component solution supplies a trace metal element for use in propagation of the microorganism. Composition of trace component solution nitrilotriacetic acid: 1.5;

- $MgSO_4$: 3.0
- $MnSO_4$: 0.5
- NaCl: 1.0
- $FeSO_4$: 0.1
- $CaCl_2$: 0.1
- $CoCl_2$: 0.1
- $ZnSO_4$: 0.1
- $CuSO_4$: 0.1
- $AlK(SO_4)_2$: 0.1
- $H_3BO_3$: 0.1
- $Na_2MoO_4$: 0.1
- $NiCl_2$: 0.1

(g/L).

As described above, when PHA is produced by a method comprising a step of producing such a compound by microorganism, the PHA is an isotactic polymer composed only of a R configration, but is not particularly limited to the isotactic polymer and can be used for an atactic polymer as long as the object of the present invention can be achieved in terms of both properties and functions. Also, the PHA can be obtained by a method comprising as a step chemical synthesis using ring opening polymerization of a lactone compound or the like.

Method of Producing PHA having Units of Formula (1)

The polyhydroxyalkanoate of formula (1) desired in the present invention is produced by a reaction between polyhydroxyalkanoate containing 3-hydroxy-ω-(4-vinylphenyl) alkanoic acid units of formula (5), which is used as a starting material, and at least one type of compounds of formula (6).

In the reaction, the polyhydroxyalkanoate of formula (9) as a typical example of PHA having formula (1) can be obtained by using the compound of the following formula (33) as a typical example of formula (6):

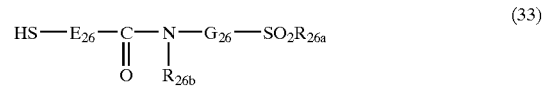

wherein $R_{26a}$ is selected from the group consisting of OH, a halogen atom, ONa, OK, $OCH_3$ and $OC_2H_5$; $R_{26b}$ is H or $CH_3$; $E_{26}$ and $G_{26}$ each represent a substituted or unsubstituted aliphatic hydrocarbon structure; and in the case where there exists a plurality of compounds, $R_{26a}$, $R_{26b}$, $E_{26}$ and $G_{26}$ represent the above described definements independently for each compound.

The reaction between polyhydroxyalkanoate containing 3-hydroxy-ω-(4-vinylphenyl) alkanoic acid units of formula (5) and the compound of formula (6) will be described in detail below.

The reaction step of the present invention is preferably carried out under the presence of a radical initiator. For this radical initiator, one or more compounds each selected from 2,2'-azobis(2-methylpropionitrile), 2,2'-azobisisobutyronitrile, 2,2'-azobis-(2,4-dimethylvaleronitrile), 2,2'-azobis-(4-methoxy-2,4-dimethylvaleronitrile), di-n-propylperoxicarbonate, bis-4-t-butylhexylperoxicarbonate, bis-2-ethylhexylperoxidicarbonate, benzoyl peroxide, lauroyl peroxide and acetylcyclohexanesulfonyl peroxide may be used.

The amount of radical initiator to be used is in the range of from 0.1 to 50 times in mole, preferably from 1.0 to 20 times in mole as large as the amount of the compound of formula (6).

The compound of formula (6) for use in the present invention is used in the amount in the range of from 0.1 to 50.0 times in mole, more preferably from 1.0 to 20.0 times in mole as large as the amount of unit of formula (5) to be used as a starting material.

A solvent may be used as required in the reaction of the present invention. Solvents to be used include hydrocarbons such as hexane, cyclohexane and heptane, ketones such as acetone and methyl ethyl ketone, ethers such as dimethyl ether, diethyl ether and tetrahydrofuran, halogenated hydrocarbons such as dicloromethane, chloroform, carbon tetrachloride, dichloroethane, and trichloroethane, aromatic hydrocarbons such as benzene and toluene, and aprotic polar solvents such as N,N-dimethyl formamide and dimethyl sulfoxide. The amount of solvent to be used may be determined as appropriate according to the type of starting material, the reaction condition and the like.

In the method of the present invention, the reaction temperature is not particularly limited, but is usually in the range of from 0° C. to the boiling point of the solvent. However, it is desirable that the reaction is carried out at a temperature most suitable for the radical initiator to be used.

In the method of the present invention, the reaction time cannot be determined unconditionally, but is usually in the range of from 1 to 48 hours.

In the present invention, the reaction solution containing the polyhydroxyalkanoate of formula (1) produced in this way can be removed using distillation as a normal method. Alternatively, the reaction solution can be collected by mixing the reaction solution uniformly with a solvent insoluble in the polyhydroxyalkanoate of formula (1) to reprecipitate the desired polyhydroxyalkanoate of formula (1) using a solvent such as water, an alcohol such as methanol and ethanol, and an ether such as dimethyl ether, diethyl ether and tetrahydrofuran. The polyhydroxyalkanoate of formula (1) obtained in this way may be isolated and purified if necessary. The isolation and purification method is not particularly limited, and a method in which a solvent insoluble in the polyhydroxyalkanoate of formula (1) is used to reprecipitate the polyhydroxyalkanoate, a method in which a solvent soluble in polyhydroxyalkanoate of formula (1) is used to carry out dialysis and a method using column chromatography may be used.

Method of Producing PHA Having Units of Formula (2)

The polyhydroxyalkanoate of formula (2) desired in the present invention is produced by a reaction between polyhydroxyalkanoate containing 3-hydroxy-ω-(4-vinylphenyl) alkanoic acid units of formula (5), which is used as a starting material, and at least one type of compounds of formula (7).

In the reaction, The polyhydroxyalkanoate of formula (13) as a typical example of PHA having formula (2) can be obtained by using the following formula (34) as a typical example of formula (7):

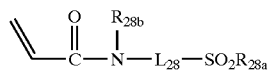

(34)

wherein $R_{28a}$ is selected from the group consisting of OH, a halogen atom, ONa, OK, $OCH_3$ and $OC_2H_5$; $R_{28b}$ is H or $CH_3$; $L_{28}$ represents a substituted or unsubstituted aliphatic hydrocarbon structure; and in the case where there exists a plurality units, $R_{28a}$, $R_{28b}$ and $L_{28}$ represent the above described respective constituent independently for each unit.

The reaction between polyhydroxyalkanoate containing 3-hydroxy-ω-(4-vinylphenyl) alkanoic acid units of formula (5) and the compound of formula (7) will be described in detail below.

The reaction step of the present invention is preferably carried out in the presence of a radical initiator. For this radical initiator, one or more compounds selected from 2,2'-azobis(2-methylpropionitrile), 2,2'-azobisisobutyronitrile, 2,2'-azobis(2,4-dimethylvaleronitrile), 2,2'-azobis(4-methoxy-2,4-dimethylvaleronitrile), di-n-propylperoxycarbonate, bis-4-t-butylhexylperoxycarbonate, bis-2-ethylhexylperoxydicarbonate, benzoyl peroxide, lauroyl peroxide or acetylcyclohexanesulfonyl peroxide may be used.

The amount of a radical initiator to be used is in a range of from 0.01 to 50.0 times in mole, preferably from 0.01 to 5.0 times in mole as large as the amount of the compound of formula (7).

The compound of formula (7) for use in the present invention is used in the amount in the range of from 0.1 to 1000.0 times in mole, more preferably from 1.0 to 500.0 times in mole as large as the amount of unit of formula (5) to be used as a starting material.

A solvent may be used as required in the reaction of the present invention. Solvents to be used include hydrocarbons such as hexane, cyclohexane and heptane, ketones such as acetone, methyl ethyl ketone, ethers such as dimethyl ether, diethyl ether, tetrahydrofuran, halogenated hydrocarbons such as dicloromethane, chloroform, carbon tetrachloride, dichloroethane, and trichloroethane, aromatic hydrocarbons such as benzene and toluene, and aprotic polar solvents such as N,N-dimethyl formamide and dimethyl sulfoxide. The amount of solvent to be used may be determined as appropriate according to the type of starting material, the reaction condition and the like.

In the method of the present invention, the reaction temperature is not particularly limited, but is usually in the range of from 0° C. to the boiling point of the solvent. However, it is desirable that the reaction is carried out at a temperature most suitable for the radical initiator to be used.

In the method of the present invention, the reaction time cannot be determined unconditionally, but is usually in the range of from 1 to 48 hours.

In the present invention, the reaction solution containing the polyhydroxyalkanoate of formula (2) produced in this way can be removed using distillation as a normal method. Alternatively, the reaction solution can be collected by mixing the reaction solution uniformly with a solvent insoluble in the polyhydroxyalkanoate of formula (2) to reprecipitate the desired polyhydroxyalkanoate of formula (2) using a solvent such as water, an alcohol such as methanol and ethanol, and an ether such as dimethyl ether, diethyl ether and tetrahydrofuran. The polyhydroxyalkanoate of formula (2) obtained in this way may be isolated and purified if necessary. The isolation and purification method is not particularly limited, and a method in which a solvent insoluble in the polyhydroxyalkanoate of formula (2) is used to reprecipitate the polyhydroxyalkanoate, a method in which a solvent soluble in polyhydroxyalkanoate of formula (2) is used to carry out dialysis and a method using column chromatography may be used.

Method of Producing Compound of Formula (3)

The PHA of formula (3) desired in the present invention is produced by treating with an oxidizing agent PHA containing 3-hydroxy-ω-aralkenoic acid units of formula (5), which is a starting material.

The carbon-to-carbon double bond in formula (5) can be converted into an epoxy group by treating the PHA with an oxidizing agent according to the method described in Macromolecules, 31, 1480–1486 (1998).

For the oxidizing agent to be used, one or more types each selected from hydrogen peroxide, sodium percarbonate, metachloro perbenzoic acid, performic acid and peracetic acid may be used. Particularly, metachloro perbenzoic acid is preferable. The amount of oxidizing agent to be used is usually 1 mole equivalent or greater, preferably 1.1 to 10 mole equivalent with respect to 1 mole of unit of formula (5) because the reaction is a stoichiometric reaction.

The solvent in the reaction of the present invention is not particularly limited as long as it is a solvent inactive to the reaction, and for example, acetone, ethers such as tetrahydrofuran and dioxane, aromatic hydrocarbons such as benzene, toluene and xylene, aliphatic hydrocarbons such as hexane and heptane, halogenated hydrocarbons such as methylchloride, dichloromethane and chloroform and the like may be used. Among these solvents, halogenated hydrocarbons such as methylchloride, dichloromethane and chloroform and the like are preferable if considering solubility of PHA. The amount of solvent to be used may be determined as appropriate according to the starting material, the reaction condition and the like.

The reaction temperature is usually −40 to 40° C., preferably −10 to 30° C. The reaction time depends on the stoichiometric ratio between the ω-alkenoic acid unit of formula (5) and the oxidizing agent and the reaction temperature, but is usually in the range of from 2 to 72 hours.

In the present invention, the reaction solution containing the PHA of formula (3) produced in this way can be removed using distillation as a normal method. Alternatively, the reaction solution can be collected by mixing the reaction solution uniformly with a solvent insoluble in the PHA of formula (3) to reprecipitate the desired PHA of formula (3) using a solvent such as water, an alcohol such as methanol and ethanol, and an ether such as dimethyl ether, diethyl ether and tetrahydrofuran. The PHA may be isolated and purified if necessary. The isolation and purification method is not particularly limited, and a method in which a solvent insoluble in the PHA of formula (3) is used to reprecipitate the PHA, a method using column chromatography, dialysis and the like may be used. By treating with an oxidizing agent a PHA type polyester containing in the molecule one or more 3-hydroxy-5-(4-vinylphenyl) valeric acid units each expressed by the following formula (35) with q equal to 1 in formula (5):

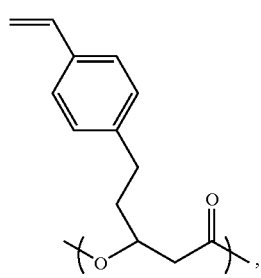

(35)

a PHA expressed by the following formula (36) is obtained, which is a particular example of PHA of formula (3) with n equal to 1:

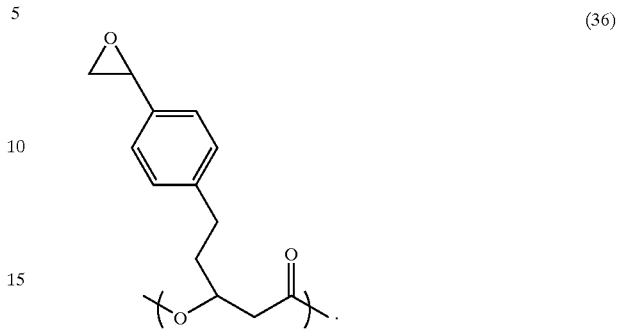

(36)

Method of Producing a Compound of Formula (4)

The PHA of formula (4), the object in the present invention, is produced by making PHA containing 3-hydroxy-ω-alkenoic acid units each of formula (5), which is a starting material, react with at least one type of substituted benzene thiol of formula (8).

Particularly preferable as the substituted benzene thiol of formula (8) is pentafluorobenzenethiol expressed by the following formula (37):

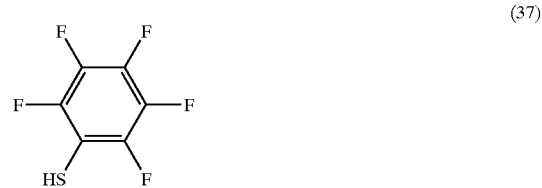

(37)

and p-fluorobenzenethiol expressed by the following formula (38).

(38)

In addition thereto, p-bromobenzenethiol, p-chlorobenzenethiol, 3,5-difluorobenzenethiol, 3,5-dibromobenzenethiol, 3,5-dichlorobenzenethiol and the like also belong to such benzene thiol.

Preferable examples of polyesters containing in the molecule one or more units of formula (4) may include a polyester expressed by the following formula (39):

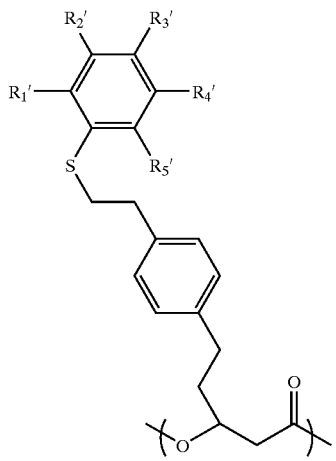

(39)

wherein $R_1'$ to $R_5'$ each represent independently H or F, which is produced using as a raw material PHA containing in the molecule one or more 3-hydroxy-5-(4-vinylphenyl) valeric acid units of formula (35). The unit of formula (39) is a unit with m equal to 1 in formula (4).

More preferable examples of polyesters containing in the molecule one or more units of formula (4) include:

a polyester containing units expressed by the following formula (40):

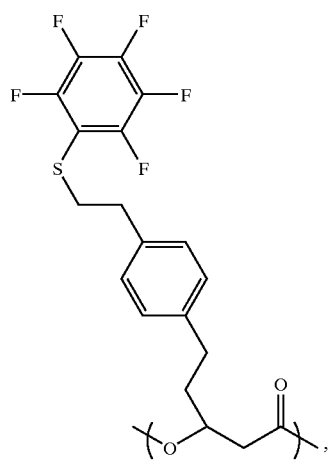

(40)

which is a PHA of formula (39) with $R_1'$ to $R_5'$ of fluorine atoms, and a polyester containing units each expressed by the following formula (41):

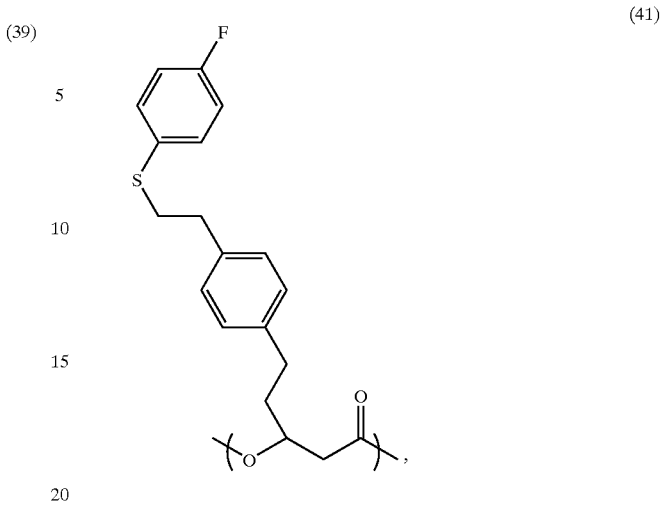

(41)

which is a PHA of formula (39) with $R_1'$, $R_2'$, $R_4'$ and $R_5'$ of hydrogen atoms and $R_3'$ of a fluorine atom.

The reaction step in method of producing PHA of formula (4) is preferably carried out under the presence of a radical initiator. For this radical initiator, one or more compounds selected from 2,2'-azobis(2-methylpropionitrile), 2,2'-azobisisobutyronitrile, 2,2'-azobis(2,4-dimethylvaleronitrile), 2,2'-azobis(4-methoxy-2,4-dimethylvaleronitrile), di-n-propylperoxycarbonate, bis-4-t-butylhexylperoxycarbonate, bis-2-ethylhexylperoxydicarbonate, benzoyl peroxide, lauroyl peroxide and acetylcyclohexanesulfonyl peroxide may be used.

The amount of the radical initiator to be used is in a range of from 0.1 to 50.0 times in mole, preferably from 1.0 to 20.0 times in mole as large as the amount of the compound of formula (8).

The compound of formula (8) for use in the present invention is used in the amount in a range of from 0.1 to 50.0 times in mole, more preferably from 1.0 to 20.0 times in mole as large as the amount of unit of formula (5) to be used as a starting material.

In the method of producing PHA of the present invention described above, the reaction solvent, reaction temperature, reaction time and purification process are not limited to those described above.

In addition, the molecular weight of PHA of the present invention can be measured as a relative molecular weight as well as absolute molecular weight. The molecular weight can simply be measured by, for example, GPC (gel permeation chromatography). For the specific measurement method by GPC, the PHA is previously dissolved in a solvent capable of dissolving the PHA, and its molecular weight is measured with a similar mobile phase. For the detector, a differential refraction detector (RI), an ultraviolet detector (UV) or the like may be used depending on the PHA to be measured. The molecular weight is determined as a relative comparison with a standard sample (polystyrene, polymethylmethacrylate, etc.). The solvent may be selected from solvents capable of dissolving a polymer such as dimethylformamide (DMF), dimethylsulfoxide (DMSO), chloroform, tetrahydrofuran (THF), toluene, hexafluoroisopropanol (HFIP). In the case of a polar solvent, a measurement can be made by addition of salt.

In the present invention, PHA presented with the ratio ($M_w/M_n$) of the weight average molecular weight ($M_w$) to the number average molecular weight ($M_n$) measured as described above being in the range of from 1 to 10 is preferably used.

It is desirable that the number average molecular weight ($M_n$) of the PHA of the present invention is in a range of from 1000 to 1000000.

Charge Controlling Agent

In addition, the present invention is a charge controlling agent containing the above described compound, and further an electrostatic latent image developing toner containing the charge controlling agent. The present invention is further an image formation method comprising an charging step of applying a voltage to a charge member from the outside to uniformly charge an electrostatic latent image carrier for the above electrostatic latent image developing toner, a development step of forming a toner image on the electrostatic latent image carrier, a transfer step of transferring the toner image on the electrostatic latent image carrier to a transfer material via or not via an intermediate transfer body, and a heat-fixation step of fixing by heat the toner image on the transfer material, and also an image forming apparatus comprising means corresponding to respective steps of the method, namely charging means, development means, transfer means and heat-fixation means.

The compound described in the present invention has good compatibility with the binder resin and excellent compatibility particularly with polyester type binder resin. Since the toner containing the compound described in the present invention has a high specific charge level and is excellent in stability with time, it provides clear images with stability in image formation with electrostatic recording even after being stored for a long time period, and the toner can be produced for both negatively charged black toners and color toners because of its colorlessness and negative-electrifiability. In addition, by properly selecting the type and composition ratio of monomer units constituting the compound described in the present invention, wide range compatibility control is made possible. If a resin composition in which the charge controlling agent is put in microphase separation state in a toner binder, no electric continuity is formed in the toner so that electric charge can stably be maintained. In addition, the compound described in the present invention contains no heavy metals, and therefore when the toner is produced by suspension polymerization or emulsion polymerization, polymerization inhibition caused due to the presence of heavy metals, as found in the case of a metal-containing charge controlling agent, does not occur, thus making it possible to produce a toner with stability.

Addition of PHA to Toner

In the present invention, the method for adding the above compound to a toner may be a method of internal addition to the toner and a method of external addition to the toner. The addition amount of the internal addition is generally 0.1 to 50% by weight, preferably 0.3 to 30% by weight, and further preferably 0.5 to 20% by weight as the weight ratio of the toner binder and the charge controlling agent. If it is lower than 0.1% by weight, the improvement degree of the charging property of the toner is insignificant and thus not preferable. Whereas, if it is higher than 50% by weight, it is not preferably from an economical point of view. Further, in the case of the external addition, the weight ratio of the toner binder and the charge controlling agent is preferably 0.01 to 5% by weight, and it is particularly preferable that the compound is mechanochmically fixed on the surface of the toner. In addition, the compound presented in the present invention may be used in combination of a known charge controlling agent.

The number average molecular weight of the above-described compound of the present invention is usually 1000 to 500000, preferably 1000 to 300000. If it is less than 1000, the compound is completely compatible with the toner binder to make it difficult to form a discontinuous domain, resulting in an insufficient charge level, and the fluidity of the toner is adversely affected. Further, if it is higher than 500000, dispersion in the toner becomes difficult.

The molecular weight of the compound presented in the present invention was measured by GPC (gel permeation chromatography). For the specific method of measurement by GPC, a sample obtained by dissolving the compound presented in the present invention in dimethylformamide (DMF) containing 0.1% by weight of LiBr was measured with a similar mobile phase in advance, and the molecular-weight distribution was determined from a calibration curve of standard polystyrene resin.

In addition, in the present invention, compounds presented in the present invention with the ratio (Mw/Mn) of the weight average molecular weight (Mw) to the number average molecular weight (Mn) measured as described above being in the range of from 1 to 10 are preferably used.

The compound presented in the present invention has a melting point preferably in the range of from 20 to 150° C., especially preferably from 40 to 150° C., or has no melting point but a glass transition temperature in the range of from 20 to 150° C., especially preferably from 40 to 150° C. If the foregoing melting point is lower than 20° C. or the glass transition temperature with no melting point is lower than 20° C., the fluidity and the storage property of the toner are often adversely affected. Whereas if the foregoing melting point is higher than 150° C. or the glass transition temperature with no melting point is higher than 150° C., the charge controlling agent becomes difficult to be kneaded with the toner and the charge level distribution becomes broad in many cases.

To measure the melting point Tm and the glass transition temperature Tg in this case, a high precision and internally heating input compensation type differential scanning calorimeter, for example, DSC-7 manufactured by Perkin Elmer Co., may be employed.

Regarding the toner binder and the electrostatic latent image developing toner of the present invention, the weight ratio of the toner binder and the charge controlling agent is generally 0.1 to 50% by weight, preferably 0.3 to 30% by weight, and more preferably 0.5 to 20% by weight. Regarding the composition ratio of the electrostatic latent image developing toner of the present invention, generally the foregoing charge controlling agent is in the range of from 0.1 to 50% by weight, the toner binder is in the range of from 20 to 95% by weight, and a coloring material is in the range of from 0 to 15% by weight with respect to the weight of the toner and based on the necessity, a magnetic powder (a powder of a ferromagnetic metal such as iron, cobalt, nickel and the like and a compound such as magnetite, hematite, ferrite and the like) functioning as a coloring material may be added in an amount not more than 60% by weight. Further, various additives [a lubricant (polytetrafluoroethylene, a lower molecular weight polyolefin, an aliphatic acid or its metal salt or amide, and the like) and other charge controlling agents (metal-containing azo dye, metal salcylate, etc.)] may be contained. In addition, in order to improve the fluidity of the toner, a hydrophobic colloidal silica fine powder may also be employed. The amounts of these additives are generally not more than 10% by weight on the bases of the toner weight.

In the toner of the present invention, it is preferable for at least some of the toner binder to form a continuous phase and at least some of the charge controlling agent to form discontinuous domain. As compared with the case where the charge controlling agent has complete compatibility with the toner binder without forming the discontinuous domain, the added charge controlling agent is easily exposed to the surface and effective even in a small amount. The dispersion particle diameter of the domain is preferably 0.01 to 4 $\mu$m and more preferably 0.05 to 2 $\mu$m. If it is bigger than 4 $\mu$m, the dispersibility becomes insufficient and the charge level distribution becomes broad and the transparency of the toner is deteriorated. Whereas, if the dispersion particle diameter is smaller than 0.01 $\mu$m, it becomes similar to the case where the charge controlling agent has complete compatibility with the binder without forming discontinuous domain, a large amount of the charge controlling agent is required to be added. That at least some of the foregoing charge controlling agent forms the discontinuous domain and the dispersion particle size can be observed by observing a specimen of the toner with a transmission electron microscope. In order clearly observe the interface, it is also effective to carry out observation of a toner specimen by electron microscope after the specimen is dyed with ruthenium tetraoxide, osmium tetraoxide and the like.

Further, for the purpose of reducing the particle diameter of the discontinuous domain formed by the compound presented in the present invention, a polymer compatible with the compound presented in the present invention and also with the toner binder may be added as a compatible agent. The compatibility enhancing agent is, among other things, a polymer comprising mutually graft- or block-polymerized polymer chains containing at least 50% by mol of monomers having practically similar structure to that of the constituent monomers of the compound presented in the present invention and polymer chains containing at least 50% by mol of monomers having practically similar structure to that of the toner binder. The amount of the compatible agent to be used is generally not more than 30% by weight and preferably 1 to 10% by weight, with respect to the compound presented in the present invention.

Other Constituent Materials

Other constituent materials constituting the electrostatic latent image developing toner of the present invention will be described below.

Binder Resin

At first, any resin may be used as the binder resin without any particular restrictions if it is generally used for production of a toner. Also, the charge controlling agent of the present invention may previously be mixed with the binder resin to be used as a toner binder composition of the present invention having charge controlling capability before production of the toner. For example, as the binder resin, styrene-based polymers, polyester-based polymers, epoxy-based polymers, polyolefin-based polymers, and polyurethane-based polymers, and the like can be exemplified and they are used alone or while being mixed with one another.

The styrene-based polymers may be styrene-(meth) acrylic acid ester copolymers and copolymers of these copolymers with other monomers copolymerizable with them; copolymers of styrene with diene type monomers (butadiene, isoprene and the like) and copolymers of these copolymers with other monomers copolymerizable with them; and the like. The polyester-based polymers may be condensation polymerization products of aromatic dicarboxylic acid and aromatic diol alkylene oxide addition products and the like. The epoxy-based polymers may be reaction products of aromatic diols and epichlorohydrin and their modified products. The polyolefin-based polymers may be polyethylene, polypropylene, and copolymer chains of these polymers with monomers polymerizable with them. The polyurethane-based- polymers may be addition polymerization products of aromatic diisocyanates and aromatic diol alkylene oxide addition products and the like.

Practical examples of the binder resin to be employed in the present invention are polymers of the following polymerizable monomers or their mixtures or copolymerization products produced from two or more kinds of the following polymerizable monomers. Such polymers are more particularly, for example, styrene-based polymers such as styrene-acrylic acid copolymer, styrene-methacrylic acid copolymer, and the like; polyester-based polymers; epoxy-based polymers; polyolefin-based polymers; and polyurethane-based polymers and they are preferably used.

Practical examples of the polymerizable monomers are styrene and its derivatives such as styrene, o-methylstyrene, m-methylstyrene, p-methylstyrene, p-methoxystyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, and the like; ethylenic unsaturated monoolefins such as ethylene, propylene, butylene, isobutylene and the like; unsaturated polyenes such as butadiene and the like; vinyl halides such as vinyl chloride, vinylidene chloride, vinyl bromide, vinyl fluoride and the like; vinyl esters such as vinyl acetate, vinyl propionate, vinyl benzoate and the like; α-methylene aliphatic monocarboxylic acid esters such as methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate, diethylaminoethyl methacrylate, and the like; acrylic acid esters such as methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate, phenyl acrylate, and the like; vinyl ethers such as vinyl methyl ether, vinyl ethyl ether, vinyl isobutyl ether, and the like; vinyl ketones such as vinyl methyl ketone, vinyl hexyl ketone, methyl isopropenyl ketone, and the like; N-vinyl compounds such as N-vinylpyrrole, N-vinylcarbazole, N-vinylindole, N-vinylpyrrolidone and the like; vinyl naphthalenes; acrylic acid or methacrylic acid derivatives such as acrylonitrile, methacrylonitrile, acrylamide and the like; the above-described α, β-unsaturated acid esters; bibasic acid diesters; dicarboxylic acids such as maleic acid, methyl maleate, butyl maleate, dimethyl maleate, phthalic acid, succinic acid, terephthalic acid, and the like; polyols compounds such as ethylene glycol, diethylene glycol, triethylene glycol, 1,2-propylene glycol, 1,3-propylene glycol, 1,4-butanediol, 1,6-hexanediol, bisphenol A, hydrogenated bisphenol A, polyoxyethylene-modified bisphenol A and the like; isocyanates such as p-phenylene diisocyanate, p-xylylene diisocyanate, 1,4-tetramethylene diisocyanate, and the like; amines such as ethylamine, butylamine, ethylenediamine, 1,4-diaminobenzene, 1,4-diaminobutane, monoethanolamine, and the like; epoxy compounds such as diglycidyl ether, ethylene glycol diglycidyl ether, bisphenol A glycidyl ether, hydroquinone glycidyl ether, and the like.

Cross-Linking Agent

In the case of producing the binder resin to be employed in the present invention, based on the necessity, the following cross-linking agent may be used. Examples of a bifunctional cross-linking agent are divinylbenzene, bis(4-acryloxypolyethoxyphenyl)propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, respective diacrylates of polyethylene glycol #200, #400, #600, dipropylene glycol diacrylate, polypropylene glycol diacrylate, polyester type diacrylate, and those obtained by changing these exemplified acrylates into corresponding methacrylates.

Examples of bi- or higher polyfunctional cross-linking agent are pentaerythritol triacrylate, trimethylolethane triacrylate, trimethylolpropane triacrylate, tetramethylolmethane tetraacrylate, oligoester acrylates or methacrylates, 2,2-bis(4-methacryloxy polyethoxyphenyl)propane, diallyl phthalate, triallyl cyanurate, triallyl azocyanurate, triallyl isocyanurate, triallyl trimellitate, diaryl chlorendate, and the like.

Polymerization Initiator

In the case of producing the binder resin to be employed for the present invention, the following polymerization initiators may be used based on the necessity: for example, tert-butyl peroxy-2-ethylhexanoate, cumine perpivalate, tert-butyl peroxylaurate, benzoyl peroxide, lauroyl peroxide, octanoyl peroxide, di-tert-butyl peroxide, tert-butylcumyl peroxide, dicumyl peroxide, 2,2'-azobis isobutyronitrile, 2,2'-azobis(2-methylbutyronitrile), 2,2'-azobis(2,4-dimethylvaleronitrile), 2,2'-azobis(4-methoxy-2,4-dimethylvaleronitrile), 1,1-bis(tert-butylperoxy)-3,3,5-trimethylcyclohexane, 1,1-bis(tert-butylperoxy) cyclohexane, 1,4-bis(tert-butylperoxycarbonyl) cyclohexane, 2,2-bis(tert-butylperoxy)octane, n-butyl 4,4-bis(tert-butylperoxy)valerate, 2,2-bis(tert-butylperoxy) butane, 1,3-bis(tert-butylperoxyisopropyl)benzene, 2,5-dimethyl-2,5-di(tert-butylperoxy)hexane, 2,5-dimethyl-2,5-di(benzoylperoxy)hexane, di-tert-butyldiperoxy isophthalate, 2,2-bis(4,4-di-tert-butylperoxycyclohexyl) propane, di-tert-butylperoxy-α-methylsuccinate, di-tert-butyl peroxydimethylglutarate, di-tert-butyl peroxyhexahydroterephthalate, di-tert-butyl peroxyazelate, diethylene glycol bis(tert-butylperoxycarbonate), di-tert-butyl peroxytrimethyladipate, tris(tert-butylperoxy)triazine, vinyltris(tert-butylperoxy)silane and the like. Each of these compounds may be used alone or in combination. The use amount of them is generally in 0.05 parts by weight or more (preferably 0.1 to 15 parts by weight) to 100 parts by weight of monomers.

Other Biodegradable Plastics

In addition, in the present invention, biodegradable plastics are preferably used. Examples of the biodegradable plastics are "Ecostar", "Ecostar plus" (produced by Hagiwara Industries, Inc.), "Biopole" (produced by Monsanto Co.,Ltd.), "Ajicoat" (Ajinomoto Co., Ltd.), "Placcel", "Polycaprolactone" (produced by Daicel Chem., Ind., Ltd.), "Bionolle" (produced by Showa Koubunnsi K. K.), "Lacty" (produced by Shimadzu Corporation), "Lacea" (produced by Mitsui Chemicals, Inc.) and the like.

It is preferable for the combinations of the binder resin and the charge controlling agent of the present invention that the structure of the polymers of the binder resin and the polymer structure of the polymer chain of the charge controlling agent are similar to each other as much as possible. If the structure of the polymers of the binder resin and the polymer structure of the polymer chain of the charge controlling agent are considerably dissimilar to each other, the charge controlling agent tends to be dispersed insufficiently in the binder resin.

The weight ratio of the charge controlling agent of the present invention to be internally added to the binder resin is generally 0.1 to 50% by weight, preferably 0.3 to 30% by weight, and more preferably 0.5 to 20% by weight. If the weight ratio of the charge controlling agent to be internally added is lower than 0.1% by weight, the charge level becomes low and if the weight ratio is higher than 50% by weight, the charge stability of the toner is deteriorated.

Coloring Agent

Any coloring agent generally used for production of a toner may be used as the coloring agent composing the electrostatic latent image developing toner of the present invention without particular restrictions. For example, carbon black, titanium white, and any other pigment and/or dye may be used. For example, in the case the electrostatic latent image developing toner of the present invention is used for a magnetic color toner, examples of the coloring agent to be employed are C.I. Direct Red 1, C.I. Direct Red 4, C.I. Acid Red 1, C.I. Basic Red 1, C.I. Mordant Red 30, C.I. Direct Blue 1, C.I. Direct Blue 2, C.I. Acid Blue 9, C.I. Acid Blue 15, C.I. Basic Blue 3, C.I. Basic Blue 5, C.I. Mordant Blue 7, C.I. Direct Green 6, C.I. Basic Green 4, C.I. Basic Green 6 and the like. Examples of the pigment are Chrome Yellow, Cadmium Yellow, Mineral Fast Yellow, Naval Yellow, Naphthol Yellow S, Hansa Yellow G, Permanent Yellow NCG, Tartrazine Yellow Lake, Chrome Orange, Molybednum Orange, Permanent Orange GTR, Pyrazolone Orange, Benzidine Orange G, Cadmium Red, Permanent Red 4R, Watching Red calcium salt, Eosine Lake, Brilliant Carmine 3B, Manganese Violet, Fast Violet B, Methyl Violet Lake, Prussian Blue, Cobalt Blue, Alkali Blue Lake, Victoria Blue Lake, Phthalocyanine Blue, Fast Sky Blue, Indanthrene Blue BC, Chrome Green, chromium oxide, Pigment Green B, Malachite Green Lake, Final Yellow Green G and the like.

In the case the electrostatic latent image developing toner of the present invention is used for a two-component type full color toner, the following coloring agents can be used. For example, coloring pigments for magenta toners are C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48, 49, 50, 51, 52, 53, 54, 55, 57, 58, 60, 63, 64, 68, 81, 83, 87, 88, 89, 90, 112, 114, 122, 123, 163, 202, 206, 207, 209, C.I. Pigment Violet 19, C.I. Vat Red 1, 2, 10, 13, 15, 23, 29, 35 and the like.

In the present invention, the above-exemplified pigments may be used alone, but it is more preferable that they are used in combination with dyes for improving the clearness from the aspect of the full color image quality. In such a case, the examples of usable magenta dyes are oil-soluble dyes such as C.I. Solvent Red 1, 3, 8, 23, 24, 25, 27, 30, 49, 81, 82, 83, 84, 100, 109, 121, C.I. Disperse Red 9, C.I. Solvent Violet 8, 13, 14, 21, 27, and C.I. Disperse Violet 1 and the like; and basic dyes such as C.I. Basic Red 1, 2, 9, 12, 13, 14, 15, 17, 18, 22, 23, 24, 27, 29, 32, 34, 35, 36, 37, 38, 39, 40, C.I. Basic Violet 1, 3, 7, 10, 14, 15, 21, 25, 26, 27, 28 and the like.

As other coloring pigments, examples of cyan coloring pigments are C.I. Pigment Blue 2, 3, 15, 16, 17, C.I. Vat Blue 6, C.I. Acid Blue 45, copper-phthalocyanine pigments having a phthalocyanine skeleton containing substituents of phthalimidomethyl groups in number of 1 to 5, and the like.

Examples of yellow coloring pigments are C.I. Pigment Yellow 1, 2, 3, 4, 5, 6, 7, 10, 11, 12, 13, 14, 15, 16, 17, 23, 65, 73, 83, C.I. Vat Yellow 1, 3, 20 and the like.

The above-described dyes and pigments may be used solely or may be used while being optionally mixed with one another to obtain desired hue of the toner. Incidentally, taking the environmental preservation and the safety to human being into consideration, a variety of edible coloring elements may preferably be used. The content of the coloring agents in the toner may widely altered depending on the desired coloration effects. Generally, in order to obtain the best toner properties, that is, in consideration of the printing coloration capability, the toner shape stability, and the toner leap, these coloring agents are used at a ratio in the range of from 0.1 to 60 parts by weight, preferably 0.5 to 20 parts by weight with respect to 100 parts by weight of the binder resin.

Other Components of Toner

In the electrostatic latent image developing toner of the present invention may contain the following compounds other than the foregoing binder resin and the coloring agent components, to an extent (within a ratio less than the content of the binder resin) in which no undesired effect is caused in the present invention. Examples of such compounds include silicone resin; polyester; polyurethane; polyamide; epoxy resin; poly(vinyl butyral); rosin; modified rosin; terpene resin; phenolic resin; aliphatic or alicyclic hydrocarbon resin such as lower molecular weight polyethylene and lower molecular weight polypropylene; aromatic type petroleum resin; and chlorinated paraffin and paraffin waxes. Among them, preferable waxes to be used are practically lower molecular weight polypropylene and its byproducts, lower molecular weight polyester, and ester type wax and aliphatic derivatives. Among these waxes, waxes separated based on the molecular weight of the waxes by various methods are also preferably used in the present invention. Further, after separation, the waxes may be modified to control the acid values, block-copolymerized, or graft-modified.

Specially, in the electrostatic latent image developing toner of the present invention, in the case such wax components as described above are added and these wax components are found practically dispersed in the binder resin in spherical and/or elliptical island state by cross-sectional observation of the toner by a transmission electron microscope, the toner is provided with excellent properties.

Method of Producing Toners

Any conventionally known method may be employed for a practical method for producing an electrostatic latent image developing toner of the present invention having the constitution as described above. The electrostatic latent image developing toner of the present invention can be produced, for example, by a so-called pulverization method for obtaining a toner through the following steps. Specifically, the compound presented in the present invention described previously, resin materials such as binder resin, and a wax to be added as necessary are sufficiently mixed by a mixer such as a Henshel mixer, a ball mill and the like and then melted and kneaded using a thermally kneading apparatus such as heating rolls, a kneader, an extruder and the like to make the resin material compatible with one another, and as coloring agents, pigments, dyes, or magnetic materials and also additives such as metal compounds to be added as necessary are dispersed or dissolved in the resulting mixture, and after solidification of the mixture by cooling, the obtained solidified product is pulverized by a pulverizing apparatus such as a jet mill, a ball mill and the like and then classified to obtain an electrostatic latent image developing toner of the present invention with a desired particle size. In the above-described classification step, from an aspect of productivity, a multi-step classification apparatus is preferably used.

In addition, the electrostatic latent image developing toner of the present invention with a desired particle size can be obtained by mixing and stirring the binder resin and the compound of the present invention in a solvent (e.g., aromatic hydrocarbons such as toluene, xylene and the like; halogen compounds such as chloroform, ethylene dichloride, and the like; ketones such as acetone, methyl ethyl ketone, and the like; amides such as dimethylformamide and the like), and then adding the resulting mixture to water to re-precipitate the solid, then filtering and drying the solid, and further pulverizing it by a pulverizing apparatus such as a jet mill, a ball mill, and the like, and finally classifying the pulverized matter. In the above-described classification step, from an aspect of productivity, a multi-step classification apparatus is preferably used.

In addition, the electrostatic latent image developing toner of the present invention can be produced by a so-called polymerization method as follows. That is, in this case, the compound of the present invention, a polymerizable monomer, and as coloring agents, pigments, dyes, or magnetic materials and also based on the necessity, additives such as a cross-linking agent, a polymerization initiator, waxes, and others are mixed and dispersed and in the presence of a surfactant or the like, the mixture is subjected to suspension polymerization to obtain a polymerizable and coloring resin particle, and after the obtained particle is separated by solid-liquid separation, the particle is dried and classified if necessary to obtain an electrostatic latent image developing toner of the present invention with a desired particle size.

Furthermore, a coloring fine particle containing no charge controlling agent is produced by the above-described manner and then either solely or together with an externally added agent such as colloidal silica, the compound presented in the present invention may be stuck and added to the surface of the particle by a mechanochemical method or the like.

Externally Added Silica Agent

In the present invention, a silica fine powder is preferably added externally to the toner produced in a manner as described above for improving the charge stability, development characteristic, fluidity and durability. The silica fine powder to be employed in this case can provide desirable effects if it has a specific surface area equal to or larger than 20 $m^2/g$ or higher (especially 30 to 400 $m^2/g$) measured based on the nitrogen adsorption by BET method. The content of the silica fine powder to be added is preferably 0.01 to 8 parts by weight, more preferably 0.1 to 5 parts by weight, with respect to 100 parts by weight of the toner particle. In this case, based on the necessity, the silica fine powder to be used in the case is preferably treated for the purpose of controlling the hydrophobicity and charging property with silicone varnish, variously modified silicone varnish, silicone oil, variously modified silicone oil, a silane coupling agent, a silane coupling agent having a functional group, and other organosilicon compounds. These treatment agent may be used by mixing.

Inorganic Powder

Further, in order to improve the development capability and the durability, the following inorganic powder is preferably added. Examples of the powder are oxides of metals such as magnesium, zinc, aluminum, cerium, cobalt, iron, zirconium, chromium, manganese, strontium, tin, antimony and the like; compounded metal oxides such as calcium titanate, magnesium titanate, and strontium titanate; metal salts such as calcium carbonate, magnesium carbonate, and aluminum carbonates; clay minerals such as kaolin; phosphate compounds such as apatite; silicon compounds such as silicon carbide, and silicon nitride; and carbon powder such as carbon black and graphite. Among them, fine powders of zinc oxide, aluminum oxide, cobalt oxide, manganese dioxide, strontium titanate, and magnesium titanate are preferably used.

Lubricant

Further, the following lubricant powder may be added to the toner. For example, fluoro resin such as Teflon, poly (vinylidene fluoride) and the like; fluoride compounds such as carbon fluoride; aliphatic acid metal salts such as zinc stearate; aliphatic acid derivatives such as aliphatic acid, aliphatic acid esters and the like; and molybdenum sulfide.

Carrier

The electrostatic latent image developing toner of the present invention having the above-described constitution is usable for a variety of conventionally known toners; solely as a non-magnetic mono-component developer, as a non-magnetic toner together with a magnetic carrier for composing a magnetic two-component developer, as a magnetic toner to be used solely for a magnetic mono-component toner. In this case, as the carrier to be used in the case of the two-component development, any conventionally known carrier may be used. More particularly, particles of surface-oxidized or non-oxidized metals such as iron, nickel, cobalt, manganese, chromium and rare earth metals, their alloys and oxides and having an average particle size of 20 to 300 $\mu$m may be used as the carrier particle. Further, the carrier to be used in the present invention are preferably the above-described carrier particle whose surface bears or is coated with a substance such as styrene-based resin, acrylic resin, silicone resin, fluoro resin, polyester resin and the like.

Magnetic Toner

The electrostatic latent image developing toner of the present invention may be a magnetic toner by adding a magnetic material to the toner particle. In this case, the magnetic material may take a role also as a coloring agent. The magnetic material to be used in this case may be iron oxides such as magnetite, hematite, and ferrite; metals such as iron, cobalt, and nickel; alloys of these metals with metals such as aluminum, cobalt, copper, lead, magnesium, tin, zinc, antimony, beryllium, bismuth, cadmium, calcium, manganese, selenium, titanium, tungsten, and vanadium; and their mixtures. The magnetic material to be used in the present invention has an average particle size preferably 2 $\mu$m or less, more preferably 0.1 to 0.5 $\mu$m. The amount to be added to the toner is preferably 20 to 200 parts by weight to 100 parts by weight of the binder resin and especially preferably 40 to 150 parts by weight to 100 parts by weight of the binder resin.

In addition, in order to give high image quality, it is required to precisely develop very small latent image dots and for this purpose, for example, it is preferable that the weight average particle size of the electrostatic latent image developing toner of the present invention is controlled so that it is in the range of from 4 to 9 $\mu$m. That is, if the toner particle has a weight average particle size smaller than 4 $\mu$m, the transfer efficiency is decreased and a large amount of the transfer residual toner tends to remain on a photoconductor to result in an undesirable cause of uneven and irregular image formation attributed to fogging and transfer failures. Whereas, if the toner particle has a weight average particle size larger than 9 $\mu$m, letters and line images tend to be eliminated.

In the present invention, the average particle size and the particle size distribution of the toner are measured by using Coulter Counter TA-II model or Coulter Multisizer (manufactured by Coulter Co.) or the like to which an interface (manufactured by Nikka Machine Co.) for outputting the distribution by number, the distribution by volume and a PC9801 personal computer (manufactured by NEC) are connected. As an electrolytic solution to be used at that time, an aqueous 1% NaCl solution is prepared using first-grade sodium chloride. As the electrolytic solution, for example, a commercialized ISOTON R-II (produced by Coulter Scientific Japan Co.) may also be usable. A practical measurement method involves steps of adding 0.1 to 5 ml of a surfactant (preferably an alkylbenzenesulfonic acid salt is used) as a dispersant to 100 to 150 ml of the above-described aqueous solution, further adding 2 to 20 mg of a sample to the resulting solution to obtain a specimen to be measured. At the time of measurement, the electrolytic solution in which the specimen to be measured is suspended is treated for dispersion for 1 to 3 minutes by an ultrasonic dispersing apparatus and then the volume and the number of the toner particles of 2 $\mu$m or larger are measured by the foregoing Coulter Counter TA-II model using 100 $\mu$m apertures as apertures and the distribution by volume and the distribution by number are calculated. Then, the weight average particle size (D4) on the bases of the volume calculated from the distribution by volume according to the present invention and the length average particle size (D1) on the bases of the number calculated from the distribution by number are calculated.

Charge Level

In addition, the charge level of the electrostatic latent image developing toner of the present invention is preferably in the range of from −10 to −80 $\mu$C/g, more preferably from −15 to −70 $\mu$C/g per unit weight (two-component method) in improving the transfer efficiency in a transfer method using a transfer member with a voltage applied thereto.

Figure 7:
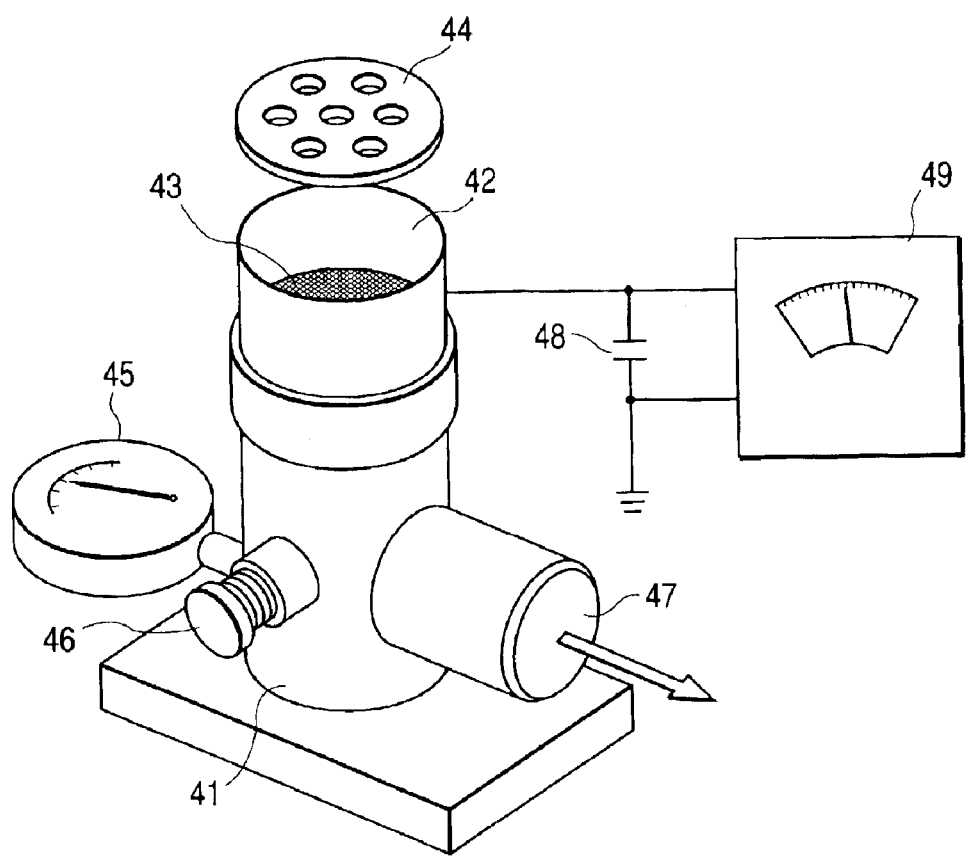
FIG. 7 is a schematic view showing a blow-off charge level measuring apparatus for measuring the charge level of the toner.

The method of measuring an charge level (a two-component tribo) by the two-component method employed in the present invention will be described as follows. A charge level measuring apparatus illustrated in FIG. 7 is used for the measurement. At first, under a specified environment, EFV 200/300 (produced by Powder Tec Co.) is used as a carrier and a bottle made of a polyethylene with a capacity of 50 to 100 ml is charged with a mixture of 9.5 g of the carrier and 0.5 g of a toner, an object to be measured, set in a shaking apparatus so controlled as to keep the amplitude constant, and shaken for a prescribed period in the shaking conditions of an amplitude of 100 mm and a shaking speed of 100 time reciprocation per 1 minute. Then, 1.0 to 1.2 g of the above mixture is placed in a measurement container 42 made of metal having a 500-mesh screen 43, and the measurement container 42 is covered with a metal lid 44 in the bottom of the charge level measuring apparatus shown in FIG. 7. The total weight of the measurement container 42 at that time is measured and determined as W1 (g). Next, the gas in the container is aspirated through a suction port 47 by an unillustrated aspirator (at least the portion contacting the measurement container 42 is made of an insulator) and an air ventilation adjustment valve 46 is controlled to control the pressure of the vacuum meter 45 to be 2,450 Pa (250 mmAq). Under such a state, aspiration is carried out for 1 minute to suck and remove the toner. The potential of a potentiometer 49 at that time is denoted as V (volt). The reference numeral 48 denotes a capacitor and the capacity is denoted as C ($\mu$F). The weight of the entire measurement container after the aspiration is weighed and denoted as W2 (g). The friction charge level ($\mu$C/g) of the toner can be calculated according to the following equation from these measurement values.

Friction charge level ($\mu$C/g)=C×V/(W1−W2)

Molecular Weight Distribution of Binder Resin

The binder resin for use in the constituent material of the electrostatic latent image developing toner of the present invention preferably has a peak within the range of from 3,000 to 15,000 in a low molecular weight region of the molecular weight distribution measured by GPC, especially, in the case of production by the pulverization method. That is, if the GPC peak exceeds 15,000 in the low molecular weight region, it sometimes becomes difficult to obtain a toner with a sufficiently improved transfer efficiency. Whereas if binder resin having a GPC peak of less than 3,000 is used, melting takes place easily at the time of surface treatment and therefore it is undesirable.

In the present invention, the molecular weight of the binder resin is measured by GPC (gel permeation chromatography). A practical GPC measurement method is carried out as follows: a toner previously extracted with THF (tetrahydrofuran) solvent for 20 hours using a Soxhlet extractor is used as a sample for measurement and using columns A-801, 802, 803, 804, 805, 806, and 807 manufactured by Showa Denko K.K. and calibration curves of standardized polystyrene resins, the molecular weight distribution is measured. Further, in the present invention, it is preferable that the binder resin with the ratio (Mw/Mn) of the weight average molecular weight (Mw) to the number average molecular weight (Mn) measured as described above being in the range of from 2 to 100 is used.

Glass Transition Temperature of Toner

Further, the toner of the present invention is preferably adjusted by using a proper material so as to have a glass transition temperature Tg in the range of from 40 to 75° C., more preferably 52 to 70° C., from a viewpoint of fixation and storage stability. In this case, the measurement of the glass transition temperature Tg may be carried out using a high precision and internally heating input compensation type differential scanning calorimeter, for example, DSC-7 manufactured by Perkin Elmer Co., may be employed. The measurement method is carried out according to ASTM D3418-82. In the present invention, in the case of measuring the glass transition temperature Tg, it is preferable that a measurement sample is once heated to cancel the entire hysteresis and then quenched and again heated at a heating rate of 10° C./min to employ the DSC curve measured during the heating from 0 to 200° C.

Image Formation Method

The electrostatic latent image developing toner of the present invention having the configuration described above is particularly preferably applied to an image formation method comprising at least an charging step of applying a voltage to a charge member from the outside to charge an electrostatic latent image carrier, a step of forming an electrostatic latent image on the charged electrostatic latent image carrier, a development step of developing the electrostatic latent image by the toner to form a toner image on the electrostatic latent image carrier, a transfer step of transferring the toner image on the electrostatic latent image carrier to an object recording material, and a heat-fixation step of heat-fixing the toner image on the object recording material, or an image formation method with the transfer step consisting of a first transfer step of transferring the toner image on the electrostatic latent image carrier to an intermediate transfer body and a second transfer step of transferring the toner image on the intermediate transfer body to the object recording material.

As described above, the present invention provides an innovative polyhydroxyalkanoate having units each selected from the group consisting of the following formulas (1), (2), (3) and (4) as units each having a substituted phenyl structure on the side chain.

This innovative polyhydroxyalkanoate can be produced by chemically transforming a PHA type polyester, as a raw material, having 3-hydroxy-ω-(4-vinylphenyl) alkanoic acid units expressed by formula (5), produced by microorganisms. Even after the chemical transformation, the steric configuration in its chiral carbon is the same as that of the raw material PHA expressed by formula (5) and all takes a form of the R body, and thus the innovative polyhydroxyalkanoate retains biodegradability without suffering degradation in its processability caused by disturbance of stereo isomerism, and maintains its place as a useful material.

In addition, according to the present invention, addition of one or more types of compounds presented in the present invention to an electrostatic latent image developing toner composition as a charge controlling agent makes it possible to provide an electrostatic latent image developing toner having an excellent electrifiability, improving the dispersibility of the compound in the toner resin and the spent characteristic thereof, causing no image fog even when the image is outputted in the image forming apparatus, and being excellent in transferability and highly applicable to an electrophotographic process. In addition, because the charge controlling agent for use in the present invention is colorless or only weakly colored, any coloring agent can be selected according to the color required for the color toner, and the original color of a dye or pigment is not hindered. In addition, the electrostatic latent image developing toner of the present invention has a high level of safety, and it involves no combustion process owing to its biodegradability, and therefore provides a significant effect from an industrial viewpoint in terms of preservation of environments such as prevention of air pollution and global warming.

The present invention will more specifically be described below with Examples. These Examples represent one example of most preferred embodiments, but the present invention should not be limited such Examples.

REFERENCE EXAMPLE 1

A culture medium containing 5-(4-vinylphenyl) valeric acid as a unit of formula (30) and 5-phenyl valeric acid as a unit of formula (31), and having polypeptone added thereto as one of peptides was prepared in accordance with the procedure described below. 5.0 g of polypeptone (Wako Pure Chemicals Industries, Ltd.) and 0.9 g of 5-phenyl valeric acid were dissolved in 1000 mL of the M9 culture medium, were put in a 2000 mL shaking flask, and were sterilized by an autoclave. After they were subjected to the heat sterilization treatment, 0.2 g of 5-(4-vinylphenyl) valeric acid was added thereto and sufficiently stirred to prepare a culture medium.

A M9 culture medium containing 0.5% of polypeptone was seeded with Pseudomonas cichorii YN2, and was shaking-cultured at 30° C. for 8 hours to prepare a cell culture solution in advance. 5 mL of this culture solution was added to the above described culture medium containing 5-(4-vinylphenyl) valeric acid and 5-phenylvaleric acid as matrixes to culture the cells at 30° C. for 39 hours. After being cultured, the cells were collected by centrifugal separation and washed with methanol, and were thereafter freeze-dried.

After the weight of dried cells was measured, chloroform was added and stirred at 25° C. for 72 hours, thereby extracting a polymer accumulated in the cell. The chloroform with the extracted polymer dissolved therein was filtered. The chloroform filtrate was concentrated by an evaporator, followed by dissolving again the polymer in acetone and filtering away insoluble components. Then, the filtrate was concentrated by the evaporator, followed by collecting precipitated solid components with cold methanol and drying them under reduced pressure to collect a desired polymer. The dry weight of the polymer collected in the above described collection step was measured.

The structure of the collected polymer was determined by $^1$H-NMR (FT-NMR: Bruker DPX400; 1H resonance frequency: 400 MHz; measurement nuclear species: $^1$H; solvent used: $CDCl_3$; reference: capillary-encapsulated TMS/$CDCl_3$; measuring temperature: room temperature) to find that the polymer was a polyhydroxyalkanoate copolymer containing three types of units of the following chemical formula (42) in the content ratio (mol %) of A:B:C=9:77:14.

Chemical Formula (42)

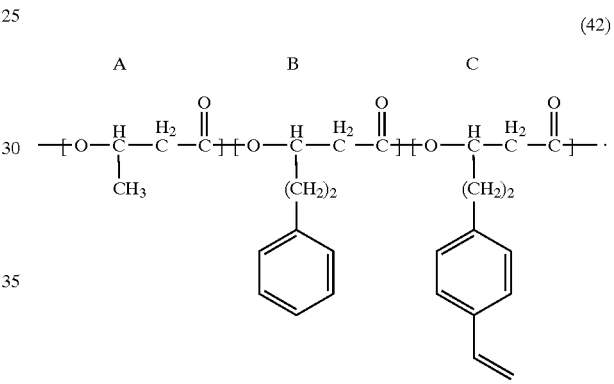

The average molecular weight of the polymer was measured by gel permeation chromatography (GPC) (Tosoh HLC-8220 GPC; column: Tosoh TSK-GEL SuperHM-H; solvent; chloroform; polystyrene equivalent).

The dry weight of cells obtained in the above step, the dry weight of the collected polymer, the ratio in weight of the collected polymer to dried cells, and the number average molecular weight, weight average molecular weight and molecular weight distribution of the obtained polymer are shown together.

CDW: dry weight of cells; 1205 (mg/L)
PDW: dry weight of polymer; 600 (mg/L)
P/C: PDW/CDW; 49.8(%)
$M_n$: number average molecular weight; 59000
$M_w$: weight average molecular weight; 121000
$M_w/M_n$: molecular weight distribution; 2.1

EXAMPLE 1

Thiolated 2-acrylamide-2-methylpropanesulfonic acid sodium salt of formula (43) was synthesized referring to Japanese Patent Application Laid-Open No. 05-155919, and was used for the following chemical reaction.

Chemical Formula (43)

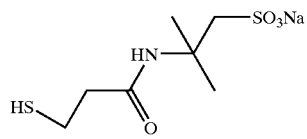

(43)

20 mL of N,N-dimethylformamide (DMF) and 0.2710 g of thiolated 2-acrylamide-2-methylpropanesulfonic acid sodium salt of formula (43) were put in a 200 mL four-necked flask and stirred for 30 minutes, followed by adding 0.1120 g of benzoil peroxide thereto and further stirring for 60 minutes. Then, 0.2010 g of polyester (obtained in reference Example 1) containing 3-hydroxy-5-(4-vinylphenyl) valeric acid units dissolved in 20 mL of DMF was gradually added, and was heated at 70° C. After 24 hours, the heating was stopped, the solution was cooled down to a room temperature, a small amount of water was added thereto, and thereafter the solution was reprecipitated in diethyl ether. The obtained polymer was dried under reduced pressure and washed with water, and components insoluble in water were dried under reduced pressure.

The structure of the obtained polymer was analyzed by Fourier transform infrared absorption (FT-IR) spectra (Nicolet AV ATAR360 FT-IR). As a result, an additional absorption derived from an amid bond was found at 1672 $cm^{-1}$, and it was therefore determined that the obtained PHA had a 2-acrylamide-2-methylpropanesulfonic acid structure.

Also, by $^1$H-NMR (FT-NMR: Bruker DPX400; resonance frequency: 400 MHz; measurement nuclear species: 1H; solvent used: DMSO-d6; measuring temperature: room temperature), peaks derived from the polyester structure and the 2-acrylamide-2-methylpropanesulfonic acid structure.

From the results, it was found that the obtained polymer was a polyhydroxyalkanoate type polyester having 3-hydroxy-5-phenylvaleric acid units with the 2-acrylamide-2-methylpropanesulfonic acid sodium salt structure added thereto, expressed by the following chemical formula (44). Chemical Formula (44)

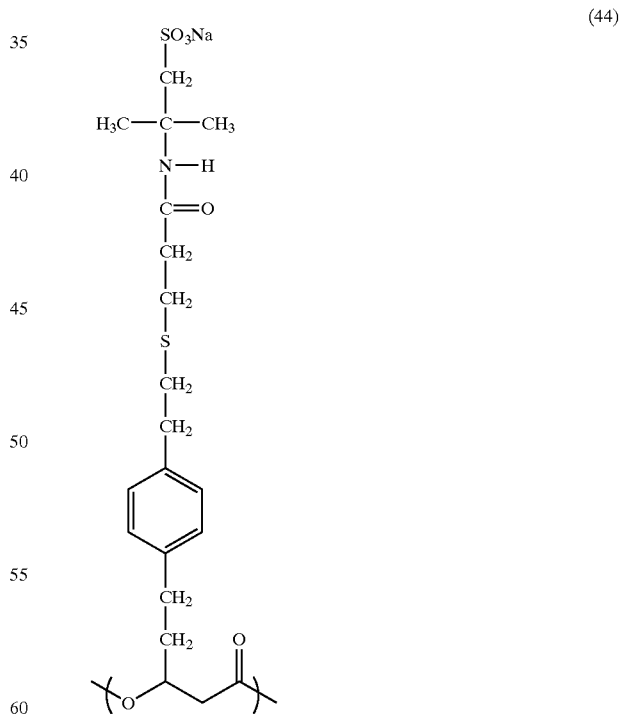

(44)

The sample obtained here was a sample ①.

EXAMPLE 2

0.4820 g of polyester (obtained in Reference Example 1) containing 3-hydroxy-5-(4-vinylphenyl) valeric acid units, 0.1990 g of 2-acrylamide-2-methylpropanesulfonic acid and 8 mL of N,N-dimethylformamide (DMF) were put in a 50 mL flask and stirred under the presence of nitrogen. 0.0404 g of 2,2'-azobis(2-methylpropionitrile) was added thereto, and was heated at 60° C. The obtained polymer was purified by Soxhlet extraction using water and chloroform. The obtained polymer was analyzed by Fourier transform infrared absorption (FT-IR) spectra (Nicolet AVATAR360 FT-IR) and as a result, an additional absorption derived from an amide bond was found at 651 $cm^{-1}$.

From the results, it was found that the obtained polymer was a polyhydroxyalkanoate type polyester having 3-hydroxy-5-phenylvaleric acid units with the 2-acrylamide-2-methylpropanesulfonic acid structure grafted, expressed by the following chemical formula (45) (theoretical polymerization degree of 2-acrylamide-2-methylpropanesulfonic acid, i.e. r in the formula is 2).

Chemical Formula (45)

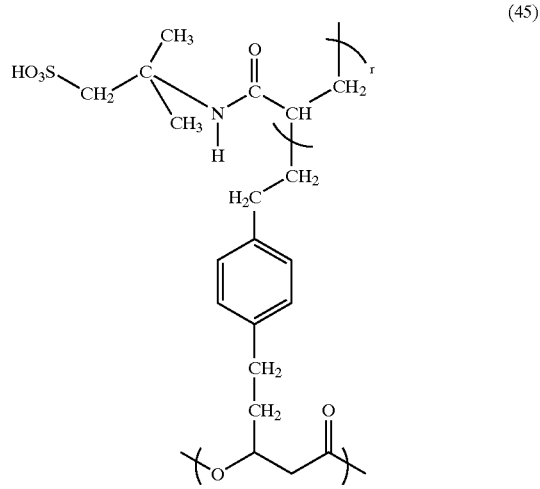

The sample obtained here was a sample ②.

For the samples obtained in Examples 1 and 2, the molecular weight was measured by GPC (gel permeation chromatography) The GPC conditions are as follows: apparatus: Tosoh HLC-8020; column: Polymer Laboratory PLgel MIXED-C (5 μm)×2; mobile phase solvent: DMF containing 0.1% by weight of LiBr; polystyrene equivalent. The molecular weight of each sample is shown in Table 1.

TABLE 1

| | Molecular weight of obtained polymer | | |
|---|---|---|---|
| | $M_n$ | $M_w$ | $M_w/M_n$ |
| Sample (1) | 51000 | 91800 | 1.8 |
| Sample (2) | 72000 | 151200 | 2.1 |

$M_n$: number average molecular weight,
$M_w$: weight average molecular weight

The compounds (samples (1) and (2)) were used in Example 31 and the following Examples as exemplary compounds (1) and (2), respectively.

Then, charge controlling agents produced in the same manner as Examples 1 and 2 by methods selected from those of the present invention were used to produce various kinds of toners, and the toners were evaluated (Examples 3 to 30).

EXAMPLE 3

First, an aqueous $Na_3PO_4$ solution was added in a 2 liter four-necked flask equipped with a high-speed stirring apparatus TK-Homomixer, and was heated at 60° C. with the number of rotations kept at 10,000 rpm. An aqueous $CaCl_2$ solution was slowly added therein to prepare a water based dispersing medium containing a very small low-water solubility dispersant $Ca_3(PO_4)_2$.

On the other hand, the following compositions were dispersed for 3 hours using a ball mill, followed by adding therein 10 parts by weight of release agent (ester wax) and 10 parts by weight of 2,2'-azobis(2,4-dimethylvaleronitrile) as a polymerization initiator to prepare a polymerizable monomer composition.

| | |
|---|---|
| styrene monomer | 82 parts by weight |
| ethylhexyl acrylate monomer | 18 parts by weight |
| divinylbenzene monomer | 0.1 parts by weight |
| cyan coloring agent (C.I. Pigment Blue 15) | 6 parts by weight |
| oxidized polyethylene resin (molecular weight 3200, acid number 8) | 5 parts by weight |
| exemplary compound (1) | 2 parts by weight |

Then, the polymerizable monomer composition obtained as described above was put in the water based dispersant prepared previously to form particles with the number of rotations being kept at 10,000 rpm. Thereafter, the composition was made to undergo a reaction at 65° C. for 3 hours while being stirred with a paddle stirring blade, and was thereafter polymerized at 80° C. for 6 hours to complete the polymerization reaction. After the reaction was completed, the suspension was cooled, and an acid was added therein to dissolve the low-water solubility dispersant $Ca_3(PO_4)_2$, followed by filtering, rinsing and drying the solution to obtain blue polymerized particles (1). The particle size of the obtained blue polymerized particles (1) measured using Coulter Counter Multisizer (manufactured by Coulter Co.) was 7.2 μm (weight average particle size), and the ratio of fines (the existence ratio of particles with the size of 3.17 μm or smaller in the number distribution) was 5.6% by number.

As a fluidity improver, 1.3 parts by weight of hydrophobic silica fine powder (BET: 270 $m^2/g$) treated with hexamethyl disilazane were externally added to 100 parts by weight of blue polymerized particles (1) prepared as described above through dry-mixing by a Henshel mixer, whereby a blue toner (1) of this Example was obtained. In addition, 7 parts by weight of blue toner (1) were mixed with 93 parts by weight resin-coated magnetic ferrite carrier (average particle size: 45 μm) to prepare a two-component type blue developer (1) for magnetic brush development.

EXAMPLE 4

A blue toner (2) of Example 4 was obtained in the same manner as Example 3 except that 2.0 parts by weight of exemplary compound (2) were used in place of the exemplary compound (1). The properties of the toner were measured in the same manner as Example 3, and the results thereof are shown in Table 2. In addition, a two-component type blue developer (2) was obtained in the same manner as Example 3 using this toner.

COMPARATIVE EXAMPLE 1

A blue toner (3) of Comparative Example 1 was obtained in the same manner as Example 3 except that no exemplary compound was used. The properties of this toner were measured in the same manner as Example 3, and the results thereof are shown in Table 2. In addition, a two-component type blue developer (3) of Comparative Example 1 was obtained in the same manner as Example 3 using this toner.

Evaluation

For the two-component type blue developers (1), (2) obtained in the Examples 3, 4 and the two-component type blue developer (3) obtained in the Comparative Example 1, the charge levels of toners after stirring for 10 and 300 seconds were measured under conditions of normal temperature and normal humidity (25° C., 60% RH) and high temperature and high humidity (30° C., 80% RH) using the previously described method of measuring charge levels. Then, measurement values of two-component blow-off charge levels were rounded off to the first decimal place and resultant values were evaluated according to the following criteria. The results are shown together in Table 2.

Electrifiability
A: Excellent (−20 μC/g or lower)
B: Good (−19.9 to −10.0 μC/g)
C: Usable (−9.9 to −5.0 μC/g
D: Unusable (−4.9 μC/g or higher

TABLE 2

Electrification characteristic of blue toners (1), (2)

| | | | Particle size distribution | | Electrifiability | | | |
|---|---|---|---|---|---|---|---|---|
| | | | | | Normal temperature and normal humidity | | High temperature and high humidity | |
| | | | Weight | Ratio of | (Q/M) | | (Q/M) | |
| Examples | Number in Table 1 | Toners Number: Blue | average particle size (m) | fines (% by number) | Stirring for 10 seconds | Stirring for 300 seconds | Stirring for 10 seconds | Stirring for 300 seconds |
| 3 | 1 | 1 | 7.2 | 5.6 | A | A | A | A |
| 4 | 2 | 2 | 7.3 | 5.7 | A | A | A | A |
| Comparative Example 1 | — | 3 | 7.0 | 5.2 | D | D | D | D |

EXAMPLES 5, 6

Yellow toners (1), (2) of Examples 5, 6 were obtained in the same manner as Example 3 except that 2.0 parts by weight of exemplary compounds (1), (2) were used, and a yellow coloring agent (Hansa yellow G) was used in place of the cyan coloring agent. The properties of these toners were measured in the same manner as Example 3, and the results thereof are shown in Table 3. In addition, two-component type yellow developers (1), (2) were obtained in the same manner as Example 3 using these toners.

COMPARATIVE EXAMPLE 2

A yellow toner (3) of Comparative Example 2 was obtained in the same manner as Example 3 except that no charge controlling agent was used and that the yellow coloring agent (Hansa yellow G) was used in place of the cyan coloring agent. The properties of this toner were measured in the same manner as Example 3, and the results thereof are shown in Table 3. In addition, a two-component type yellow developer (3) of Comparative Example 2 was obtained in the same manner as Example 3 using this toner.

Evaluation

For the two-component type yellow developers (1), (2) obtained in the Examples 5, 6 and the two-component type yellow developer (3) obtained in the Comparative Example 2, the charge levels of toners after stirring for 10 and 300 seconds were measured under conditions of normal temperature and normal humidity (25° C., 60% RH) and high temperature and high humidity (30° C., 80% RH) using the previously described method of measuring charge levels. Then, measurement values of two-component blow-off charge levels were rounded off to the first decimal place and resultant values were evaluated according to the following criteria. The results are shown together in Table 3.

Electrifiability
A: Excellent (−20 μC/g or lower)
B: Good (−19.9 to −10.0 μC/g)
C: Usable (−9.9 to −5.0 μC/g)
D: Unusable (−4.9 μC/g or higher)

TABLE 3

Electrification characteristic of yellow toners (1), (2)

| | | | Particle size distribution | | Electrifiability | | | |
|---|---|---|---|---|---|---|---|---|
| | | | | | Normal temperature and normal humidity | | High temperature and high humidity | |
| | | | Weight | Ratio of | (Q/M) | | (Q/M) | |
| Number | Toners | average | fines | | Stirring | Stirring | Stirring | Stirring |

| Examples | in Table 1 | Number: Yellow | particle size (m) | (% by number) | for 10 seconds | for 300 seconds | for 10 seconds | for 300 seconds |
|---|---|---|---|---|---|---|---|---|
| 5 | 1 | 1 | 7.2 | 5.5 | A | A | A | A |
| 6 | 2 | 2 | 7.5 | 5.7 | A | A | A | A |
| Comparative Example 2 | — | 3 | 7.2 | 4.9 | D | D | D | D |

EXAMPLES 7, 8

Black toners (1), (2) of Examples 7, 8 were obtained in the same manner as Example 3 except that 2.0 parts by weight of exemplary compounds (1), (2) were used, and a carbon black (DBP oil absorption 110 mL/100 g) was used in place of the cyan coloring agent. The properties of these toners were measured in the same manner as Example 3, and the results thereof are shown in Table 4. In addition, two-component type black developers (1), (2) were obtained in the same manner as Example 3 using these toners.

COMPARATIVE EXAMPLE 3

A black toner (3) of Comparative Example 3 was obtained in the same manner as Example 3 except that no exemplary compound was used, and that the carbon black (DBP oil absorption 110 mL/100 g) was used in place of 20 the cyan coloring agent. The properties of this toner were measured in the same manner as Example 3, and the results thereof are shown in Table 4. In addition, a two-component type black developer (3) of Comparative Example 3 was obtained in the same manner as Example 3 using this toner.

Evaluation

For the two-component type black developers (1), (2) obtained in the Examples 7, 8 and the two-component type black developer (3) obtained in the Comparative Example 3, the charge levels of toners after stirring for 10 and 300 seconds were measured under conditions of normal temperature and normal humidity (25° C., 60% RH) and high temperature and high humidity (30° C., 80% RH) using the previously described method of measuring charge levels. Then, measurement values of two-component blow-off charge levels were rounded off to the first decimal place and resultant values were evaluated according to the following criteria. The results are shown together in Table 4.

Electrifiability

A: Excellent (−20 $\mu$C/g or lower)
B: Good (−19.9 to −10.0 $\mu$C/g)
C: Usable (−9.9 to −5.0 $\mu$C/g)
D: Unusable (−4.9 $\mu$C/g or higher)

TABLE 4

Electrification characteristic of black toners (1), (2)

| | | | Particle size distribution | | Electrifiability | | | |
|---|---|---|---|---|---|---|---|---|
| | | | | | Normal temperature and normal humidity (Q/M) | | High temperature and high humidity (Q/M) | |
| Examples | Number in Table 1 | Toners Number: Black | Weight average particle size (m) | Ratio of fines (% by number) | Stirring for 10 seconds | Stirring for 300 seconds | Stirring for 10 seconds | Stirring for 300 seconds |
| 7 | 1 | 1 | 7.1 | 5.3 | A | A | A | A |
| 8 | 2 | 2 | 7.2 | 5.4 | A | A | A | A |
| Comparative Example 3 | — | 3 | 6.9 | 5.3 | D | C | D | C |

EXAMPLE 9

| | |
|---|---|
| stylene-butylacrylate copolymer resin (glass transition temperature 70° C.) | 100 parts by weight |
| magenta pigment (C.I. Pigment Red 114) | 5 parts by weight |
| exemplary compound (1) | 2 parts by weight |

The above described compositions were mixed, and were melt-kneaded by a biaxial extruder (L/D=30). The resulting mixture was cooled, was thereafter roughly ground by a hammer mill and finely ground by a jet mill, and was thereafter classified to obtain magenta coloring particles (1) by a grinding method. For the particle size of the magenta coloring particles (1), the weight average particle size was 7.0 μm and the ratio of fines was 5.2% by number.

As a fluidity improver, 1.5 parts by weight of hydrophobic silica fine powder (BET: 250 m²/g) treated with hexamethyl disilazane were dry-mixed with 100 parts by weight of the magenta coloring particles (1) by a Henshel mixer, whereby a magenta toner (1) of this Example was obtained. In addition, 7 parts by weight of the resulting magenta toner (1) were mixed with 93 parts by weight resin-coated magnetic ferrite carrier (average particle size: 45 μm) to prepare a two-component type magenta developer (1) for magnetic brush development.

EXAMPLE 10

Magenta toner (2) of Example 10 was obtained in the same manner as Example 9 except that 2.0 parts by weight of exemplary compound (2) was used in place of exemplary compound (1). The properties of this toner were measured in the same manner as Example 3, and the results thereof are shown in Table 5. In addition, two-component type magenta developer (2) was obtained in the same manner as Example 9 using this toner.

COMPARATIVE EXAMPLE 4

A magenta toner (3) of Comparative Example 4 was obtained in the same manner as Example 9 except that no exemplary compound was used. The properties of this toner were measured in the same manner as Example 5, and the results thereof are shown in Table 5. In addition, a two-component type magenta developer (3) of Comparative Example 4 was obtained in the same manner as Example 9 using this toner.

Evaluation

For the two-component type magenta developers (1), (2) obtained in the Examples 9, 10 and the two-component type magenta developer (3) obtained in the Comparative Example 4, the charge levels of toners after stirring for 10 and 300 seconds were measured under conditions of normal temperature and normal humidity (25° C., 60% RH) and high temperature and high humidity (30° C., 80% RH) using the previously described method of measuring charge levels. Then, measurement values of two-component blow-off charge levels were rounded off to the first decimal place and resultant values were evaluated according to the following criteria. The results are shown together in Table 5.

Electrifiability

A: Excellent (−20 μC/g or lower)
B: Good (−19.9 to −10.0 μC/g)
C: Usable (−9.9 to −5.0 μC/g)
D: Unusable (−4.9 μC/g or higher)

TABLE 5

Electrification characteristic of magenta toners (1), (2)

| Examples | Number in Table 1 | Toners Number: Red | Particle size distribution Weight average particle size (m) | Particle size distribution Ratio of fines (% by number) | Electrifiability Normal temperature and normal humidity (Q/M) Stirring for 10 seconds | Electrifiability Normal temperature and normal humidity (Q/M) Stirring for 300 seconds | Electrifiability High temperature and high humidity (Q/M) Stirring for 10 seconds | Electrifiability High temperature and high humidity (Q/M) Stirring for 300 seconds |
|---|---|---|---|---|---|---|---|---|
| 9 | 1 | 1 | 7.0 | 5.2 | A | A | A | A |
| 10 | 2 | 2 | 7.3 | 5.2 | A | A | A | A |
| Comparative Example 4 | — | 3 | 7.1 | 5.1 | D | C | D | C |

(Magenta toner is described as red here.)

EXAMPLES 11, 12

Black toners (4), (5) of Examples 11, 12 were obtained in the same manner as Example 9 except that 2.0 parts by weight of exemplary compounds (1), (2) were used, and a carbon black (DBP oil absorption 110 mL/100 g) was used in place of the magenta pigment. The properties of these toners were measured in the same manner as Example 3, and the results thereof are shown in Table 6. In addition, two-component type black developers (4), (5) were obtained in the same manner as Example 9 using these toners.

COMPARATIVE EXAMPLE 5

A black toner (6) of Comparative Example 5 was obtained in the same manner as Example 9 except that no exemplary compound was used, and that the carbon black (DBP oil absorption 110 mL/100 g) was used in place of the magenta pigment. The properties of this toner were measured in the same manner as Example 3, and the results thereof are shown in Table 6. In addition, a two-component type black developer (6) of Comparative Example 5 was obtained in the same manner as Example 9 using this toner.

Evaluation

For the two-component type black developers (4), (5) obtained in the Examples 11, 12 and the two-component type black developer (6) obtained in the Comparative Example 5, the charge levels of toners after stirring for 10 and 300 seconds were measured under conditions of normal temperature and normal humidity (25° C., 60% RH) and high temperature and high humidity (30° C., 80% RH) using the previously described method of measuring charge levels. Then, measurement values of two-component blow-off charge levels were rounded off to the first decimal place and resultant values were evaluated according to the following criteria. The results are shown together in Table 6.

Electrifiability

A: Excellent (−20 µC/g or lower)
B: Good (−19.9 to −10.0 µC/g)
C: Usable (−9.9 to −5.0 µC/g)
D: Unusable (−4.9 µC/g or higher)

TABLE 6

Electrification characteristic of black toners (4), (5)

| Examples | Number in Table 1 | Toners Number: Black | Particle size distribution Weight average particle size (m) | Particle size distribution Ratio of fines (% by number) | Electrifiability Normal temperature and normal humidity (Q/M) Stirring for 10 seconds | Electrifiability Normal temperature and normal humidity (Q/M) Stirring for 300 seconds | Electrifiability High temperature and high humidity (Q/M) Stirring for 10 seconds | Electrifiability High temperature and high humidity (Q/M) Stirring for 300 seconds |
|---|---|---|---|---|---|---|---|---|
| 11 | 1 | 4 | 7.1 | 5.2 | A | A | A | A |
| 12 | 2 | 5 | 7.4 | 5.2 | B | A | A | A |
| Comparative Example 5 | — | 6 | 7.0 | 5.7 | D | C | D | D |

EXAMPLE 13

| | |
|---|---|
| polyester resin | 100 parts by weight |
| carbon black (DBP absorption 110 ml/100 g) | 5 parts by weight |
| exemplary compound (1) | 2 parts by weight |

The polyester resin was synthesized as follows: 751 parts of bisphenol A propylene oxide 2 mol adduct, 104 parts of terephtalic acid and 167 parts of trimellitic anhydride were poly-condensed with two parts of dibutyltin oxide as a catalyst to obtain a polyester resin having a softening point of 125° C.

The above described compositions were mixed, and were melt-kneaded by a biaxial extruder (L/D=30). The resulting mixture was cooled, was thereafter roughly ground by a hammer mill and finely ground by a jet mill, and was thereafter classified to obtain black coloring particles (7) by a grinding method. For the particle size of the black coloring particles (7), the weight average particle size was 8.0 μm and the ratio of fines was 4.6% by number.

As a fluidity improver, 1.5 parts by weight of hydrophobic silica fine powder (BET: 250 m$^2$/g) treated with hexamethyl disilazane were dry-mixed with 100 parts by weight of the black coloring particles (7) by a Henshel mixer to obtain a black toner (7) of this example. In addition, seven parts of the resulting black toner (7) were mixed with 93 parts by weight resin-coated magnetic ferrite carrier (average particle size: 45 μm) to prepare a two-component type black developer (7) for magnetic brush development.

EXAMPLE 14

Black toner (8) of Example 14 was obtained in the same manner as Example 13 except that 2.0 parts by weight of exemplary compound (2) was used in place of exemplary compound (1). The properties of this toner were measured in the same manner as Example 3, and the results thereof are shown in Table 7. In addition, two-component type black developer (8) was obtained in the same manner as Example 13 using this toner.

COMPARATIVE EXAMPLE 6

A black toner (9) of Comparative Example 6 was obtained in the same manner as Example 13 except that no exemplary compound was used. The properties of this toner were measured in the same manner as Example 3, and the results thereof are shown in Table 7. In addition, a two-component type black developer (9) of Comparative Example 6 was obtained in the same manner as Example 13 using this toner.

Evaluation

For the two-component type black developers (7), (8) obtained in the Examples 13, 14 and the two-component type black developer (9) obtained in the Comparative Example 6, the charge levels of toners after stirring for 10 and 300 seconds were measured under conditions of normal temperature and normal humidity (25° C., 60% RH) and high temperature and high humidity (30° C., 80% RH) using the previously described method of measuring charge levels. Then, measurement values of two-component blow-off charge levels were rounded off to the first decimal place and resultant values were evaluated according to the following criteria. The results are shown together in Table 7.

Electrifiability

A: Excellent (−20 μC/g or lower)
B: Good (−19.9 to −10.0 μC/g)
C: Usable (−9.9 to −5.0 μC/g)
D: Unusable (−4.9 μC/g or higher)

TABLE 7

Electrification characteristic of black toners (7), (8)

| | | | Particle size distribution | | Electrifiability | | | |
|---|---|---|---|---|---|---|---|---|
| | | | | | Normal temperature and normal humidity (Q/M) | | High temperature and high humidity (Q/M) | |
| Examples | Number in Table 1 | Toners Number: Black | Weight average particle size (m) | Ratio of fines (% by number) | Stirring for 10 seconds | Stirring for 300 seconds | Stirring for 10 seconds | Stirring for 300 seconds |
| 13 | 1 | 7 | 8.0 | 4.6 | A | A | A | A |
| 14 | 2 | 8 | 7.8 | 4.9 | A | A | A | A |
| Comparative Example 6 | — | 9 | 7.5 | 4.9 | D | C | D | C |

EXAMPLES 15 TO 26 AND COMPARATIVE EXAMPLES 7 TO 12

First, an image forming apparatus used in the image formation methods of Examples 15 to 26 and Comparative Examples 7 to 12 will be described. FIG. 1 is a schematic explanatory view of the cross section of an image forming apparatus for carrying out the image formation methods of Examples and Comparative Examples of the present invention. A photoconductor drum 1 shown in FIG. 1 has a photosensitive layer 1a having an organic photo semiconductor on a substrate 1b, and is configured to rotate in the direction indicated by the arrow, and its surface is electrically charged at a potential of about −600 V by a charge roller 2 being a charge member situated opposite to the photoconductor drum 1 and contacting and rotating with the drum. As shown in FIG. 1, the charge roller 2 has a cored bar 2b covered with a conductive elastic layer 2a.

Figure 2:
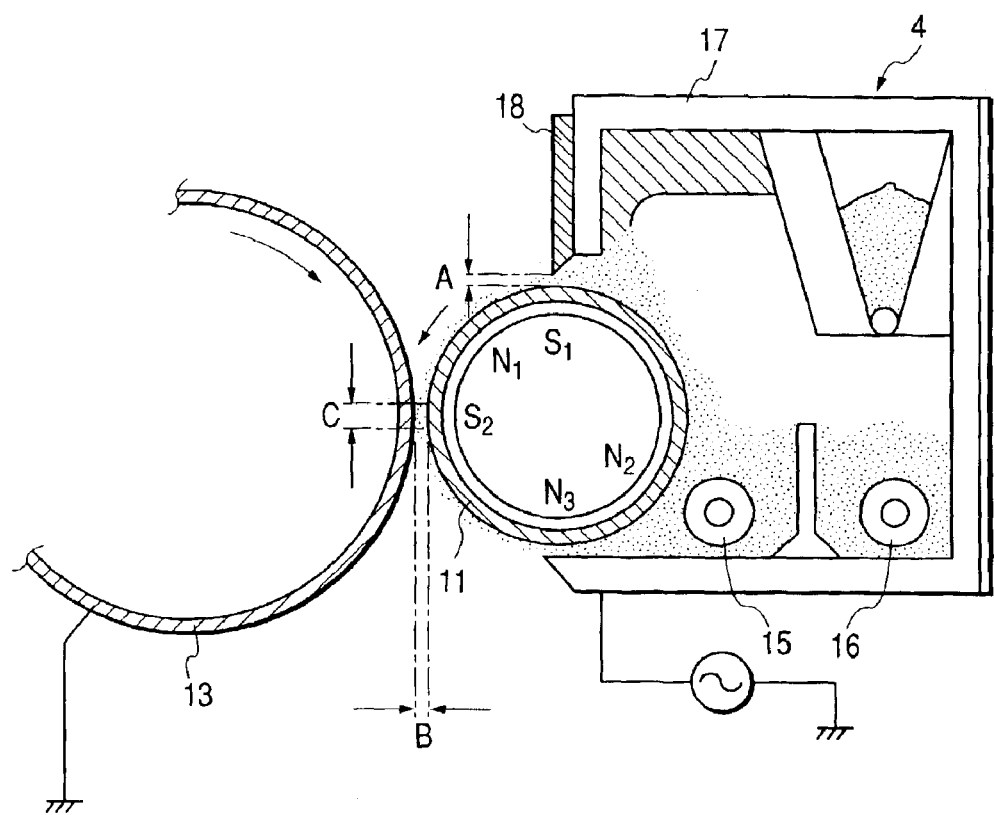
FIG. 2 is a sectional view of a principal part of a development apparatus for a two-component developer used in Examples 15 to 26 and Comparative Examples 7 to 12.

Next, the photoconductor drum 1 with its surface electrically charged is exposed to light 3 and at this time, on/off operations are performed on the photoconductor by a polygon mirror according to digital image information, whereby an electrostatic latent image with the potential of the exposed area being −100 V and the potential of the dark area being −600 V is formed. Subsequently, this electrostatic latent image on the photoconductor drum 1 is reverse-developed and thereby actualized using a plurality of development apparatuses 4-1, 4-2, 4-3 and 4-4, and thus a toner image is formed on the photoconductor drum 1. At this time, the two-component type developers obtained in Examples 3 to 14 and Comparative Examples 1 to 6 were respectively used as developers to form a toner image with a yellow toner, a magenta toner, a cyan toner or a black toner. FIG. 2 is an enlarged sectional view of principal parts of development apparatuses 4 for two-component type developers used at that time.

Then, the toner image on the photoconductor drum 1 is transferred to an intermediate transfer body 5 contacting and rotating with the photoconductor drum 1. As a result, a four-color color combination developed image is formed on the intermediate transfer body 5. A non-transferred toner remaining on the photoconductor drum 1 without being transferred is collected in a container 9 for residual toners by a cleaner member 8.

The intermediate transfer body 5 is constituted by a cored bar 5b as a support and an elastic layer 5a provided thereon as shown in FIG. 1. In this Example, the intermediate body 5 having the cored bar 5b coated with the elastic layer 5a with a carbon black as a conductivity producer sufficiently dispersed in nitrile-butadiene rubber (NBR) was used. The degree of hardness of the elastic layer 5a measured in accordance with "JIS K-6301" was 30 degrees, and the volume resistivity was $10^9$ Ω·cm. The level of transfer current required for transferring the image from the photoconductor drum 1 to the intermediate transfer body 5 is about 5 µA, and this level of current was obtained by adding a voltage of +500 V to the cored bar 5b.

The four-color toner color combination latent image formed on the intermediate transfer body 5 is transferred to an object transferring material such as a paper by a transfer roller 7, and is thereafter fixed by a heat apparatus H. The transfer roller 7 is provided thereon the core metal 7b with the outside diameter of 10 mm on which an elastic layer 7a is formed by coating of a foam of ethylene-propylene-diene based tridimensional copolymer (EPDM) dispersing carbon sufficiently therein as a conductivity producing material. The layer had a volume specific resistance of $10^6$ Ω·cm and a hardness degree of 35° as measured in accordance with "JIS K-6301". In addition, a voltage was applied to this transfer roller 7 to pass a transfer current of 15 µA therethrough.

Figure 5:
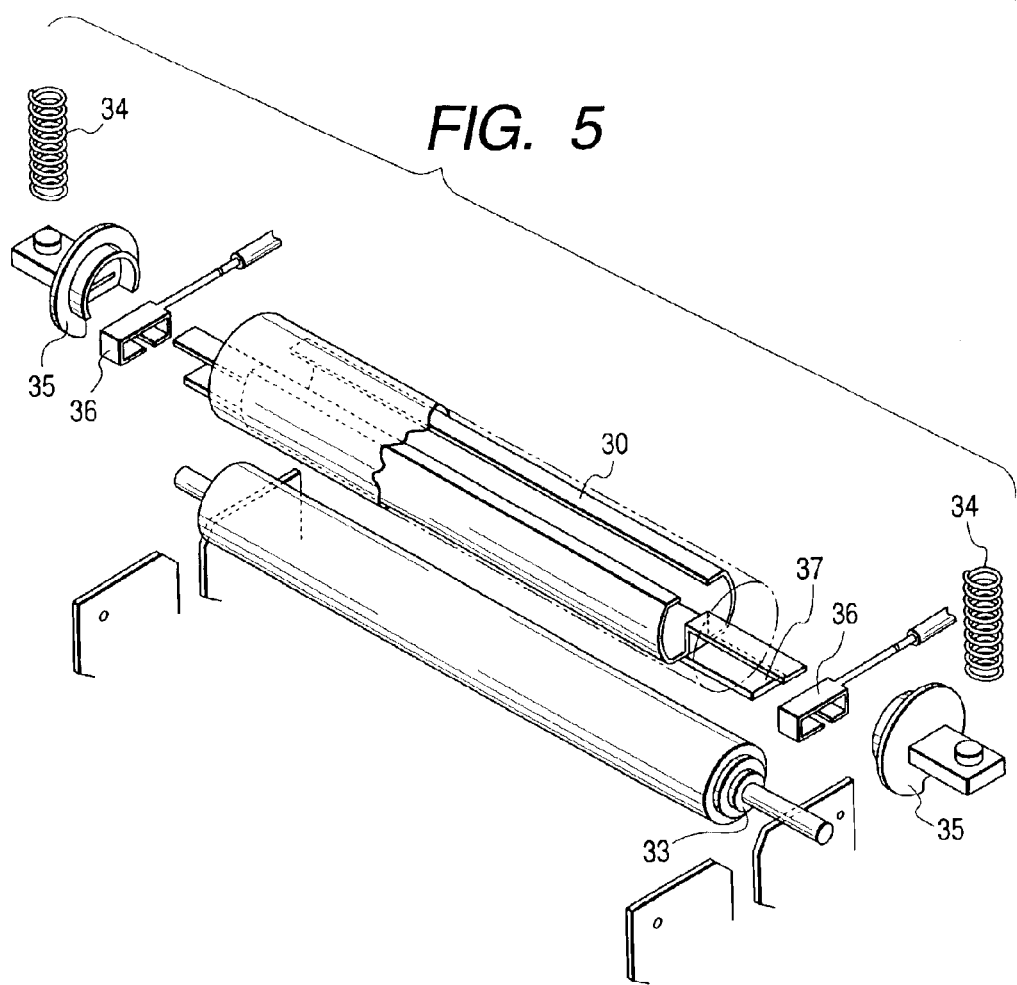
FIG. 5 is an exploded perspective view of a principal part of a fixation apparatus used in the Example of the present invention.
Figure 6:
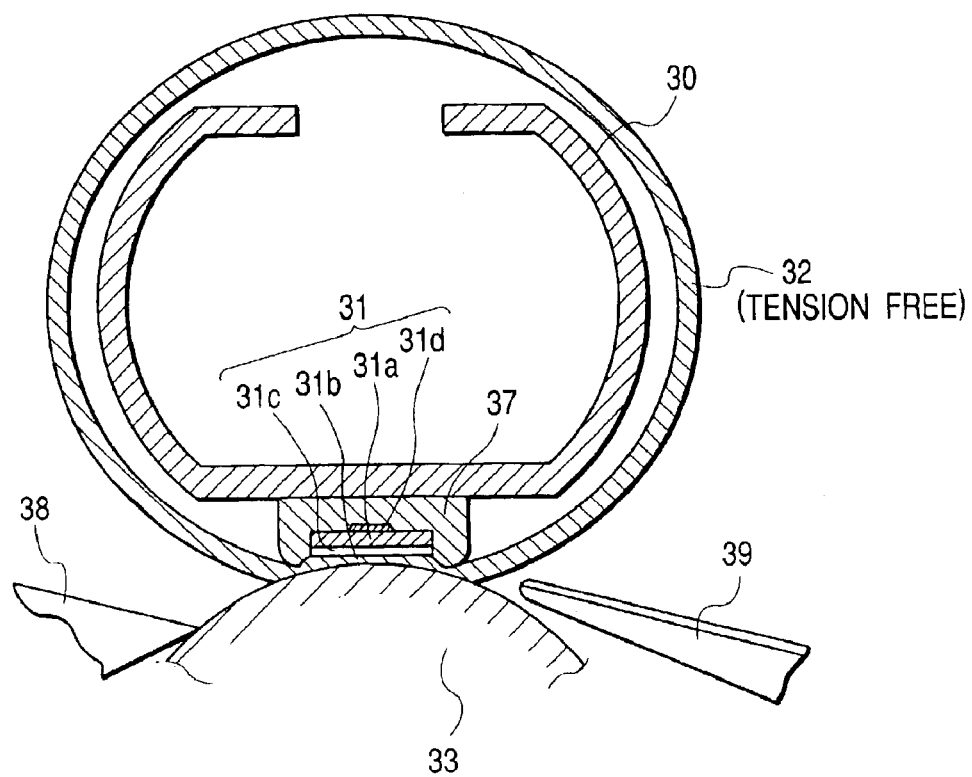
FIG. 6 is an enlarged sectional view of a principal part showing a film state of the fixation apparatus used in the Example of the present invention at the time when it is not driven.

In the apparatus shown in FIG. 1, a fixation apparatus of heated roll type having no oil coating mechanism shown in FIGS. 5 and 6 was used in the fixation apparatus by heat. The both upper and lower rollers of the fixation apparatus used here had surface layers made of fluorine based resin. In addition, the diameter of the roller was 60 mm. The fixation temperature for fixation was 160° C., and the nipping width was set at 7 mm. Furthermore, a transfer residual toner on the photoconductor drum 1, which was collected by cleaning, was transported to a developing device by a reuse mechanism for reuse.

Evaluation

Two-component type developers produced using the toners of Examples 3 to 14 and two-component type developers produced using toners of Comparative Examples 1 to 6 were used, respectively, to perform printout testing at a printout rate of 8 sheets (A4 size) per minute while the developer was supplied one after another in a monochromatic intermittent mode (namely a mode in which the developing device is stopped for 10 seconds for each printout to accelerate the degradation of a toner in a preliminary operation during restart of the device) at a normal temperature and normal humidity (25° C., 60% RH) and a high temperature and high humidity (30° C., 80% RH) under the conditions described above, and resulting printout images were evaluated for the following items. The evaluation results are shown together in Table 8.

Evaluation of Printout Images
1. Image Density

Images were printed out on a predetermined number of normal copying papers (75 g/m$^2$), and the image density was evaluated according to the level at which the density of the image from the final printout was retained with respect to the density of the initial image. Furthermore, for the measurement of image density, a Macbeth reflective densitometer (manufactured by Macbeth Co., Ltd.) was used to measure a density relative to that of the printout image on a white ground with the density of original copy equal to 0.00.

A: Excellent (image density from the final printout is 1.40 or greater)
B: Good (image density from the final printout is 1.35 or greater and lower than 1.40)
C: Usable (image density from the final printout is 1.00 or greater and lower than 1.35)
D: Unusable (image density from the final printout is lower than 1.00)

2. Image Fog

Images were printed out on a predetermined number of normal copying papers (75 g/m$^2$), and the image fog was evaluated with a solid white image from the final printout. Specifically, the evaluation was made as follow: the worst value of the reflective density of the white ground after printing and the average reflective density of the paper before printing, as measured using a reflective densitometer (Reflectometer ODEL TC-6DS manufactured by Tokyo Denshoku Co., Ltd.), were defined as DS and Dr, respectively, (Ds–Dr) was calculated from these values as a fog level to make an evaluation according to the following criterion.

A: Excellent (fog level is 0% or higher and lower than 1.5%)
B: Good (fog level is 1.5% or higher and lower than 3.0%)
C: Usable (fog level is 3.0% or higher and lower than 5.0%)
D: Unusable (fog level is 5.0% or higher)

3. Transferability

Solid black images were printed out on a predetermined number of normal copying papers (75 g m$^2$), and the image dislocation level of the image from the final printout was visually observed to make an evaluation according to the following criterion.

A: Excellent (almost not observed)
B: Good (slightly observed)
C: Usable
D: Unusable In addition, in Examples 15 to 26 and Comparative Examples 7 to 12, occurrences of scares and sticking residual toners on the surfaces of the photoconductor drum and intermediate transfer body, and their influence on printout images (matching with the image forming apparatus) were visually evaluated after 5000 images were outputted, and as a result, scars and sticking residual toners on the surfaces of the photoconductor drum and intermediate transfer body were not observed, and thus matching with the image forming apparatus was excellent for the system using two-component type developers of Examples 15 to 26. For the system using two-component type developers of Comparative Examples 7 to 12, on the other hand, sticking toners were observed on the surface of the photoconductor drum in all cases. In addition, for the system using two-component type developers of Comparative Examples 7 to 12, not only sticking toners and surface scars could be observed on the surface of the intermediate transfer body but also longitudinally striped defects occurred on the image. Accordingly, there was a problem in matching with image formation apparatus.

TABLE 8

Evaluation result of printout image

| Examples | Two-component type developer | Normal temperature and normal humidity | | | High temperature and high humidity | | |
|---|---|---|---|---|---|---|---|
| | | Image density | Image fog | Transferability | Image density | Image fog | Transferability |
| Example | | | | | | | |
| 15 | Blue 1 | A | A | A | A | A | A |
| 16 | Blue 2 | A | A | A | A | A | A |
| 17 | Yellow 1 | A | A | A | A | A | A |
| 18 | Yellow 2 | A | A | A | A | A | A |
| 19 | Black 1 | A | A | A | A | A | A |
| 20 | Black 2 | A | A | A | A | A | A |
| 21 | Red 1 | A | A | A | A | A | A |
| 22 | Red 2 | A | A | A | A | A | A |
| 23 | Black 4 | A | A | A | A | A | A |
| 24 | Black 5 | A | A | A | A | A | A |
| 25 | Black 7 | A | A | A | A | A | A |
| 26 | Black 8 | A | A | A | A | A | A |
| Comparative Example | | | | | | | |
| 7 | Blue 3 | D | D | D | D | D | D |
| 8 | Yellow 3 | D | D | D | D | D | D |
| 9 | Black 3 | C | C | D | C | D | D |
| 10 | Red 3 | C | C | D | C | D | D |
| 11 | Black 6 | C | C | D | D | D | D |
| 12 | Black 9 | C | C | D | C | D | D |

(Magenta toner is described as red here.)

EXAMPLES 27 TO 29 AND COMPARATIVE EXAMPLES 13 TO 15

Figure 3:
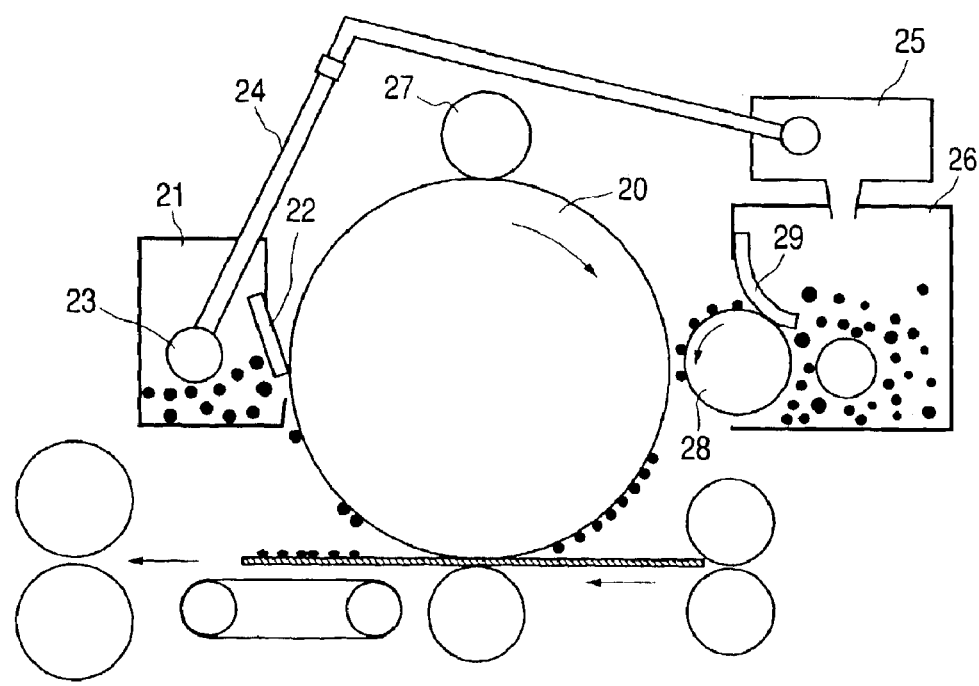
FIG. 3 is a schematic explanatory view having a reuse mechanism of a toner used in Examples 27 to 29 and Comparative Examples 13 to 15.

For carrying out the image formation methods of Examples 27 to 29 and Comparative Examples 13 to 15, the toners obtained in Examples 3, 5 and 7 and Comparative examples 1 to 3 were used, respectively, as developers. In addition, for means for forming an image, an image forming apparatus with a commercially available laser beam printer LBP-EX (manufactured by Canon Inc.) modified so that it was provided with a reuse mechanism and reset as shown in FIG. 3 was used. That is, the image forming apparatus shown in FIG. 3 is provided with a system in which a non-transferred toner remaining on the photoconductor drum 20 after the transfer process is scraped off by an elastic blade 22 of a cleaner 21 abutting against the photoconductor drum 20, then sent into the cleaner 21 by a cleaner roller, passed through a cleaner reuse 2, and returned to the development device 26 via a hopper 25 by a supply pipe 24 with a carrier screw mounted thereon, and the toner collected in this way is reused.

In the image forming apparatus shown in FIG. 3, the surface of the photoconductor drum 20 is electrically charged by a primary charge roller 27. A rubber roller (diameter 12 mm, abutment pressure 50 g/cm) coated with a nylon resin and having conductive carbon dispersed therein was used for the primary charge roller 27, and an electrostatic latent image with a dark area potential VD of −700 V and a light area potential VL of −200 V was formed on the electrostatic latent image carrier (photoconductor drum 20) by laser exposure (600 dpi, not shown). As a toner carrier, a development sleeve 28 having a roughness degree Ra of 1.1 with the surface coated with a resin having a carbon black dispersed therein was used.

Figure 4:
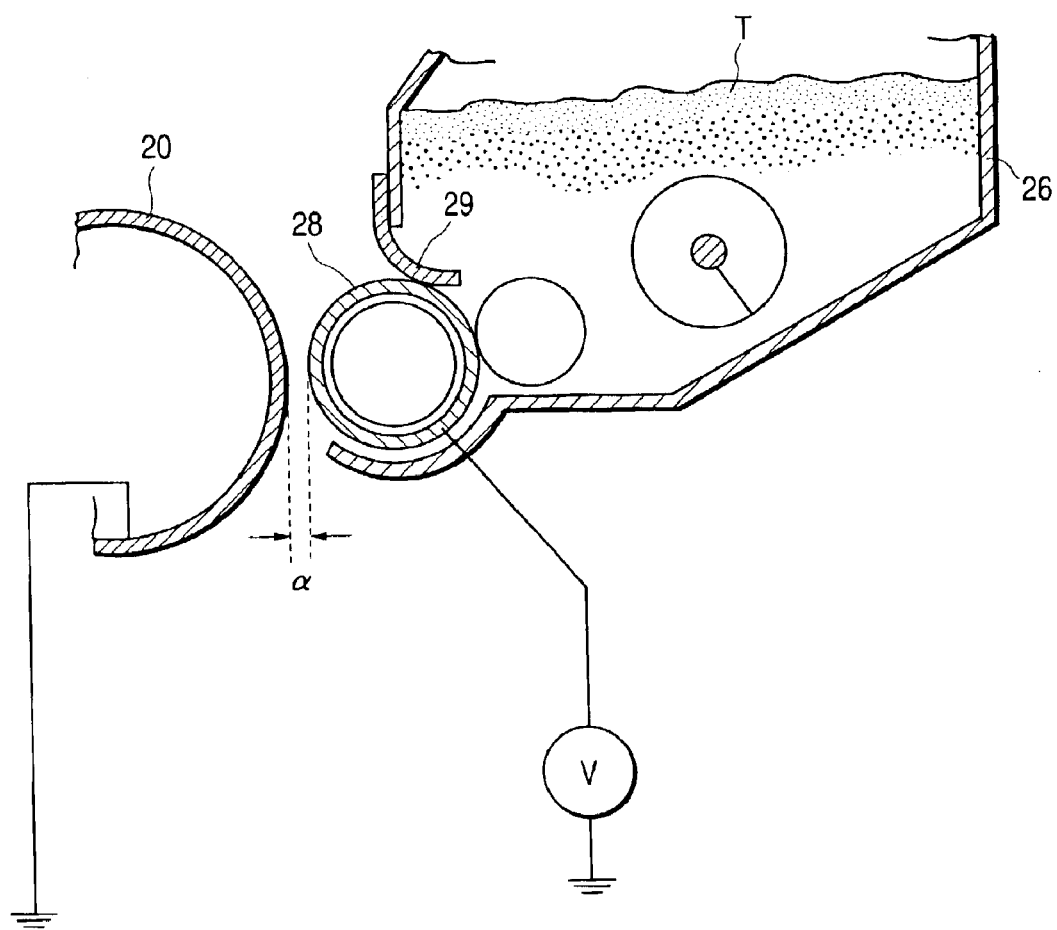
FIG. 4 is a sectional view of a principal part of a development apparatus for a one-component developer used in Examples 27 to 29 and Comparative Examples 13 to 15.

An enlarged sectional view of the principal part of the development apparatus for one-component type developers used in Examples 27 to 29 and Comparative Examples 13 to 15 is shown in FIG. 4. For conditions for developing electrostatic latent images, the speed of the development sleeve 28 was set at a speed 1.1 times as high as the movement speed of the surface of the photoconductor drum 20 opposite thereto, and the space α between the photoconductor drum 20 and the development sleeve 28 (between S and D) was 270 μm. For the member for controlling the thickness of the toner, an abutting urethane rubber blade 29 was used. In addition, the set temperature of the heat-fixation apparatus for fixing a toner image was 160° C. Furthermore, for the fixation apparatus, a fixation apparatus shown in FIGS. 5 and 6 was used.

As described above, under the condition of normal temperature and normal humidity (25° C., 60% RH), images were printed out on up to 30,000 sheets at a printout rate of 8 sheets (A4 size) per minute while the toner was supplied one after another in a continuous mode (namely, a mode in which the development device is not stopped, and thereby consumption of the toner is promoted), and the densities of resulting printout images were measured to evaluate the durability of the image according to the following criterion. In addition, the image from the 10,000 th printout was observed to make an evaluation about image fog according to the following criterion. At the same time, situations of the components constituting the image forming apparatus after the durability testing were observed to evaluate matching between each component and the above described toner. The results thereof are shown together in Table 9.

Change in Image Density During Endurance

Images were printed out on a predetermined number of normal copying papers (75 g/m$^2$), and the image density was evaluated according to the level at which the density of the image from the final printout was retained with respect to the density of the initial image. Furthermore, for the measurement of image density, a Macbeth reflective densitometer (manufactured by Macbeth Co., Ltd.) was used to measure a density relative to that of the printout image on a white ground with the density of original copy equal to 0.00.

A: Excellent (image density from the final printout is 1.40 or greater)
B: Good (image density from the final printout is 1.35 or greater and lower than 1.40)
C: Usable (image density from the final printout is 1.00 or greater and lower than 1.35)
D: Unusable (image density from the final printout is lower than 1.00)

Image Fog

Images were printed out on a predetermined number of normal copying papers (75 g/m$^2$), and the image fog was evaluated with a solid white image from the final printout. Specifically, the evaluation was made as follow: the worst value of the reflective density of the white ground after printing and the average reflective density of the paper before printing, as measured using a reflective densitometer (Reflectometer ODEL TC-6DS manufactured by Tokyo Denshoku Co., Ltd.), were defined as DS and Dr, respectively, (Ds–Dr) was calculated from these values as a fog level to make an evaluation according to the following criterion.
A: Excellent (fog level is 0% or higher and lower than 1.5%)
B: Good (fog level is 1.5% or higher and lower than 3.0%)
C: Usable (fog level is 3.0% or higher and lower than 5.0%)
D: Unusable (fog level is 5.0% or higher)

Evaluation of Matching with Image Forming Apparatus

1. Matching with Development Sleeve

After the printout testing was completed, the situation of residual toners sticking to the surface of the development sleeve and their influence on the printout image were visually evaluated.
A: Excellent (not observed)
B: Good (almost not observed)
C: Usable (sticking residual toners are observed but the influence on the image is not significant)
D: Unusable (sticking of residual toners is significant, causing unevenness in the image)

2. Matching with Photoconductor Drum

Occurrences of scars and sticking residual toners on the surface of the photoconductor drum and their influence on the printout image were evaluated visually.
A: Excellent (not observed)
B: Good (slightly observed but no influence on the image)
C: Usable (sticking residual toners and scars are observed but the influence on the image is not significant)
D: Unusable (sticking of residual toners is significant, causing longitudinal striped defects in the image)

3. Matching with Fixation Apparatus

The surface situation of the fixation film was observed, and the results of surface characteristics and occurrences of sticking residual toners were collectively averaged to evaluate the durability of the film.

(1) Surface Characteristics

Occurrences of scares and flaking on the fixation film were visually observed and evaluated after the printout testing was completed.
A: Excellent (not observed)
B: Good (almost not observed)
C: Usable
D: Unusable (2) Situation of Sticking Toners The situation of residual toners sticking to the surface of the fixation film was visually observed and evaluated after the printout testing was completed.
A: Excellent (not observed)
B: Good (almost not observed)
C: Usable
D: Unusable

TABLE 9

Evaluation results of printout image and matching with image forming apparatus

| | | Evaluation of printout image | | | | | Evaluation of matching with other apparatus | | | |
| | | Change in image density during endurance | | | | 10 thousands fogged images | | | Fixation apparatus | |
| Examples | Toner | Initial | Thousand | 10 thousands | 30 thousands | | Development sleeve | Photoconductor drum | Surface characteristic | Toner fixation |
| --- | --- | --- | --- | --- | --- | --- | --- | --- | --- | --- |
| Example 27 | Blue 1 | A | A | A | A | A | A | A | A | A |
| Example 28 | Yellow 1 | A | A | A | A | A | A | A | A | A |
| Example 29 | Black 1 | A | A | A | A | A | A | A | A | A |
| Comparative Example 13 | Blue 3 | C | D | D | D | D | D | D | D | D |
| Comparative Example 14 | Yellow 3 | C | D | D | D | D | D | D | D | D |
| Comparative Example 15 | Black 3 | B | C | D | D | D | D | D | D | D |

EXAMPLE 30

Printout testing was performed while the blue toner (1) of Example 3 was supplied one after another in a continuous mode (namely, a mode in which the development device is not stopped, and thereby consumption of the toner is promoted) in the same manner as Example 27 except that the toner reuse mechanism of the image forming apparatus of FIG. 3 was removed, and the printout rate was set at the level of 16 sheets (A4 size) per minute. The resulting printout images and the matching with the image evaluating apparatus used were evaluated for the same items as Examples 27 to 29 and Comparative Examples 13 to 15. As a result, satisfactory results were obtained for all the items.

EXAMPLE 31

500 mg of polyester (A:B:C=1:81:18, number average molecular weight: 50000) having a unit composition expressed by the following chemical formula (46):

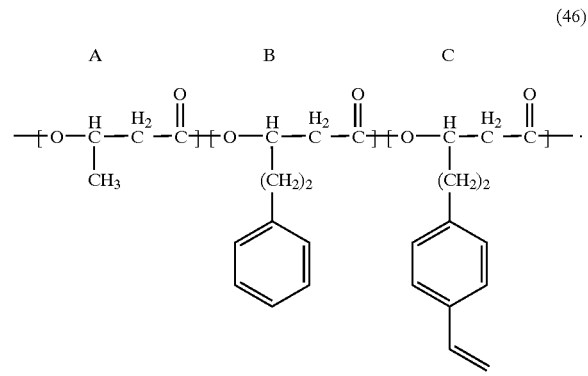

(46)

was dissolved in 5 mL of chloroform, and a solution with 172 mg of m-chloroperbenzoic acid dissolved in 2 mL of chloroform was dropped therein, and was stirred at 5° C. for 12 hours and then at 20° C. for 12 hours to carry out a reaction. After the reaction was completed, the reaction solution was put in 100 mL of cold methanol, insoluble components were collected and further dissolved in 5 mL of chloroform, and the solution was put in 100 mL of cold methanol to collect insoluble components. This operation was repeated twice, and insoluble components were collected and dried under reduced pressure. The yield of the obtained polymer was 470 mg.

The average molecular weight of the obtained polymer was measured by gel permeation chromatography (GPC) (Tosoh HLC-8220 GPC, column: Tosoh TSK-GEL SuperHM-H, solvent; chloroform, polystyrene equivalent). As a result, the obtained polymer was found to have the number average molecular weight of Mn=48000 and the weight average molecular weight of Mw=99000.

Figure 8:
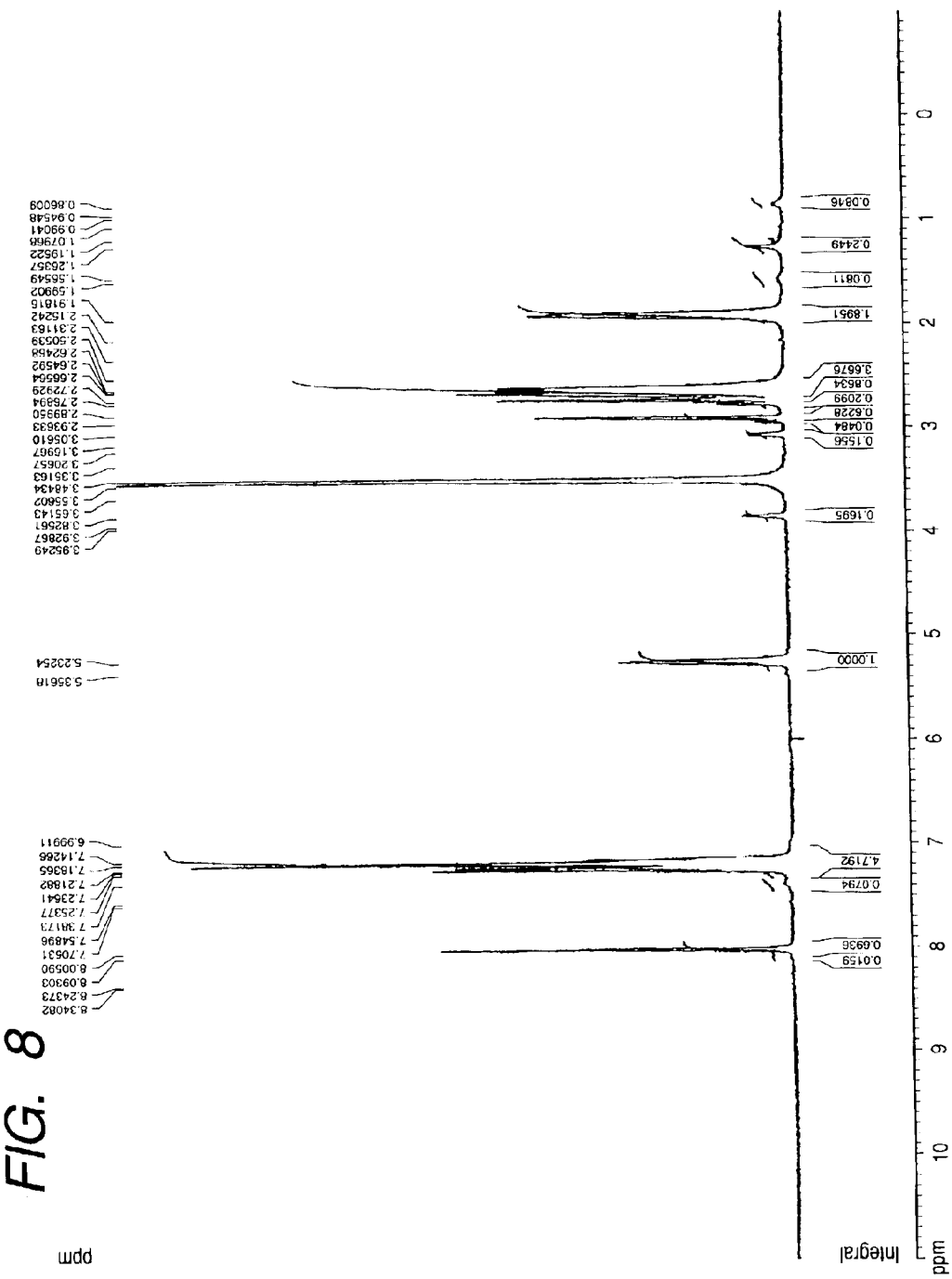
FIG. 8 shows a $^1$H-NMR spectrum of the polyester obtained in Example 31.

The structure of the obtained polymer was determined by $^1$H-NMR (FT-NMR: Bruker DPX400; resonance frequency: 400 MHz; measurement nuclear species: $^1$H; solvent used: CDCl$_3$; reference: capillary-encapsulated TMS/CDCl$_3$; measuring temperature: room temperature). A $^1$H-NMR spectrum chart is shown in FIG. 8. From the results, it was found that the polymer was a polymer with the C unit of raw material polymer fully epoxidized, namely a polyester having a unit composition expressed by the following chemical formula (47), namely the above units A to C (A:B:C= 1:81:18).

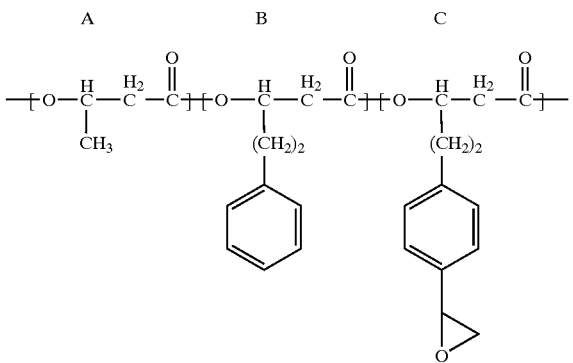

(47)

EXAMPLE 32

100 mg of polyester (A:B=30:70, number average molecular weight: 9900) having a unit composition expressed by the following chemical formula (48):

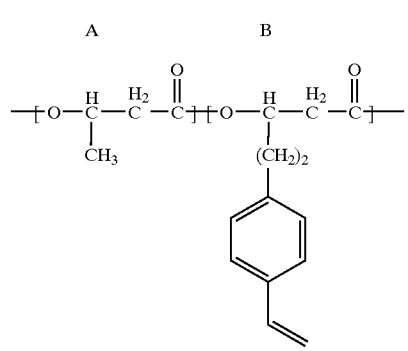

(48)

was dissolved in 0.8 mL of chloroform, and a solution obtained by making 200 mg of p-fluorobenzenethiol react with 30 mg of benzoil peroxide in 3 mL of chloroform at 20° C. for 1 hour was dropped therein, and was made to undergo a reaction under reflux at 70° C. for 24 hours. After the reaction was completed, the reaction solution was cooled down to a room temperature, 30 mL of deionized water was then added to separate the solution, and the chloroform layer was dehydrated with anhydrous magnesium sulfate, was thereafter concentrated by a rotary evaporator, and was reprecipitated in cold methanol. The chloroform re-dissolution and methanol reprecipitation operation was repeated three times, and resulting insoluble matters were collected and dried under reduced pressure. The yield of the obtained polymer was 103 mg.

For the obtained polymer, the molecular weight was measured by GPC in the same manner as Example 31. As a result, the obtained polymer was found to have the number average molecular weight of Mn=13000 and the weight average molecular weight of Mw=29000.

Figure 9:
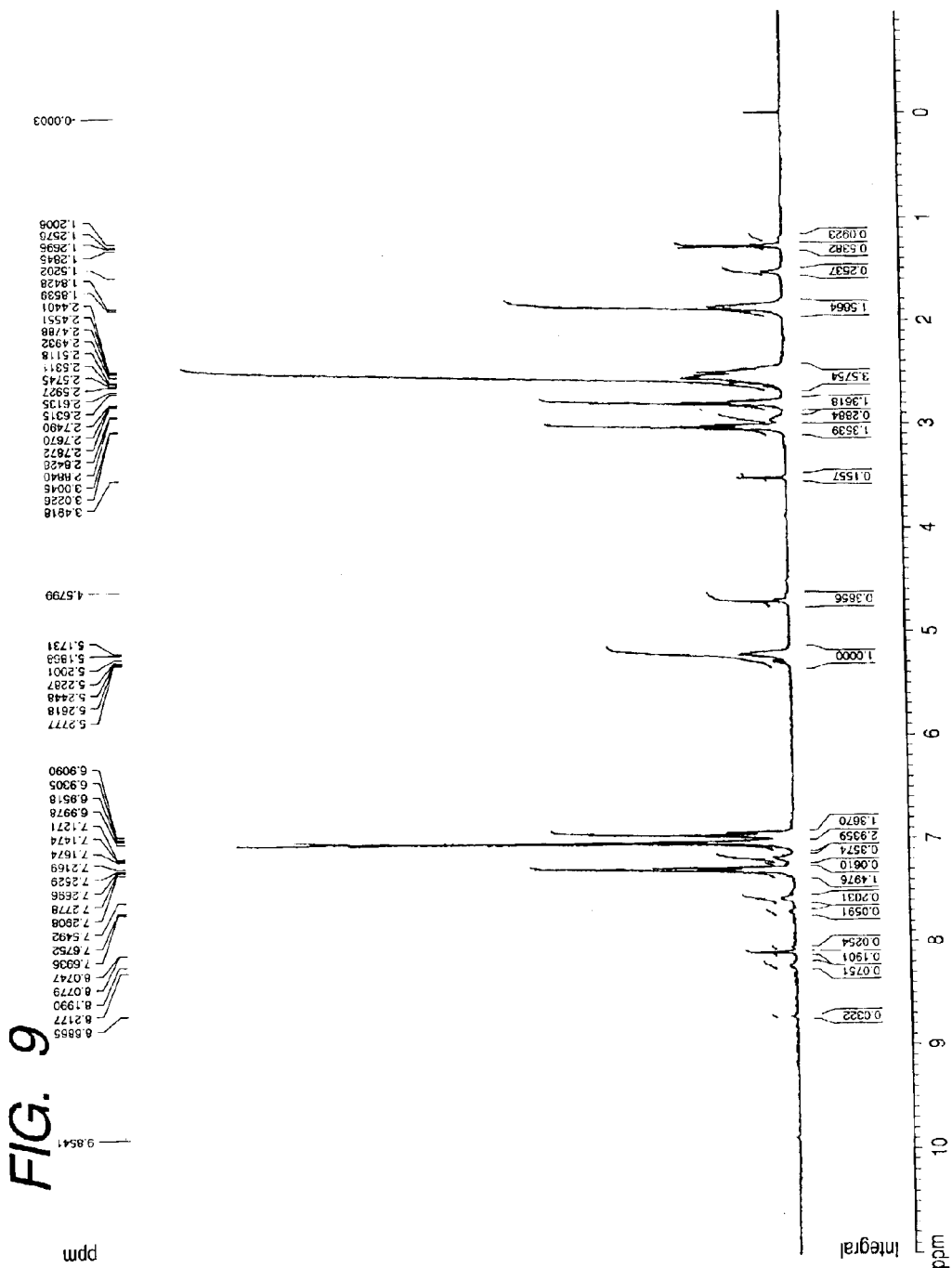
FIG. 9 shows a $^1$H-NMR spectrum of the polyester obtained in Example 32.

In addition, the structure of the obtained polymer was analyzed by 1H-NMR in the same manner as Example 31. A $^1$H-NMR spectrum chart is shown in FIG. 9. From the results, it was found that the polymer was a polymer with p-fluorobenzenethiol added to the B unit of raw material polymer, namely a polyester having a unit composition expressed by the following chemical formula (49) (A:B= 30:70).

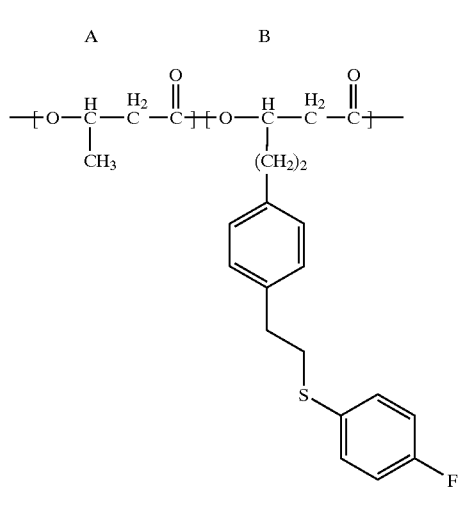

(49)

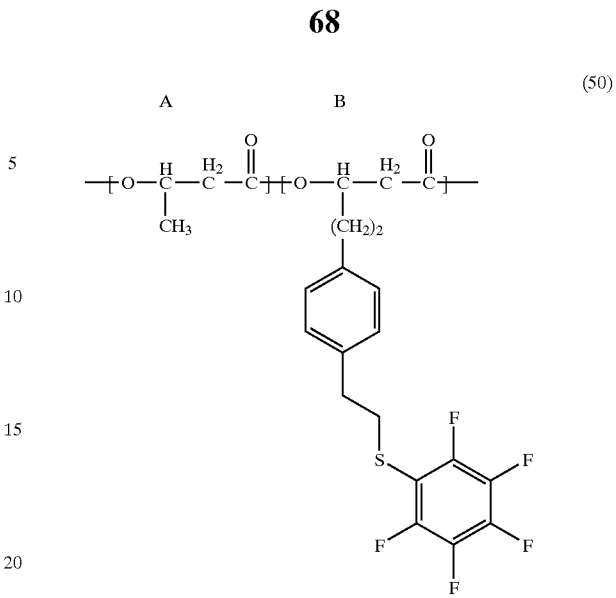

(50)

EXAMPLE 33

83 mg of a polyester having a composition expressed by the formula (48), similar to that used in Example 32, was dissolved in 0.8 mL of chloroform, and a solution obtained by making 300 mg of pentafluorobenzenethiol react with 30 mg of benzoil peroxide in 3 mL of chloroform at 20° C. for 1 hour was dropped therein, and was made to undergo a reaction under reflux at 70° C. for 24 hours. After the reaction was completed, the reaction solution was cooled down to a room temperature, 30 mL of deionized water was then added to separate the solution, and the chloroform layer was dehydrated with anhydrous magnesium sulfate, was thereafter concentrated by a rotary evaporator, and was reprecipitated in cold methanol. The chloroform re-dissolution and methanol reprecipitation operation was repeated three times, and resulting insoluble matters were collected and dried under reduced pressure. The yield of the obtained polymer was 107 mg.

For the obtained polymer, the molecular weight was measured by GPC in the same manner as Example 1. As a result, the obtained polymer was found to have the number average molecular weight of Mn=17000 and the weight average molecular weight of Mw=35000.

Figure 10:
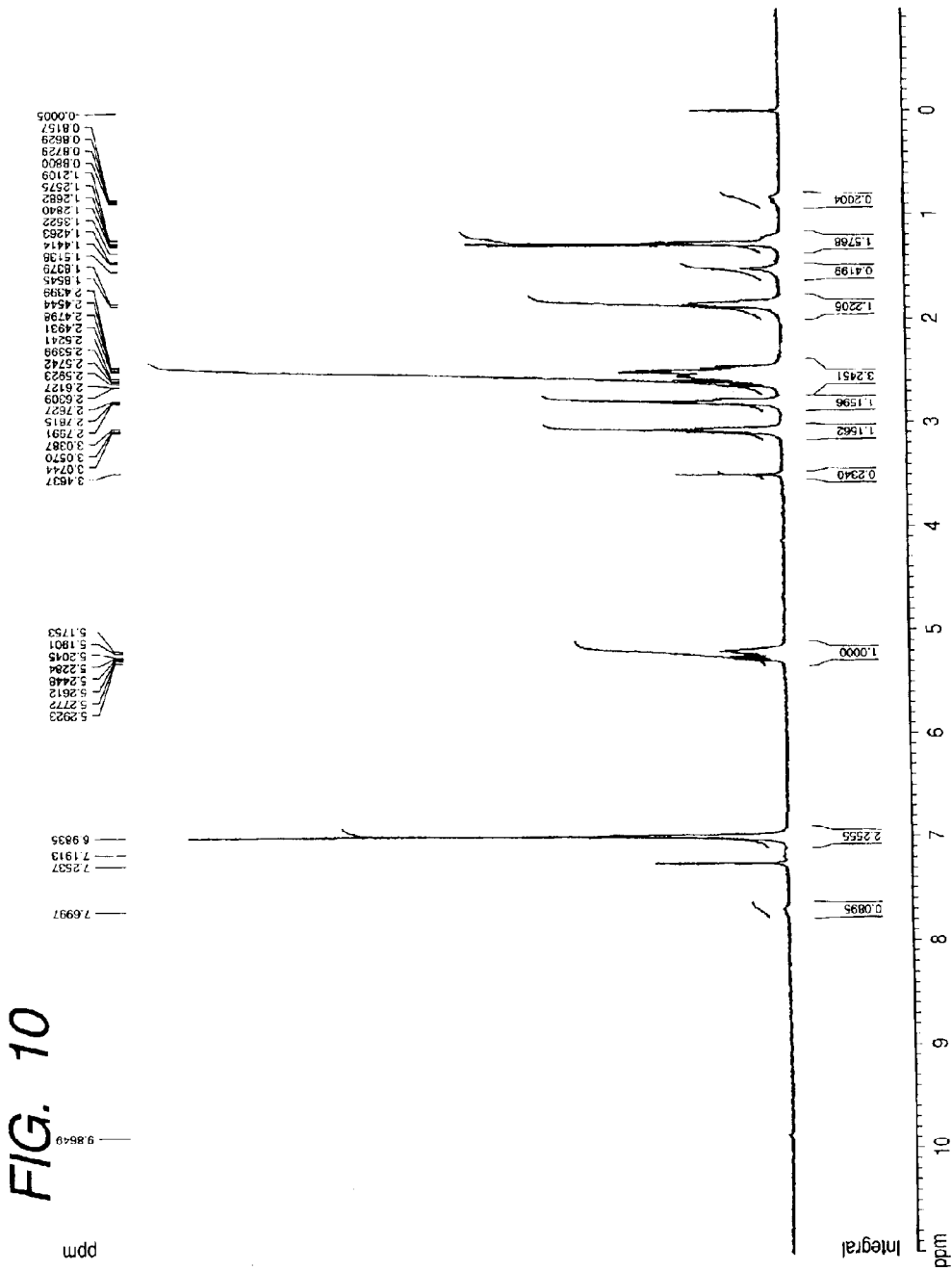
FIG. 10 shows a 1H-NMR spectrum of the polyester obtained in Example 33.
Figure 11:
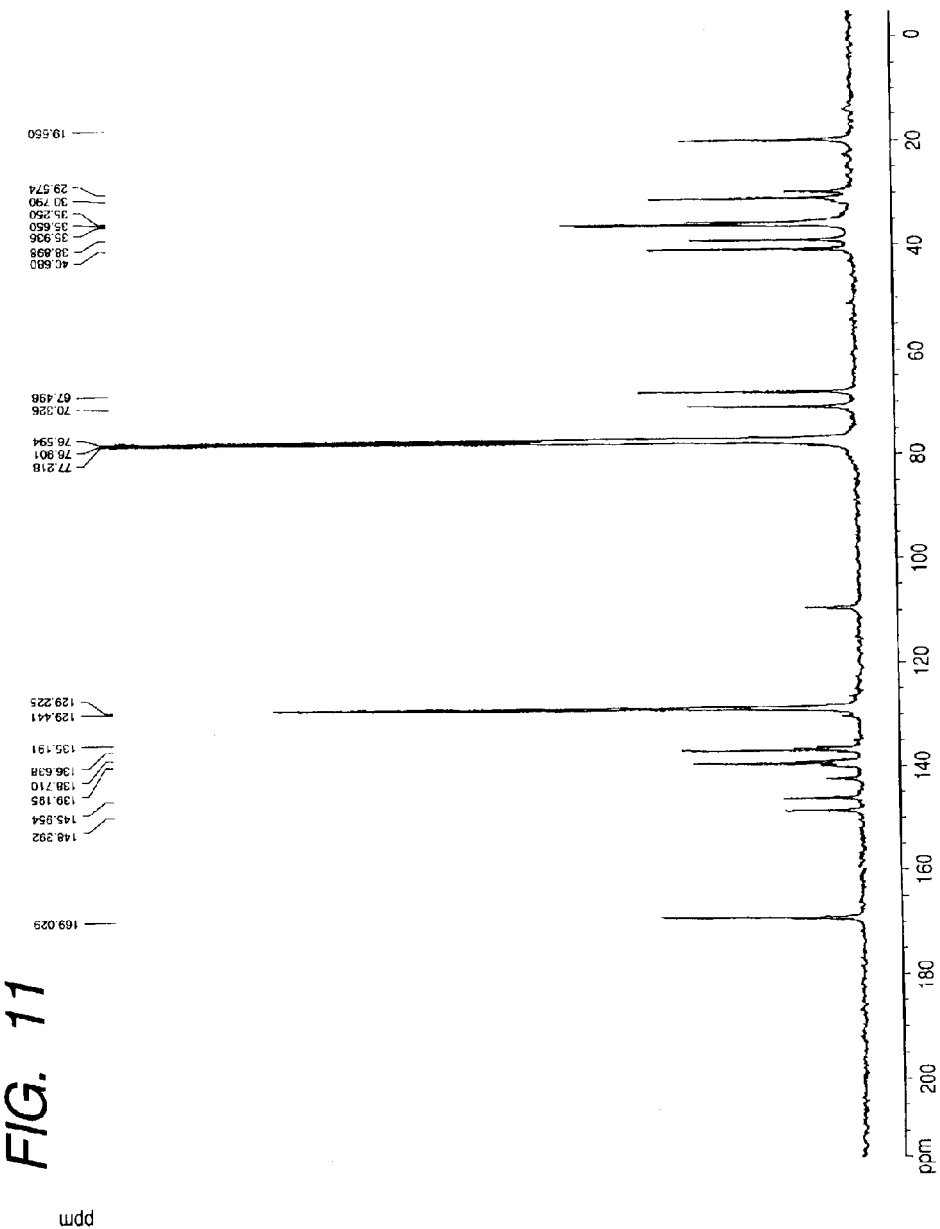
FIG. 11 shows a $^{13}$C-NMR spectrum of the polyester obtained in Example 33.
Figure 12:
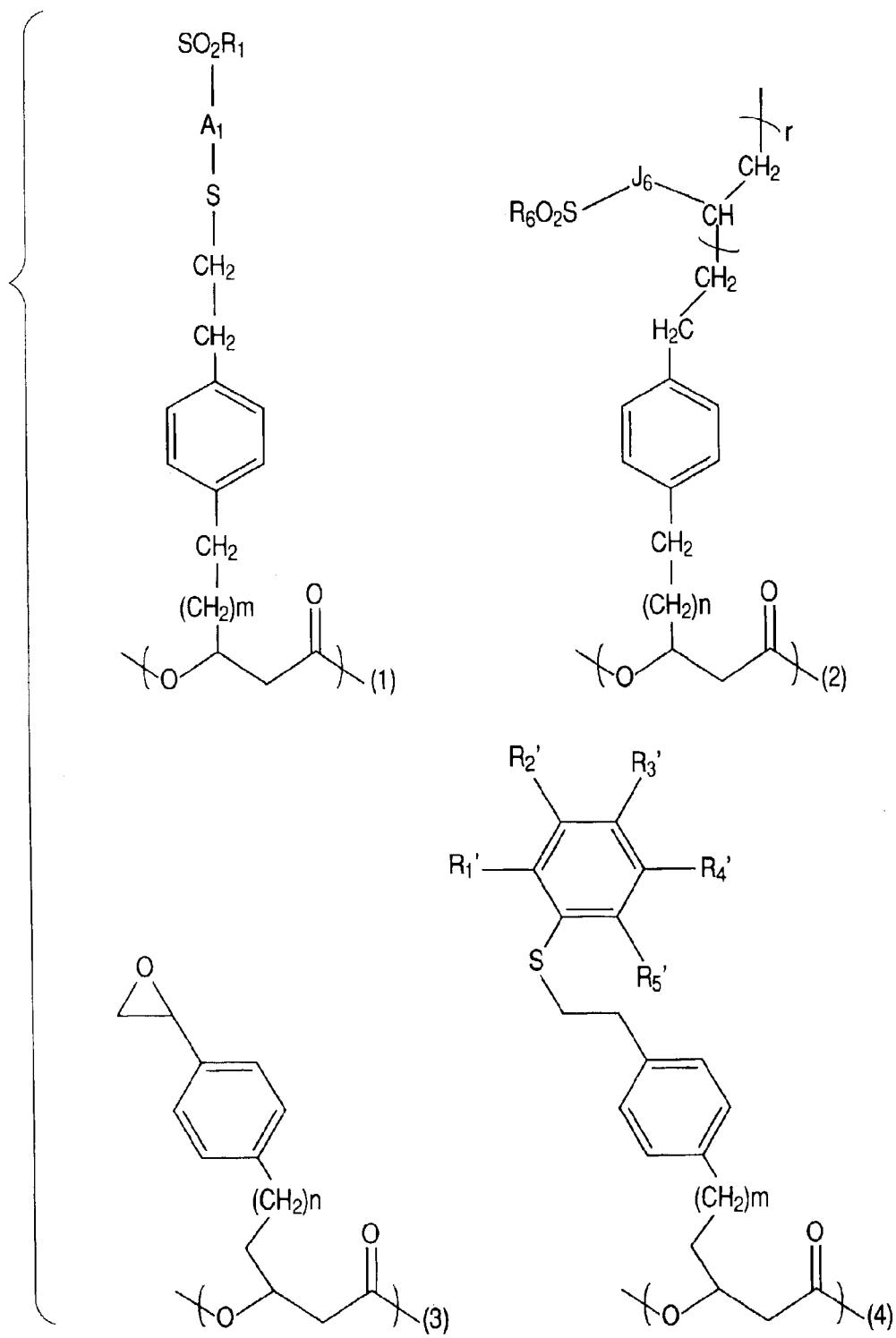
FIG. 12 shows in arrangement four compounds (1), (2), (3) and (4) shown in the present invention, which are suitable as charge controlling agents for use in an electrostatic latent image developing toner of the present invention.

In addition, the structure of the obtained polymer was analyzed by 1H-NMR in the same manner as Example 31. A $^1$H-NMR spectrum chart is shown in FIG. 10. In addition, the structure was analyzed by $^{13}$C-NMR in the same conditions (nclear species: $^{13}$C). A $^{13}$C-NMR spectrum chart is shown in FIG. 11. From the results, it was found that the polymer was a polymer with pentafluorobenzenethiol added to the B unit of raw material polymer, namely a polyester having a unit composition expressed by the following chemical formula (50) (A:B=30:70).

EXAMPLE 34

100 mg of polyester having a unit composition expressed by the formula (46) (A:B:C=1:81:18, number average molecular weight: 50000), used in Example 31, was dissolved in 1 mL of chloroform, and a solution obtained by making 20 mg of p-fluorobenzenethiol react with 17 mg of benzoil peroxide in 2 mL of chloroform at 20° C. for 1 hour was dropped therein, and was made to undergo a reaction under reflux at 70° C. for 24 hours. After the reaction was completed, the reaction solution was cooled down to a room temperature, 30 mL of deionized water was then added to separate the solution, and the chloroform layer was dehydrated with anhydrous magnesium sulfate, was thereafter concentrated by a rotary evaporator, and was reprecipitated in cold methanol. The chloroform re-dissolution and methanol reprecipitation operation was repeated three times, and resulting insoluble matters were collected and dried under reduced pressure. The yield of the obtained polymer was 54 mg.

For the obtained polymer, the molecular weight was measured by GPC in the same manner as Example 31. As a result, the obtained polymer was found to have the number average molecular weight of Mn=12000 and the weight average molecular weight of Mw=28500.

In addition, the structure of the obtained polymer was analyzed by $^1$H-NMR in the same manner as Example 31 and as a result, it was found that the polymer was a polymer with p-fluorobenzenethiol added to the C unit of raw material polymer, namely PHA having 3-hydroxy-5-phenylvaleric acid units with the p-fluorobanzenethiol structure added thereto, of formula (41), as shown in FIG. 9.

EXAMPLE 35

57 mg of polymer was obtained in the same manner as Example 34 except that pentafluorothiol was used in place of p-fluorobemzenethiol used in Example 34.

For the obtained polymer, the molecular weight was measured by GPC in the same manner as Example 31 and as a result, the obtained polymer was found to have the number average molecular weight of Mn=11500 and the weight average molecular weight of Mw=28300.

In addition, the structure of the obtained polymer was analyzed by 1H-NMR in the same manner as Example 31 and as a result, it was found that the polymer was a polymer with pentafluorobenzenethiol added to the C unit of raw material polymer, namely PHA having 3-hydroxy-5-phenylvaleric acid units with the pentafluorobenzenethiol structure added thereto, of formula (40), as shown in FIG. 10.

Examples 36 to 62 described below represent the result of producing various kinds of toners using PHA obtained in Examples 34 and 35, classified as exemplary compounds (4) and (5) as shown in Table 10, and evaluating the toners.

TABLE 10

| Exemplary compound (4) | PHA of Example 34 |
|---|---|
| Exemplary compound (5) | PHA of Example 35 |

EXAMPLES 36 AND 37

Blue toners (4) and (5) of Examples 36 and 37 were obtained in the same manner as Example 3 except that 2.0 parts by weight of exemplary compounds (4) and (5) were used in place of the exemplary compound (1). The properties of these toners were measured in the same manner as Example 3, and the results thereof are shown in Table 11. In addition, two-component type blue developers (4) and (5) were obtained in the same manner as Example 3 using the toners.

Evaluations were made in the same manner as Examples 3 and 4.

TABLE 11

Electrification characteristic of blue toners (4), (5)

| | | Particle size distribution | | Electrifiability | | | |
|---|---|---|---|---|---|---|---|
| | | | | Normal temperature and normal humidity (Q/M) | | High temperature and high humidity (Q/M) | |
| Examples | Toners Number: Blue | Weight average particle size (m) | Ratio of fines (% by number) | Stirring for 10 seconds | Stirring for 300 seconds | Stirring for 10 seconds | Stirring for 300 seconds |
| 36 | 4 | 7.5 | 5.8 | A | A | A | A |
| 37 | 5 | 7.4 | 5.5 | A | A | A | A |

EXAMPLES 38 AND 39

Yellow toners (4) and (5) of Examples 38 and 39 were obtained, respectively, in the same manner as Example 3 except that 2.0 parts by weight of exemplary compounds (4) and (5) were used in place of the exemplary compound (1) and a yellow coloring agent (hansa yellow G) was used in place of the cyan coloring agent. The properties of these toners were measured in the same manner as Example 3, and the results thereof are shown in Table 12. In addition, two-component type yellow developers (4) and (5) were obtained in the same manner as Example 3 using the toners.

Evaluations were made in the same manner as Examples 5 and 6.

TABLE 12

Electrification characteristic of yellow toners (4), (5)

| | Particle size distribution | | Electrifiability | |
|---|---|---|---|---|
| | | | Normal temperature and normal humidity (Q/M) | High temperature and high humidity (Q/M) |
| | Weight | Ratio of | | |

| Examples | Toners Number: Yellow | average particle size (m) | fines (% by number) | Stirring for 10 seconds | Stirring for 300 seconds | Stirring for 10 seconds | Stirring for 300 seconds |
|---|---|---|---|---|---|---|---|
| 38 | 4 | 7.6 | 5.8 | A | A | A | A |
| 39 | 5 | 7.3 | 5.3 | A | A | A | A |

EXAMPLES 40 AND 41

Black toners (4) and (5) of Examples 40 and 41 were obtained in the same manner as Example 3 except that 2.0 parts by weight of exemplary compounds (4) and (5) were used in place of the exemplary compound (1), and a carbon black (DBP oil absorption 110 mL/100 g) was used in place of the cyan coloring agent. The properties of these toners were measured in the same manner as Example 3, and the results thereof are shown in Table 13. In addition, two-component type black developers (4) and (5) were obtained in the same manner as Example 3 using the toners.

Evaluations were made in the same manner as Examples 7 and 8.

TABLE 13

Electrification characteristic of black toners (4), (5)

| | | Particle size distribution | | Electrifiability | | | |
|---|---|---|---|---|---|---|---|
| | | | | Normal temperature and normal humidity (Q/M) | | High temperature and high humidity (Q/M) | |
| | | Weight | Ratio of | | | | |
| Examples | Toners Number: Black | average particle size (m) | fines (% by number) | Stirring for 10 seconds | Stirring for 300 seconds | Stirring for 10 seconds | Stirring for 300 seconds |
| 40 | 4 | 7.0 | 5.1 | A | A | A | A |
| 41 | 5 | 7.4 | 5.8 | A | A | A | A |

EXAMPLE 42 AND 43

Magenta toners (4) and (5) of Examples 42 and 43 were obtained in the same manner as Example 9 except that 2.0 parts by weight of exemplary compounds (4) and (5) were used in place of the exemplary compound (1). The properties of these toners were measured in the same manner as Example 3, and the results thereof are shown in Table 14. In addition, two-component type magenta developers (4) and (5) were obtained in the same manner as Example 9 using the toners.

Evaluations were made in the same manner as Examples 9 and 10.

TABLE 14

Electrification characteristic of magenta toners (4), (5)

|  |  | Particle size distribution | | Electrifiability | | | |
|---|---|---|---|---|---|---|---|
|  |  |  |  | Normal temperature and normal humidity (Q/M) | | High temperature and high humidity (Q/M) | |
| Examples | Toners Number: Red | Weight average particle size (m) | Ratio of fines (% by number) | Stirring for 10 seconds | Stirring for 300 seconds | Stirring for 10 seconds | Stirring for 300 seconds |
| 42 | 4 | 7.1 | 5.1 | A | A | A | A |
| 43 | 5 | 7.6 | 5.9 | A | A | A | A |

(Magenta toner is described as red here.)

EXAMPLES 44 AND 45

Black toners (7) and (8) of Examples 44 and 45 were obtained in the same manner as Examples 9 and 10 except that 2.0 parts by weight of exemplary compounds (4) and (5) were used, and a carbon black (DBP oil absorption 110 mL/100 g) was used in place of the magenta pigment. The properties of these toners were measured in the same manner as Example 3, and the results thereof are shown in Table 15. In addition, two-component type black developers (7) and (8) were obtained in the same manner as Example 9 using the toners.

Evaluations were made in the same manner as Examples 11 and 12. The results thereof are shown together in Table 15.

TABLE 15

Electrification characteristic of black toners (4), (5)

|  |  | Particle size distribution | | Electrifiability | | | |
|---|---|---|---|---|---|---|---|
|  |  |  |  | Normal temperature and normal humidity (Q/M) | | High temperature and high humidity (Q/M) | |
| Examples | Toners Number: Black | Weight average particle size (m) | Ratio of fines (% by number) | Stirring for 10 seconds | Stirring for 300 seconds | Stirring for 10 seconds | Stirring for 300 seconds |
| 44 | 7 | 7.2 | 5.5 | A | A | A | A |
| 45 | 8 | 7.5 | 5.7 | A | A | A | A |

EXAMPLES 46 AND 47

Black toners (10) and (11) of Examples 46 and 47 were obtained in the same manner as Example 13 except that 2.0 parts by weight of exemplary compounds (3) and (4) were used in place of the exemplary compound (1). The properties of these toners were measured in the same manner as Example 3, and the results thereof are shown in Table 16. In addition, two-component type black developers (10) and (11) were obtained, respectively, in the same manner as Example 13 using the toners.

Evaluations were made in the same manner as Examples 13 and 14. The results thereof are shown together in Table 16.

TABLE 16

Electrification characteristic of black toners (10), (11)

|  |  | Particle size distribution | | Electrifiability | | | |
|---|---|---|---|---|---|---|---|
|  |  |  |  | Normal temperature and normal humidity (Q/M) | | High temperature and high humidity (Q/M) | |
| Examples | Toners Number: Black | Weight average particle size (m) | Ratio of fines (% by number) | Stirring for 10 seconds | Stirring for 300 seconds | Stirring for 10 seconds | Stirring for 300 seconds |
| 46 | 10 | 7.8 | 4.9 | A | A | A | A |
| 47 | 11 | 7.6 | 4.5 | A | A | A | A |

EXAMPLES 48 TO 59

An image forming apparatus was used in image formation methods similar to those of Examples 15 to 26.

TABLE 17

| | | Evaluation result of printout image | | | | | |
|---|---|---|---|---|---|---|---|
| | Two-component | Normal temperature and normal humidity | | | High temperature and high humidity | | |
| Examples | type developer | Image density | Image fog | Transferability | Image density | Image fog | Transferability |
| Example | | | | | | | |
| 48 | Blue 4 | A | A | A | A | A | A |
| 49 | Blue 5 | A | A | A | A | A | A |
| 50 | Yellow 4 | A | A | A | A | A | A |
| 51 | Yellow 5 | A | A | A | A | A | A |
| 52 | Black 4 | A | A | A | A | A | A |
| 53 | Black 5 | A | A | A | A | A | A |
| 54 | Red 4 | A | A | A | A | A | A |
| 55 | Red 5 | A | A | A | A | A | A |
| 56 | Black 7 | A | A | A | A | A | A |
| 57 | Black 8 | A | A | A | A | A | A |
| 58 | Black 10 | A | A | A | A | A | A |
| 59 | Black 11 | A | A | A | A | A | A |

(Magenta toner is described as red here.)

Evaluation

Two-component type developers prepared from toners of Examples 36 to 47 were used respectively to carry out printout testing in the same way, under the same conditions and environment, and at the same printout rate as Examples 15 to 26, and the obtained printout images were evaluated by comparison with Comparative Examples 7 to 12 in the same manner as Examples 15 to 26. The evaluation results are shown in Table 17.

In addition, in Examples 48 to 59, occurrences of scares and sticking residual toners on the surfaces of the photoconductor drum and intermediate transfer body, and their influence on printout images (matching with the image forming apparatus) were visually evaluated after 5000 images were outputted, and as a result, scars and sticking residual toners on the surfaces of the photoconductor drum and intermediate transfer body were not observed, and thus matching with the image forming apparatus was excellent for the system using two-component type developers of Examples 48 to 59. For the system using two-component type developers of Comparative Examples 7 to 12, on the other hand, sticking toners were observed on the surface of the photoconductor drum in all cases. In addition, for the system using two-component type developers of Comparative Examples 7 to 12, not only sticking toners and surface scars could be observed on the surface of the intermediate transfer body but also such that longitudinally striped defects occurred on the image. Accordingly, there was a problem in matching with image formation apparatus.

EXAMPLES 60 TO 62

For carrying out the image formation methods of Examples 60 to 62, the toners obtained in Examples 36, 38 and 40, respectively, as developers. In addition, for means for forming an image, development was performed by the apparatus shown in FIG. 3, and fixation was performed by the apparatus shown in FIGS. 4 to 6.

In addition, evaluations after durability testing and the matching between each apparatus and each toner were evaluated by comparison with Comparative Examples 13 to 15 for the following items in the same manner as Examples 27 to 29. The results thereof are shown together in Table 18.

Change in image density during endurance,
Image fog,

Evaluation of Matching with Image Forming Apparatus.

1. Matching with development sleeve
2. Matching with photoconductor drum
3. Matching with fixation apparatus
   (1) Surface characteristics
   (2) Situation of sticking residual toner

TABLE 18

Evaluation results of printout image and matching with image forming apparatus

| | | Evaluation of printout image | | | | Evaluation of matching with other apparatus | | | |
|---|---|---|---|---|---|---|---|---|---|
| | | | Change in image density during endurance | | | 10 thousands fogged images | Development sleeve | Photoconductor drum | Fixation apparatus | |
| Examples | Toner | Initial | Thousand | 10 thousands | 30 thousands | | | | Surface characteristic | Toner fixation |
| Example 60 | Blue 4 | A | A | A | A | A | A | A | A | A |
| Example 61 | Yellow 4 | A | A | A | A | A | A | A | A | A |
| Example 62 | Black 4 | A | A | A | A | A | A | A | A | A |

EXAMPLE 63

Printout testing was performed while the blue toner (4) of Example 36 was supplied one after another in a continuous mode (namely, a mode in which the development device is not stopped, and thereby consumption of the toner is promoted) in the same manner as Example 60 except that the toner reuse mechanism of the image forming apparatus of FIG. 3 was removed and that the printout rate was set at the level of 16 sheets (A4 size) per minute. The resulting printout images and the matching with the image evaluating apparatus used were evaluated for the same items as Examples 27 to 29. As a result, satisfactory results were obtained for all the items.

What is claimed is:

1. A polyhydroxyalkanoate containing in a molecule thereof one or more units each selected from the group consisting of the following formulae (1), (2), (3) and (4):

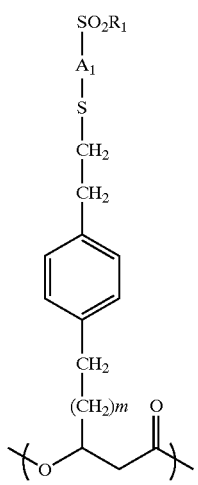

(1)

wherein $R_1$ is selected from the group consisting of OH, a halogen atom, ONa, OK, $OCH_3$ and $OC_2H_5$; $A_1$ represents a substituted or unsubstituted aliphatic hydrocarbon structure; m is an integer selected from 0 to 7; and in the case where there exists a plurality of units, $R_1$, $A_1$ and m represent the above described definements independently for each unit,

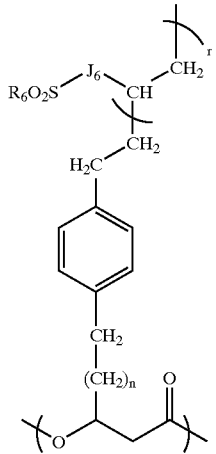

(2)

wherein $R_6$ is selected from the group consisting of OH, a halogen atom, ONa, OK, $OCH_3$ and $OC_2H_5$; $J_6$ represents a substituted or unsubstituted aliphatic hydrocarbon structure; n is an integer selected from 0 to 7; r is an integer selected from 1 to 500; and in the case where there exists a plurality of units, $R_6$, $J_6$, n and r represent the above described definements independently for each unit,

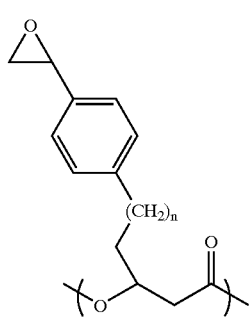

(3)

wherein n represents an integer of 0 to 7; and n represents the above described definements independently for each unit, and (4)

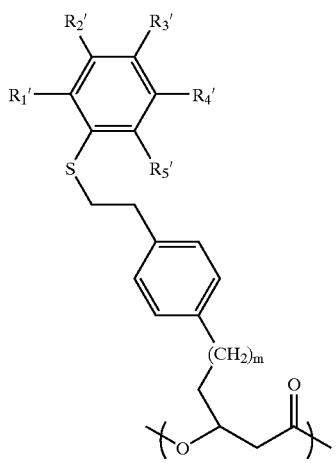

wherein m represents an integer of 0 to 7; $R_1'$ to $R_5'$ represent independently H or a halogen atom; and in the case where there exists a plurality of units, m and $R_1'$ to $R_5'$ represent the above described definements independently for each unit.

2. The polyhydroxyalkanoate according to claim 1, wherein the unit of said formula (1) is a unit of formula (9):

(9)

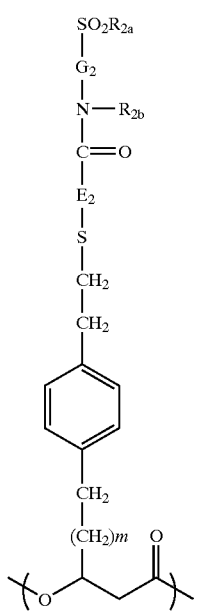

wherein $R_{2a}$ is selected from the group consisting of OH, a halogen atom, ONa, OK, $OCH_3$ and $OC_2H_5$; $R_{2b}$ is H or $CH_3$; $E_2$ and $G_2$ each represent a substituted or unsubstituted aliphatic hydrocarbon structure; m is an integer selected from 0 to 7; and in the case where there exists a plurality of units, $R_{2a}$, $R_{2b}$, $E_2$, $G_2$ and m represent the above described definements independently for each unit.

3. The polyhydroxyalkanoate according to claim 2, wherein the unit of said formula (9) is a unit of formula (10):

(10)

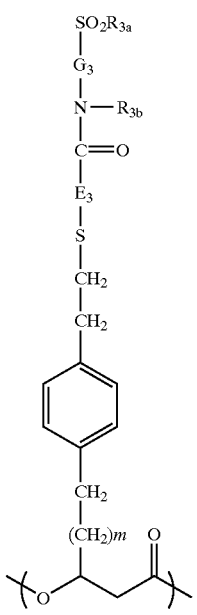

wherein $R_{3a}$ is selected from the group consisting of OH, a halogen atom, ONa, OK, $OCH_3$ and $OC_2H_5$; $R_{3b}$ is H or $CH_3$; $E_3$ and $G_3$ each represent a straight-chain or branched alkylene group having 1 to 8 carbon atoms; m is an integer selected from 0 to 7; and in the case where there exists a plurality of units, $R_{3a}$, $R_{3b}$, $E_3$, $G_3$ and m represent the above described definements independently for each unit.

4. The polyhydroxyalkanoate according to claim 3, wherein the unit of said formula (10) is a unit of formula (11):

(11)

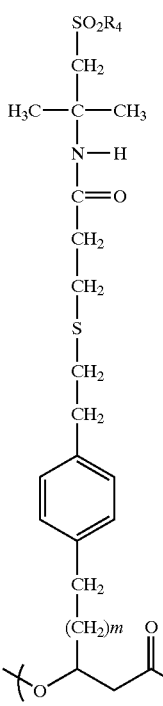

wherein $R_4$ is selected from the group consisting of OH, a halogen atom, ONa, OK, $OCH_3$ and $OC_2H_5$; m is an integer selected from 0 to 7; and in the case where there exists a plurality of units, $R_4$ and m represent the above described definements independently for each unit.

5. The polyhydroxyalkanoate according to claim 4, wherein the unit of said formula (11) is a unit of formula (12):

(12)

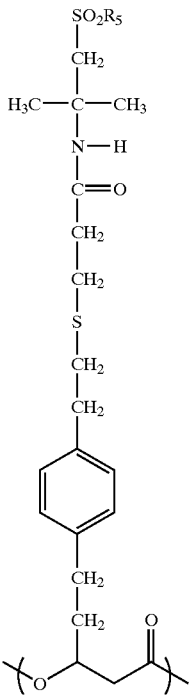

wherein $R_5$ is selected from the group consisting of OH, a halogen atom, ONa, OK, $OCH_3$ and $OC_2H_5$; and in the case where there exists a plurality of units, $R_5$ represents the above described definement independently for each unit.

6. The polyhydroxyalkanoate according to claim 1, wherein the unit of said formula (2) is a unit of formula (13):

(13)

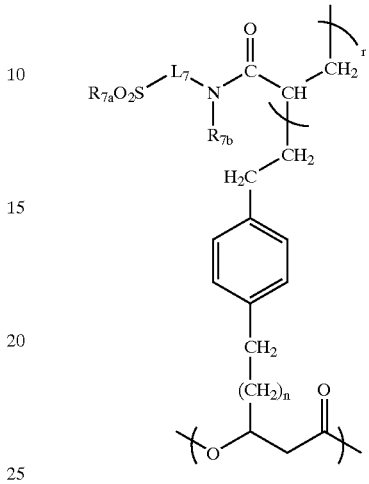

wherein $R_{7a}$ is selected from the group consisting of OH, a halogen atom, ONa, OK, $OCH_3$ and $OC_2H_5$; $R_{7b}$ is H or $CH_3$; $L_7$ represents a substituted or unsubstituted aliphatic hydrocarbon structure; n is an integer selected from 0 to 7; r is an integer selected from 1 to 500; and in the case where there exists a plurality of units, $R_{7a}$, $R_{7b}$, $L_7$, n and r represent the above described definements independently for each unit.

7. The polyhydroxyalkanoate according to claim 6, wherein the unit of said formula (13) is a unit of formula (14):

(14)

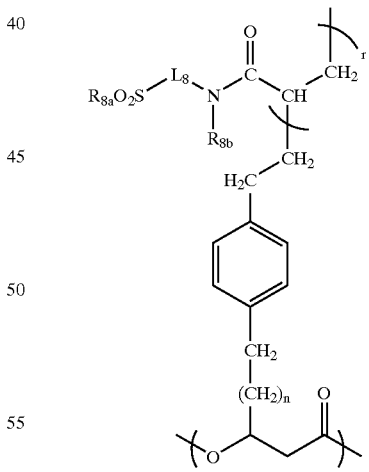

wherein $R_{8a}$ is selected from the group consisting of OH, a halogen atom, ONa, OK, $OCH_3$ and $OC_2H_5$; $R_{8b}$ is H or $CH_3$; $L_8$ represents a straight-chain or branched alkylene group having 1 to 8 carbon atoms; n is an integer number selected from 0 to 7; r is an integer selected from 1 to 500; and in the case where there exists a plurality of units, $R_{8a}$, $R_{8b}$, $L_8$, n and r represent the above described definements independently for each unit.

8. The polyhydroxyalkanoate according to claim 7, wherein the unit of said formula (14) is a unit of formula (15):

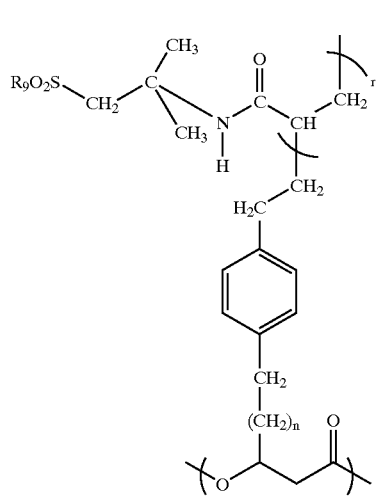

(15)

wherein $R_9$ is selected from the group consisting of OH, a halogen atom, ONa, OK, $OCH_3$ and $OC_2H_5$; n is an integer selected from 0 to 7; r is an integer selected from 1 to 500; and in the case where there exists a plurality of units, $R_9$, n and r represent the above described definements independently for each unit.

9. The polyhydroxyalkanonate according to claim 8, wherein the unit of said formula (15) is a unit of formula (16):

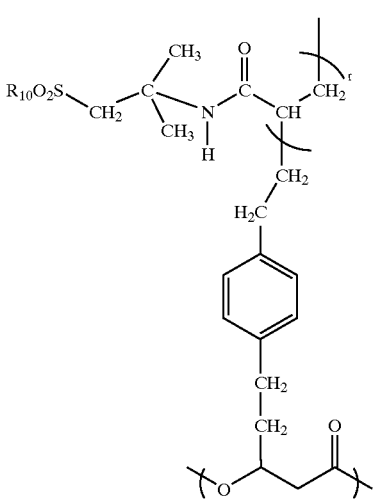

(16)

wherein $R_{10}$ is selected from the group consisting of OH, a halogen atom, ONa, OK, $OCH_3$ and $OC_2H_5$; r is an integer selected from 1 to 500; and in the case where there exists a plurality of units, $R_{10}$ and r represent the above described definements independently for each unit.

10. The polyhydroxyalkanoate according to claim 1, wherein n is 1 in said formula (3).

11. The polyhydroxyalkanoate according to claim 1, wherein the halogen atom is a fluorine atom in said formula (4).

12. The polyhydroxyalkanoate according to claim 1, wherein m is 1 in said formula (4).

13. The polyhydroxyalkanoate according to claim 1, wherein $R_1'$ to $R_5'$ are fluorine atoms in said formula (4).

14. The polyhydroxyalkanoate according to claim 1, wherein $R_1'$, $R_2'$, $R_4'$ and $R'_5$ are hydrogen atoms, and $R_3'$ is a fluorine atom in said formula (4).

15. The polyhydroxyalkanoate according to claim 1, containing, in addition to the unit selected from the group consisting of formulae (1), (2), (3) and (4), at least any one of a 3-hydroxy-ω-substituted alkanoic acid unit of formula (17):

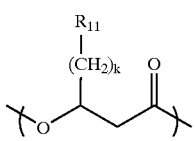

(17)

wherein k is an integer selected from 1 to 8; $R_{11}$ contains a residual having any ring structure of a phenyl structure or a thienyl structure; and in the case where there exists a plurality of units, k and $R_{11}$, represent the above described definements independently for each unit, and a 3-hydroxy-ω-cyclohexylalkanoic acid unit of formula (18):

(18)

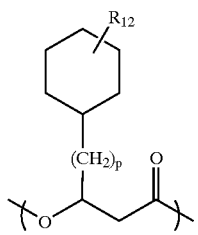

wherein $R_{12}$ is a substituent group in the cyclohexyl group and $R_{12}$ is selected from the group consisting of H, CN, $NO_2$, a halogen atom, $CH_3$, $C_2H_5$, $C_3H_7$, $CF_3$, $C_2F_5$ and $C_3F_7$; p is an integer selected from 0 to 8; and in the case where there exists a plurality of units, $R_{12}$ and p represent the above described definements independently for each unit.

16. The polyhydroxyalkanoate according to claim 15, wherein $R_{11}$ in formula (17) is selected from the group consisting of the following formulae (19), (20), (21), (22), (23), (24), (25), (26), (27), (28) and (29), and in the case where there exist a plurality of units, $R_{11}$ represents the above described formula independently for each unit, and a group of unsubstituted or substituted phenyl groups each expressed by

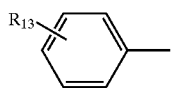

(19)

wherein $R_{13}$ represents a substituent group in the aromatic ring, $R_{13}$ is selected from the group consisting of H, a halogen atom, CN, $NO_2$, $CH_3$, $C_2H_5$, $C_3H_7$, $CH=CH_2$, $COOR_{13a}$ ($R_{13a}$ represents any one of H, Na and K), $CF_3$, $C_2F_5$ and $C_3F_7$, and in the case where there exist a plurality of units, $R_{13}$ represents the above described constituent independently for each unit;

a group of unsubstituted or substituted phenoxy groups each expressed by

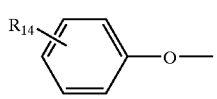

(20)

wherein $R_{14}$ represents a substituent group in the aromatic ring, $R_{14}$ is selected from the group consisting of H, a halogen atom, CN, $NO_2$, $CH_3$, $C_2H_5$, $C_3H_7$, $SCH_3$, $CF_3$, $C_2F_5$ and $C_3F_7$, and in the case where there exist a plurality of units, $R_{14}$ represents the above described constituent independently for each unit;

a group of unsubstituted or substituted benzoyl groups each expressed by

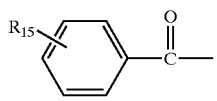

(21)

wherein $R_{15}$ represents a substituent group in the aromatic ring, $R_{15}$ is selected from the group consisting of H, a halogen atom, CN, $NO_2$, $CH_3$, $C_2H_5$, $C_3H_7$, $CF_3$, $C_3F_5$ and $C_3F_7$, and in the case where there exist a plurality of units, $R_{15}$ represents the above described constituent independently for each unit;

a group of unsubstituted or substituted phenylsulfanyl groups each expressed by

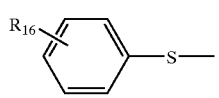

(22)

wherein $R_{16}$ represents a substituent group in the aromatic ring, $R_{16a}$ is selected from the group consisting of H, a halogen atom, CN, $NO_2$, $COOR_{16a}$, $SO_2R_{16a}$ ($R_{16a}$ represents any one of H, Na, K, $CH_3$ and $C_2H_5$, and $R_{16b}$ represents any group of OH, ONa, OK, a halogen atom, $OCH_3$ and $OC_2H_5$), $CH_3$, $C_2H_5$, $C_3H_7$, $(CH_3)_2$—CH and $(CH_3)_3$—C, and in the case where there exist a plurality of units, $R_{16}$ represents the above described constituent independently for each unit;

a group of unsubstituted or substituted (phenylmethyl) sulfanyl groups each expressed by

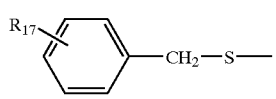

(23)

wherein $R_{17}$ represents a substituent group in the aromatic ring, $R_{17}$ is selected from the group consisting of H, a halogen atom, CN, $NO_2$, $COOR_{17a}$, $SO_2R_{17b}$ ($R_{17a}$ represents any one of H, Na, K, $CH_3$ and $C_2H_5$, and $R_{17b}$ represents any one of OH, ONa, OK, a halogen atom, $OCH_3$ and $OC_2H_5$), $CH_3$, $C_2H_5$, $C_3H_7$, $(CH_3)_2$—CH and $(CH_3)_3$—C, and in the case where there exist a plurality of units, $R_{17}$ represents the above described constituent independently for each unit;

2-thienyl group expressed by

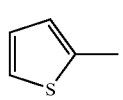

(24)

2-thienylsulfanyl group expressed by

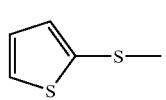

(25)

2-thienylcarbonyl group expressed by

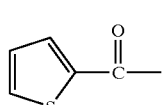

(26)

a group of unsubstituted or substituted phenylsulfinyl groups each expressed by (27)

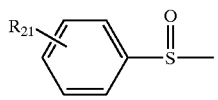

wherein $R_{21}$ represents a substituent group in the aromatic ring, $R_{21}$ is selected from the group consisting of H, a halogen atom, CN, $NO_2$, $COOR_{21a}$, $SO_2R_{21b}$ ($R_{21a}$ represents any one of H, Na, K, $CH_3$ and $C_2H_5$, and $R_{21b}$ represents any one of OH, ONa, OK, a halogen atom, $OCH_3$ and $OC_2H_5$), $CH_3$, $C_2H_5$, $C_3H_7$, $(CH_3)_2$—CH and $(CH_3)_3$—C, and in the case where there exist a plurality of units, $R_{21}$ represents the above described constituent independently for each unit);

a group of unsubstituted or substituted phenylsulfonyl groups each expressed by (28)

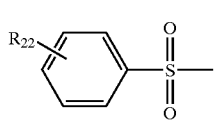

wherein $R_{22}$ represents a substituent group in the aromatic ring, $R_{22}$ is selected from the group consisting of H, a halogen atom, CN, $NO_2$, $COOR_{22a}$, $SO_2R_{22b}$ ($R_{22a}$ represents any one of H, Na, K, $CH_3$ and $C_2H_5$, and $R_{22b}$ represents any one of OH, ONa, OK, a halogen atom, $OCH_3$ and $OC_2H_5$), $CH_3$, $C_2H_5$, $C_3H_7$, $(CH_3)_2$—CH and $(CH_3)_3$—C, and in the case where there exist a plurality of units, $R_{22}$ represents the above described constituent independently for each unit; and a group of (phenylmethyl)oxy groups each expressed by (29)

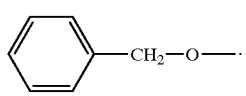

17. The polyhydroxyalkanoate according to claim 1, wherein the number average molecular weight is in the range of from 1000 to 1000000.

18. A method of producing polyhydroxyalkanoate containing a unit of formula (1), the method comprising reacting polyhydroxyalkanoate containing a unit of formula (5) with at least one type of compounds of formula (6), wherein said formulae (5), (6) and (1) are:

(5)

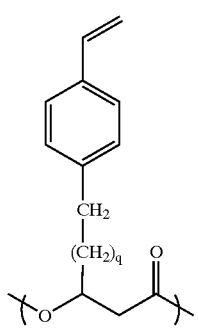

wherein q is an integer selected from 0 to 7, and in the case where there exist a plurality of units, q represents the above described number independently for each unit;

(6)

$$HS\text{—}A_{25}\text{—}SO_2R_{25}$$

wherein $R_{25}$ is selected from the group consisting of OH, a halogen atom, ONa, OK, $OCH_3$ and $OC_2H_5$; $A_{25}$ represents substituted or unsubstituted aliphatic hydrocarbon structures; and in the case where there exist a plurality of types of compounds, $R_{25}$ and $A_{25}$ each represent the above described respective constituent independently for each compound; and (1)

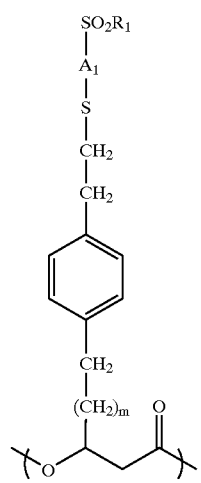

wherein $R_1$ is selected from the group consisting of OH, a halogen atom, ONa, OK, $OCH_3$ and $OC_2H_5$; $A_1$ represents a substituted or unsubstituted aliphatic hydrocarbon structure; m is an integer selected from 0 to 7; and in the case where there exist a plurality of units, $R_1$, $A_1$ and m each represent the above described constituent and number independently for each unit.

19. The method for production of a polyhydroxyalkanoate according to claim 18, wherein in said reaction, the compound of said formula (6) is a compound of formula (33):

(33)

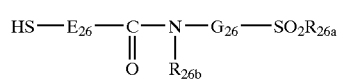

wherein $R_{26a}$ is selected from the group consisting of OH, a halogen atom, ONa, OK, $OCH_3$ and $OC_2H_5$; $R_{26b}$ is H or $CH_3$; $E_{26}$ and $G_{26}$ each represent a substituted or unsubstituted aliphatic hydrocarbon structure; and in the case where there exists a plurality of compounds, $R_{26a}$, $R_{26b}$, $E_{26}$ and $G_{26}$ represent the above described definements independently for each compound, and the unit of said formula (1) is a unit of formula (9):

(9)

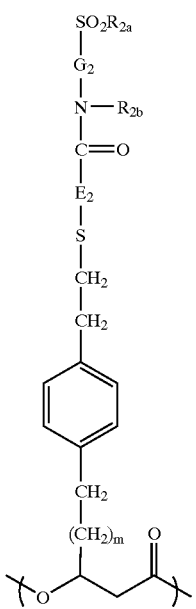

wherein $R_{2a}$ is selected from the group consisting of OH, a halogen atom, ONa, OK, $OCH_3$ and $OC_2H_5$; $R_{2b}$ is H or $CH_3$; $E_2$ and $G_2$ each represent a substituted or unsubstituted aliphatic hydrocarbon structure; m is an integer selected from 0 to 7; and in the case where there exists a plurality of units, $R_{2a}$, (5)

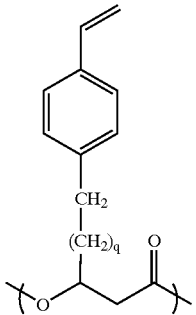

wherein q is an integer selected from 0 to 7; and in the case where there exists a plurality of units, q represents the above described number independently for each unit;

(7)

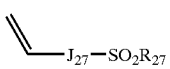

wherein $R_{27}$ is selected from the group consisting of OH, a halogen atom, ONa, OK, $OCH_3$ and $OC_2H_5$; $J_{27}$ represents a substituted or unsubstituted aliphatic hydrocarbon structure; and in the case where there exist a plurality of compounds, $R_{27}$ and $J_{27}$ represent the above described definements independently for each compound; and $R_{2b}$, $E_2$, $G_2$ and m represent the above described definements independently for each unit.

20. The method according to claim 18, wherein the reaction proceeds in the presence of a radical initiator.

21. The method according to claim 20, wherein said radical initiator is one or more compounds selected from 2,2'-azobis(2-methylpropionitrile), 2,2'-azobisisobutyronitrile, 2,2'-azobis(2,4-dimethylvaleronitrile), 2,2'-azobis(4-methoxy-2,4-dimethylvaleronitrile), di-n-propylperoxycarbonate, bis-4-t-butylhexylperoxydicarbonate, bis-2-ethylhexylperoxydicarbonate, benzoyl peroxide, lauroyl peroxide or acetylcyclohexanesulfonyl peroxide.

22. A method of producing a polyhydroxyalkanoate containing a unit of formula (2), wherein a polyhydroxyalkanoate containing a unit of formula (5) is reacted with at least one compound of formula (7), wherein said formulae (5), (7) and (2) are:

(2)

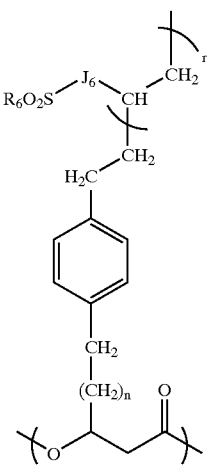

wherein $R_6$ is selected from the group consisting of OH, a halogen atom, ONa, OK, $OCH_3$ and $OC_2H_5$; $J_6$ represents a substituted or unsubstituted aliphatic hydrocarbon structure; n is an integer selected from 0 to 7; r is an integer selected from 1 to 500; and in the case where there exists a plurality of units, $R_6$, $J_6$, n and r represent the above described definements independently for each unit.

23. The method of producing a polyhydroxyalkanoate according to claim 22, wherein in said reaction, the compound of said formula (7) is a compound of formula (34):

(34)

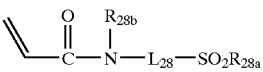

wherein $R_{28a}$ is selected from the group consisting of OH, a halogen atom, ONa, OK, $OCH_3$ and $OC_2H_5$; $R_{28b}$ is H or $CH_3$; $L_{28}$ represents a substituted or unsubstituted aliphatic hydrocarbon structure; and in the case where there exists a plurality of compounds, $R_{28a}$, $R_{28b}$ and $L_{28}$ represent the above described definements independently for each compound, and the unit of said formula (2) is a unit of formula (13):

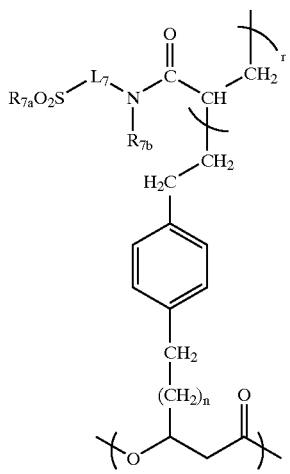

(13)

wherein $R_{7a}$ is selected from the group consisting of OH, a halogen atom, ONa, OK, $OCH_3$ and $OC_2H_5$; $R_{7b}$ is H or $CH_3$; $L_7$ represents a substituted or unsubstituted aliphatic hydrocarbon structure; n is an integer selected from 0 to 7; r is an integer selected from 1 to 500; and in the case where there exists a plurality of units, $R_{7a}$, $R_{7b}$, $L_7$, n and r represent the above described definements independently for each unit.

24. The method of producing a polyhydroxyalkanoate according to claim 22, wherein the reaction proceeds in the presence of a radical initiator.

25. The method of producing a polyhydroxyalkanoate according to claim 24, wherein said radical initiator is one or more compounds selected from 2,2'-azobis(2-methylpropionitrile), 2,2'-azobisisobutyronitrile, 2,2'-azobis(2,4-dimethylvaleronitrile), 2,2'-azobis(4-methoxy-2,4-dimethylvaleronitrile), di-n-propylperoxycarbonate, bis-4-t-butylhexylperoxydicarbonate, bis-2-ethylhexylperoxydicarbonate, benzoyl peroxide, lauroyl peroxide or acetylcyclohexanesulfonyl peroxide.

26. A method of producing a polyhydroxyalkanoate containing in a molecule thereof one or more of a unit of formula (3), said method comprising a step of treating with an oxidizing agent a polyhydroxyalkanoate containing in a molecule thereof one or more of a unit of formula (5) to convert the unit of formula (5) into the unit of formula (3), wherein said formula (3) is:

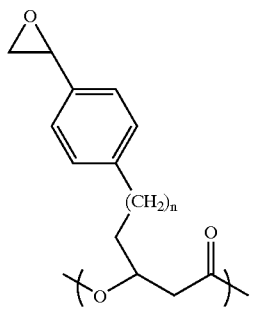

(3)

wherein n represents an integer selected from 0 to 7; and in the case where a plurality of units exist in the same molecule, n in one unit can be different from that in another unit respectively;

and said formula (5) is:

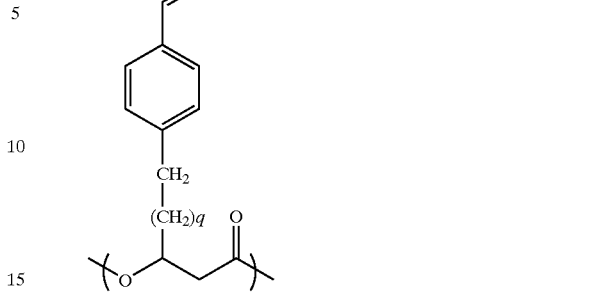

(5)

wherein q is an integer selected from 0 to 7; and in the case where there exists a plurality of units, q represents the above described number independently for each unit.

27. The method of producing a polyhydroxyalkanoate according to claim 26, wherein n in said formula (3) and q in said formula (5) are both 1.

28. The method of producing a polyhydroxyalkanoate according to claim 26, wherein said oxidizing agent is one or more selected from hydrogen peroxide, sodium percarbonate, m-chloroperbenzoic acid, performic acid or peracetic acid.

29. A method of producing a polyhydroxyalkanoate containing in a molecule one or more of a unit of formula (4), said method comprising a step of reacting a polyhydroxyalkanoate containing in a molecule one or more of a unit of formula (5) with at least one compound of formula (8) to convert the unit of formula (5) into the unit of formula (4), wherein said formula (4) is:

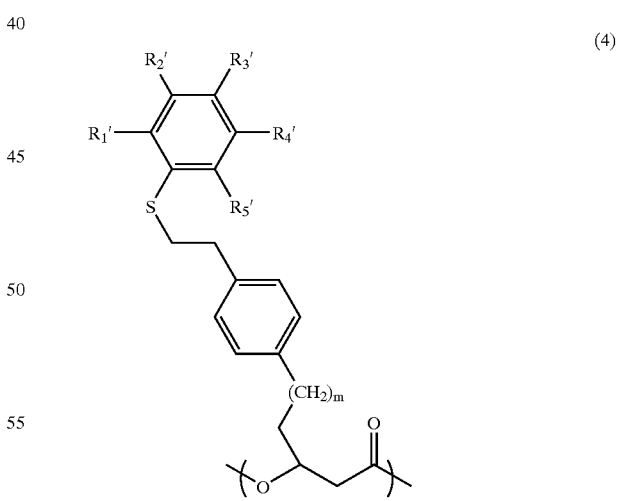

(4)

wherein m represents an integer selected from numbers 0 to 7; $R_1'$ to $R_5'$ represent independently a hydrogen atom or a halogen atom; and in the case where there exists a plurality of units, m and $R_1'$ to $R_5'$ represent the above described definements independently for each unit;

said formula (5) is:

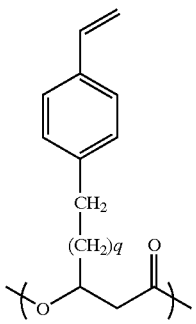

(5)

wherein q is an integer selected from 0 to 7; and in the case where there exists a plurality of units, q represents the above described number independently for each unit; and said formula (8) is:

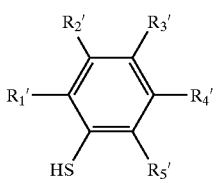

(8)

wherein $R_1'$ to $R_5'$ represent independently a hydrogen atom or a halogen atom; and in the case where there exists a plurality of compounds, $R_1'$ to $R_5'$ represent the above described definement independently for each compound.

30. The method of producing a polyhydroxyalkanoate according to claim 29, wherein the halogen atom is a fluorine atom in said formulae (4) and (8).

31. The method of producing a polyhydroxyalkanoate according to claim 29, wherein m in said formula (4) and q in said formula (5) are both 1.

32. The method of producing a polyhydroxyalkanoate according to claim 29, wherein $R_1'$ to $R_5'$ are fluorine atoms in said formulae (4) and (8).

33. The method of producing a polyhydroxyalkanoate according to claim 29, wherein in said formulae (4) and (8), said $R_1'$, $R_2'$, $R_4$ and $R_5'$ are hydrogen atoms and $R_3'$ is a fluorine atom.

34. The method of producing a polyhydroxyalkanoate according to claim 29, wherein said step for reaction is carried out in the presence of a radical initiator.

35. The method of producing a polyhydroxyalkanoate according to claim 34, wherein said radical initiator is one or more compounds selected from 2,2'-azobis(2-methylpropionitrile), 2,2'-azobisisobutyronitrile, 2,2'-azobis(2,4-dimethylvaleronitrile), 2,2'-azobis(4-methoxy-2,4-dimethylvaleronitrile), di-n-propylperoxycarbonate, bis-4-t-butylhexylperoxydicarbonate, bis-2-ethylhexylperoxydicarbonate, benzoyl peroxide, lauroyl peroxide or acetylcyclohexanesulfonyl peroxide.

36. In a charge controlling agent for controlling the charged state of powder, the improvement which comprises the presence in said charge controlling agent of a polyhydroxyalkanoate containing in a molecule thereof one or more of a unit selected from the group consisting of formulae (1), (2) and (4):

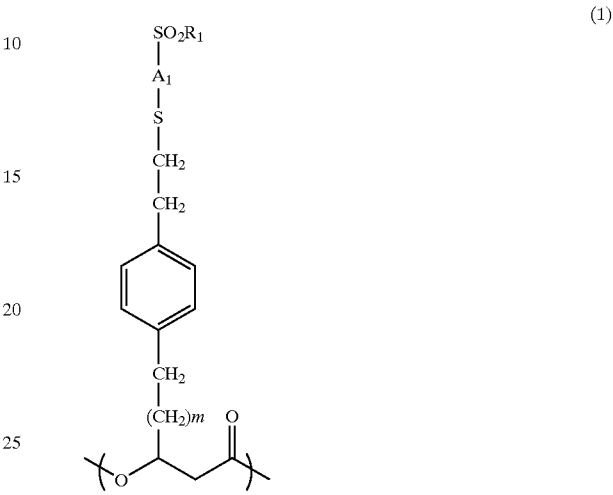

(1)

wherein $R_1$ is selected from the group consisting of OH, a halogen atom, ONa, OK, $OCH_3$ and $OC_2H_5$; $A_1$ represents a substituted or unsubstituted aliphatic hydrocarbon structure; m is an integer selected from 0 to 7; and in the case where there exists a plurality of units, $R_1$, $A_1$ and m represent the above described definements independently for each unit,

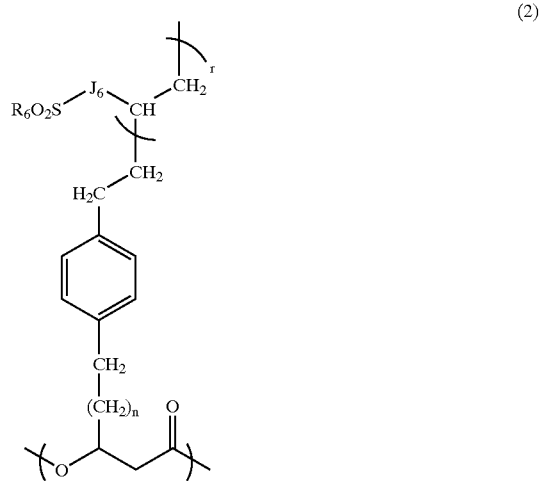

(2)

wherein $R_6$ is selected from the group consisting of OH, a halogen atom, ONa, OK, $OCH_3$ and $OC_2H_5$; $J_6$ represents a substituted or unsubstituted aliphatic hydrocarbon structure; n is an integer selected from 0 to 7; r is an integer selected from 1 to 500; and in the case where there exists a plurality of units, $R_6$, $J_6$, n and r represent the above described definements independently for each unit, and (4)

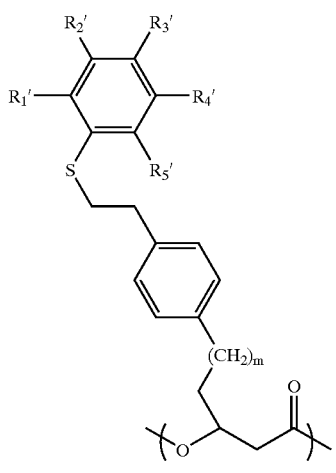

wherein m represents an integer selected from numbers 0 to 7; $R_1'$ to $R_5'$ represent independently a hydrogen atom or a halogen atom; and in the case where there exists a plurality of units, m and $R_1'$ to $R_5'$ represent the above described definements independently for each unit.

37. The charge controlling agent according to claim 36, comprising a polyhydroxyalkanoate in which the unit of said formula (1) is the unit of formula (9):

(9)

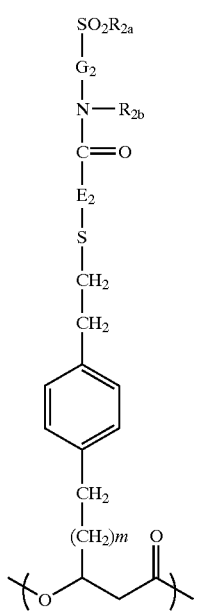

wherein $R_{2a}$ is selected from the group consisting of OH, a halogen atom, ONa, OK, $OCH_3$ and $OC_2H_5$; $R_{2b}$ is H or $CH_3$; $E_2$ and $G_2$ each represent a substituted or unsubstituted aliphatic hydrocarbon structure; m is an integer selected from 0 to 7; and in the case where there exists a plurality of units, $R_{2a}$, $R_{2b}$, $E_2$, $G_2$ and m represent the above described definements independently for each unit.

38. The charge controlling agent polyhydroxyalkanoate according to claim 37, wherein the charge controlling agent contains polyhydroxyalkanoate in which the unit of said formula (9) is a unit of formula (10):

(10)

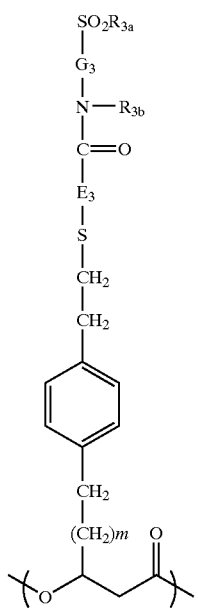

wherein $R_{3a}$ is selected from the group consisting of OH, a halogen atom, ONa, OK, $OCH_3$ and $OC_2H_5$; $R_{3b}$ is H or $CH_3$; $E_3$ and $G_3$ each represent a straight-chain or branched alkylene group having 1 to 8 carbon atoms; m is an integer selected from 0 to 7; and in the case where there exists a plurality of units, $R_{3a}$, $R_{3b}$, $E_3$, $G_3$ and m represent the above described definements independently for each unit.

39. The charge controlling agent according to claim 38, wherein the charge controlling agent contains polyhydroxyalkanoate in which the unit of said formula (10) is a unit of formula (11):

(11)

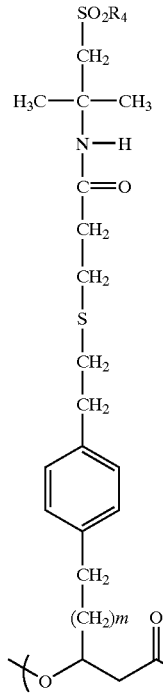

wherein $R_4$ is selected from the group consisting of OH, a halogen atom, ONa, OK, $OCH_3$ and $OC_2H_5$; m is an integer selected from 0 to 7; and in the case where there exists a plurality of units, $R_4$ and m represent the above described definements independently for each unit.

40. The charge controlling agent according to claim 39, wherein the charge controlling agent contains polyhydroxyalkanoate in which the unit of said formula (11) is a unit of formula (12):

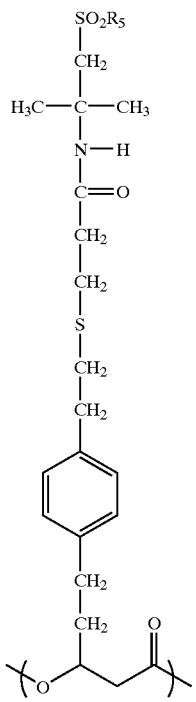

(12)

wherein $R_5$ is selected from the group consisting of OH, a halogen atom, ONa, OK, $OCH_3$ and $OC_2H_5$; and in the case where there exists a plurality of units, $R_5$ represents the above described definement for each unit.

41. The charge controlling agent according to claim 36, wherein the charge controlling agent contains polyhydroxyalkanoate in which the unit of said formula (2) is a unit of formula (13):

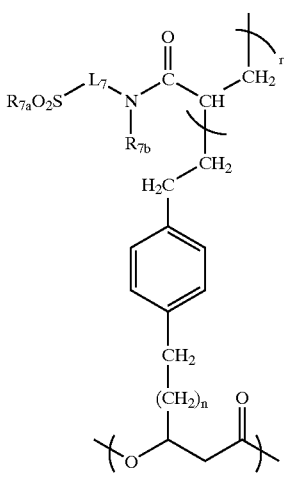

(13)

wherein $R_{7a}$ is selected from the group consisting of OH, a halogen atom, ONa, OK, $OCH_3$ and $OC_2H_5$; $R_{7b}$ is H or $CH_3$; $L_7$ represents a substituted or unsubstituted aliphatic hydrocarbon structure; n is an integer selected from 0 to 7; r is an integer selected from 1 to 500; and in the case where there exists a plurality of units, $R_{7a}$, $R_{7b}$, $L_7$, n and r represent the above described definements independently for each unit.

42. The charge controlling agent according to claim 41, wherein the charge controlling agent contains polyhydroxyalkanoate in which the unit of said formula (13) is a unit of formula (14):

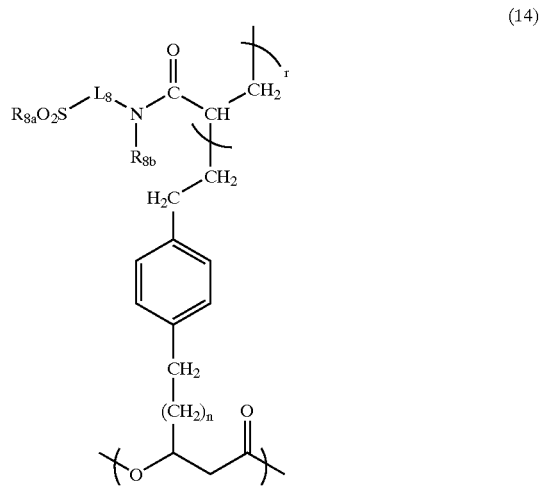

(14)

wherein $R_{8a}$ is selected from the group consisting of OH, a halogen atom, ONa, OK, $OCH_3$ and $OC_2H_5$; $R_{8b}$ is H or $CH_3$; $L_8$ represents a straight-chain or branched alkylene group having 1 to 8 carbon atoms; n is an integer number selected from 0 to 7; r is an integer selected from 1 to 500; and in the case where there exits a plurality of units, $R_{8a}$, $R_{8b}$, $L_8$, n and r represent the above described definements independently for each unit.

43. The charge controlling agent according to claim 42, wherein the charge controlling agent contains polyhydroxyalkanoate in which the unit of said formula (14) is a unit of formula (15):

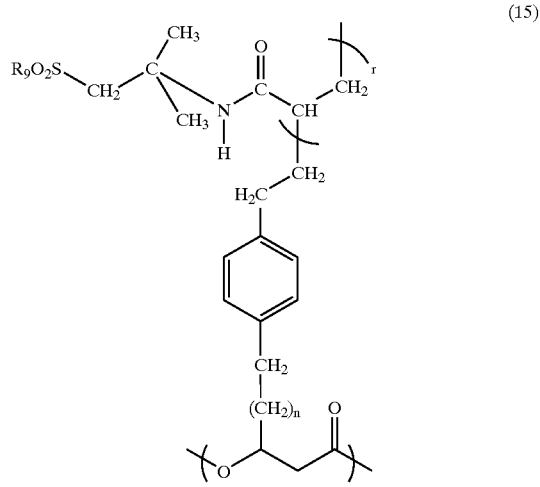

(15)

wherein $R_9$ is selected from the group consisting of OH, a halogen atom, ONa, OK, OCH$_3$ and OC$_2$H$_5$; n is an integer selected from 0 to 7; r is an integer selected from 1 to 500; and in the case where there exists a plurality of units, $R_9$, n and r represent the above described definements independently for each unit.

44. The charge controlling agent according to claim 43, wherein the charge controlling agent contains polyhydroxyalkanoate in which the unit of said formula (15) is a unit of formula (16):

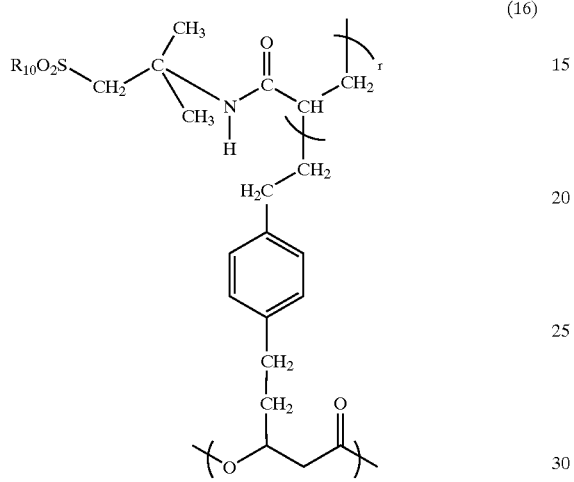

(16)

wherein $R_{10}$ is selected from the group consisting of OH, a halogen atom, ONa, OK, OCH$_3$ and OC$_2$H$_5$; r is an integer selected from 1 to 500; and in the case where there exists a plurality of units, $R_{10}$ and r represent the above described definements independently for each unit.

45. The charge controlling agent according to claim 36, wherein the halogen atom is a fluorine atom in said formula (4).

46. The charge controlling agent according to claim 36, wherein m is 1 in said formula (4).

47. The charge controlling agent according to claim 36, wherein $R_1'$ to $R_5'$ are fluorine atoms in said formula (4).

48. The charge controlling agent according to claim 36, wherein $R_1'$, $R_2'$, $R_4'$ and $R_5'$ are hydrogen atoms, and $R_3'$ is a fluorine atom in said formula (4).

49. The charge controlling agent according to claim 36, wherein the charge controlling agent contains polyhydroxyalkanoate containing, in addition to the unit selected from the group consisting of formulae (1), (2) and (4), at least any one of a 3-hydroxy-ω-substituted alkanoic acid unit of formula (17):

(17)

wherein k is an integer selected from 1 to 8; $R_{11}$ contains a residual having any ring structure of a phenyl structure or a thienyl structure; and in the case where there exists a plurality of units, k and $R_{11}$ represent the above described definements independently for each unit, and a 3-hydroxy-ω-cyclohexylalkanoic acid unit of formula (18):

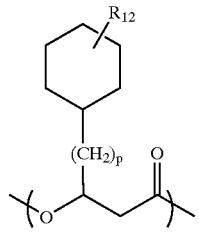

(18)

wherein $R_{12}$ is a substituent group in the cyclohexyl group and $R_{12}$ is selected from the group consisting of H, CN, NO$_2$, a halogen atom, CH$_3$, C$_2$H$_5$, C$_3$H$_7$, CF$_3$, C$_2$F$_5$ and C$_3$F$_1$; p is an integer selected from 0 to 8; and in the case where there exists a plurality of units, $R_{12}$ and p represent the above described definements independently for each unit.

50. The charge controlling agent according to claim 49, wherein $R_{11}$ in formula (17) is selected from the group consisting of the group of the following formulae (19), (20), (21), (22), (23), (24), (25), (26), (27), (28) and (29), and in the case where there exit a plurality of units, $R_6$ represents the above described formula independently for each unit, and a group of unsubstituted or substituted phenyl groups each expressed by

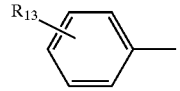

(19)

wherein $R_{13}$ represents a substituent group in the aromatic ring, $R_{13}$ is selected from the group consisting of H, a halogen atom, CN, NO$_2$, CH$_3$, C$_2$H$_5$, C$_3$H$_7$, CH=CH$_2$, COOR$_{13a}$ ($R_{13a}$ represents any one of H, Na and K), CF$_3$, C$_2$F$_5$ and C$_3$F$_7$, and in the case where there exist a plurality of units, $R_{13}$ represents the above described constituent independently for each unit;

a group of unsubstituted or substituted phenoxy groups each expressed by

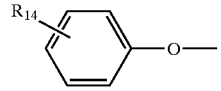

(20)

wherein $R_{14}$ represents a substituent group in the aromatic ring, $R_{14}$ is selected from the group consisting of H, a halogen atom, CN, NO$_2$, CH$_3$, C$_2$H$_5$, C$_3$H$_7$, SCH$_3$, CF$_3$, C$_2$F$_5$ and C$_3$F$_7$, and in the case where there exist a plurality of units, $R_{14}$ represents the above described constituent independently for each unit;

a group of unsubstituted or substituted benzoyl groups each expressed by

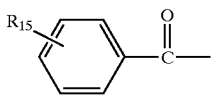

(21)

wherein $R_{15}$ represents a substituent group in the aromatic ring, $R_{15}$ is selected from the group consisting of H m, a halogen atom, CN, $NO_2$, $CH_3$, $C_2H_5$, $C_3H_7$, $CF_3$, $C_2F_5$ and $C_3F_7$, and in the case where there exist a plurality of units, $R_{15}$ represents the above described constituent independently for each unit;

a group of unsubstituted or substituted phenylsulfanyl groups each expressed by

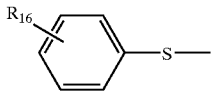

(22)

wherein $R_{16}$ represents a substituent group in the aromatic ring, $R_{16a}$ is selected from the group consisting of H, a halogen atom, CN, $NO_2$, $COOR_{16a}$, $SO_2R_{16b}$ ($R_{16a}$ represents any one of H, Na, K, $CH_3$ and $C_2H_5$, and $R_{16b}$ represents any one of OH, ONa, OK, a halogen atom, $OCH_3$ and $OC_2H_5$), $CH_3$, $C_2H_5$, $C_3H_7$, $(CH_3)_2$—CH and $(CH_3)_3$—C, and in the case where there exist a plurality of units, $R_{16}$ represents the above described constituent independently for each unit;

a group of unsubstituted or substituted (phenylmethyl) sulfanyl groups each expressed by

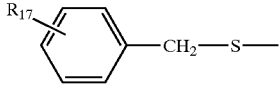

(23)

wherein $R_{17}$ represents a substituent group in the aromatic ring, $R_{17}$ is selected from the group consisting of H, a halogen atom, CN, $NO_2$, $COOR_{17a}$, $SO_2R_{17b}$ ($R_{17a}$ represents any one of H, Na, K, $CH_3$ and $C_2H_5$, and $R_{17b}$ represents any one of OH, ONa, OK, a halogen atom, $OCH_3$ and $OC_2H_5$), $CH_3$, $C_2H_5$, $C_3H_7$, $(CH_3)_2$—CH and $(CH_3)_3$—C, and in the case where there exist a plurality of units, $R_{17}$ represents the above described constituent independently for each unit;

2-thienyl group expressed by

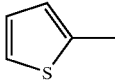

(24)

2-thienylsulfanyl group expressed by

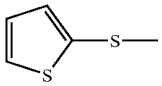

(25)

2-thienylcarbonyl group expressed by

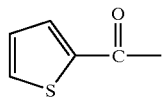

(26)

a group of unsubstituted or substituted phenylsulfinyl groups each expressed by

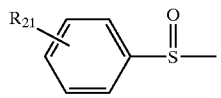

(27)

wherein $R_{21}$ represents a substituent group in the aromatic ring, $R_{21}$ is selected from the group consisting of H, a halogen atom, CN, $NO_2$, $COOR_{21a}$, $SO_2R_{21b}$ ($R_{21a}$ represents any one of H, Na, K, $CH_3$ and $C_2H_5$, and $R_{21b}$ represents any one of OH, ONa, OK, a halogen atom, $OCH_3$ and $OC_2H_5$), $CH_3$, $C_2H_5$, $C_3H_7$, $(CH_3)_2$—CH and $(CH_3)_3$—C, and in the case where there exist a plurality of units, $R_{13}$ a represents the above described constituent independently for each unit);

a group of unsubstituted or substituted phenylsulfonyl groups each expressed by

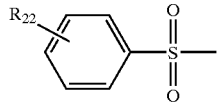

(28)

wherein $R_{22}$ represents a substituent group in the aromatic ring, $R_{22}$ is selected from the group consisting of H, a halogen atom, CN, $NO_2$, $COOR_{22a}$, $SO_2R_{22b}$ ($R_{22a}$ represents any one of H, Na, K, $CH_3$ and $C_2H_5$, and $R_{22b}$ represents any one of OH, ONa, OK, a halogen atom, $OCH_3$ and $OC_2H_5$), $CH_3$, $C_2H_5$, $C_3H_7$, $(CH_3)_2$—CH and $(CH_3)_3$—C, and in the case where there exist a plurality of units, $R_{14}$ a represents the above described constituent independently for each unit; and a group of (phenylmethyl)oxy groups each expressed by

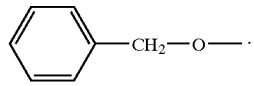

(29)

51. The charge controlling agent according to claim 36, wherein said powder is an electrostatic latent image developing toner.

52. The charge controlling agent according to claim 36, wherein the number average molecular weight of said polyhydroxyalkanoate is in the range of from 1000 to 500000.

53. A toner binder for use in an electrostatic latent image developing toner, the toner binder containing the charge controlling agent according to claim 36.

54. An electrostatic latent image developing toner containing at least a binder resin, a coloring agent and the charge controlling agent according to claim 36.

55. An image formation method comprising at least a step of applying a voltage to an electrification member from the outside to electrify an electrostatic latent image carrier, a step of forming an electrostatic latent image on the electrified electrostatic latent image carrier, a development step of developing the electrostatic latent image by an electrostatic latent image developing toner to form a toner image on the electrostatic latent image carrier, a transfer step of transferring the toner image on the electrostatic latent image carrier to a record material, and a fixation step of fixing the toner image on the record material by heat, wherein an electrostatic latent image developing toner containing at least a binder resin, a coloring agent and the charge controlling agent according to claim 36 is used.

56. The image formation method according to claim 55, wherein said transfer step comprises at least a first transfer step of transferring the toner image on the electrostatic latent image carrier to an intermediate transfer body and a second transfer step of transferring the toner image on the intermediate transfer body to the record material.

57. An image forming apparatus comprising a means for applying a voltage to an electrification member from the outside to electrify an electrostatic latent image carrier, a means for forming an electrostatic latent image on the electrified electrostatic latent image carrier, a development means for developing the electrostatic latent image by an electrostatic latent image developing toner to form a toner image on the electrostatic latent image carrier, a transfer means for transferring the toner image on the electrostatic latent image carrier to a record material, and fixation means fixing the toner image on the record material by heat, wherein an electrostatic latent image developing toner containing a binder resin, a coloring agent and the charge controlling agent according to claim 36 is used.

58. The image forming apparatus according to claim 57, wherein said transfer means comprises a first transfer means for transferring the toner image on the electrostatic latent image carrier to an intermediate transfer body and a second transfer means for transferring the toner image on the intermediate transfer body to the record material.

59. A method of controlling the charge of powder, comprising a step of making the powder contain a polyhydroxyalkanoate containing in a molecule thereof one or more of a unit selected from a group consisting of formulae (1), (2) and (4):

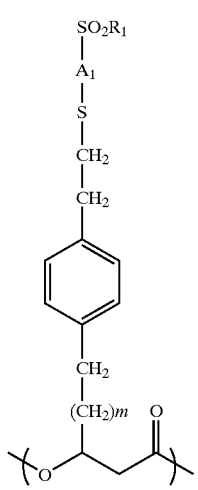

(1)

wherein $R_1$ is selected from the group consisting of OH, a halogen atom, ONa, OK, $OCH_3$ and $OC_2H_5$; $A_1$ represents a substituted or unsubstituted aliphatic hydrocarbon structure; m is an integer selected from 0 to 7; and in the case where there exists a plurality of units, $R_1$, $A_1$ and m represent the above described definements independently for each unit,

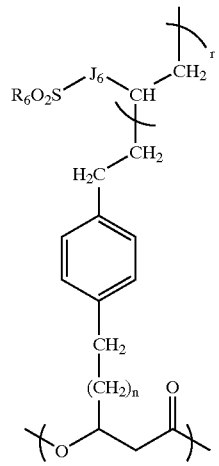

(2)

wherein $R_6$ is selected from the group consisting of OH, a halogen atom, ONa, OK, $OCH_3$ and $OC_2H_5$; $J_6$ represents a substituted or unsubstituted aliphatic hydrocarbon structure; n is an integer selected from 0 to 7; r is an integer selected from 1 to 500; and in the case where there exists a plurality of units, $R_6$, $J_6$, n and r represent the above described definements independently for each unit, and

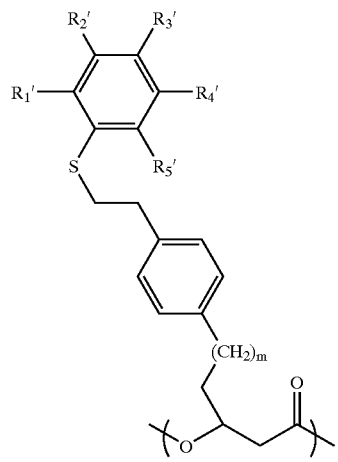

(4)

wherein m represents an integer selected from numbers 0 to 7; $R_1'$ to $R_5'$ represent independently a hydrogen atom or a halogen atom; and in the case where there exists a plurality of units, m and $R_1'$ to $R_5'$ represent the above described definements independently for each unit.

60. The method according to claim 59, wherein the powder contains a binder resin and a coloring agent, and said polyhydroxyalkanoate is internally added to the powder containing the binder resin and the coloring agent.

61. The method according to claim 59, wherein the powder contains a binder resin and a coloring agent, and said polyhydroxyalkanoate is fixed on the surface of the powder containing the binder resin and the coloring agent.

* * * * *

UNITED STATES PATENT AND TRADEMARK OFFICE
CERTIFICATE OF CORRECTION

PATENT NO. : 6,911,520 B2
APPLICATION NO. : 10/373851
DATED : June 28, 2005
INVENTOR(S) : Tatsuki Fukui et al.

It is certified that error appears in the above-identified patent and that said Letters Patent is hereby corrected as shown below:

On the Title Page Item (56) OTHER PUBLICATIONS

After "Ramsay": "Effect" should read --"Effect--;

After "Kim" (second occurrence): "Bioengineering" should read --"Bioengineering--; and "nas resinovorans;" (in conjunction with correction listed in the Letter Calling Attention to Errors in Patent) should read --*nas resinovorans*";--; and After "Constantin": "No. 2, 1999." should read --No. 2, 1999 (1999-02).--.

SHEET 11

FIG. 11, "— 67.498" should read --— 67.496--.

COLUMN 4

Line 9, --Pseudomonas oleovorans-- should be italicized.

COLUMN 19

Line 9, "R21" should read --$R_{21}$--; and

Line 22, " 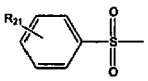 " should read -- 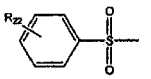 --.

COLUMN 43

Line 55, --Pseudomonas cichorii-- should be italicized.

COLUMN 50

Line 11, "higher" should read --higher)--.

COLUMN 84

Line 64, "and $R_{11}$," should read --$R_{11}$--.

COLUMN 85

Line 67, "$C_3F_5$" should read --$C_2F_5$--.

UNITED STATES PATENT AND TRADEMARK OFFICE
CERTIFICATE OF CORRECTION

PATENT NO. : 6,911,520 B2
APPLICATION NO. : 10/373851
DATED : June 28, 2005
INVENTOR(S) : Tatsuki Fukui et al.

It is certified that error appears in the above-identified patent and that said Letters Patent is hereby corrected as shown below:

COLUMN 86

Line 15, "$SO_2R_{16a}$" should read --$SO_2R_{16b}$--; and
Line 17, "group" should read --one--.

COLUMN 89

Lines 32-66, "exists a plurality of units, $R_{2a}$,

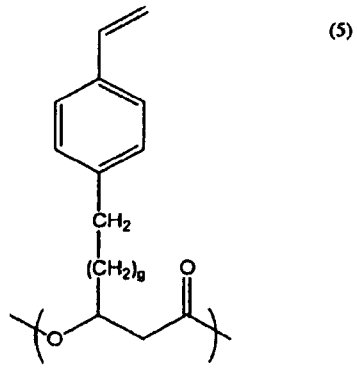

wherein q is an is an integer selected from 0 to 7; and in the case where there exists a plurality of units, q represents the above described number independently for each unit;

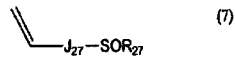

wherein $R_{27}$ is selected from the group consisting of OH, a halogen atom, ONa, OK, $OCH_3$ and $OC_2H_5$; $J_{27}$ represents a substituted or unsubstituted aliphatic hydrocarbon structure; and in the case where there exist a plurality of compounds, $R_{27}$ and $J_{27}$ represent the above described definements independently for each compound; and
$R_{2b}$, $E_2$, $G_2$ and m represent the above described definements independently for each unit."

should read

--exists a plurality of units, $R_{2a}$, $R_{ab}$, $E_2$, $G_2$ and m represent the above described definements independently for each unit.--

UNITED STATES PATENT AND TRADEMARK OFFICE
CERTIFICATE OF CORRECTION

PATENT NO. : 6,911,520 B2
APPLICATION NO. : 10/373851
DATED : June 28, 2005
INVENTOR(S) : Tatsuki Fukui et al.

It is certified that error appears in the above-identified patent and that said Letters Patent is hereby corrected as shown below:

COLUMN 90

Line 16-41, "(5), (7) and (2) are:"

should read

--(5), (7) and (2) are:

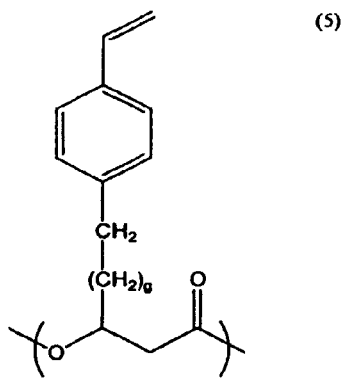

wherein q is an is an integer selected from 0 to 7; and in the case where there exists a plurality of units, q represents the above described number dependently for each unit;

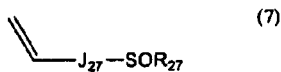

wherein $R_{27}$ is selected from the group consisting of OH, a halogen atom, ONa, OK, $OCH_3$ and $OC_2H_5$; $J_{27}$ represents a substituted or unsubstituted aliphatic hydrocarbon structure; and in the case where there exists a plurality of compounds, $R_{27}$ and $J_{27}$ represent the above described definements independently for each compound; and--.

COLUMN 93

Line 52, "$R_4$" should read --$R_4'$--.

UNITED STATES PATENT AND TRADEMARK OFFICE
CERTIFICATE OF CORRECTION

PATENT NO. : 6,911,520 B2
APPLICATION NO. : 10/373851
DATED : June 28, 2005
INVENTOR(S) : Tatsuki Fukui et al.

It is certified that error appears in the above-identified patent and that said Letters Patent is hereby corrected as shown below:

COLUMN 98

Line 38, "exits" should read --exists--.

COLUMN 100

Line 20, "$C_3F_1$;" should read --$C_3F_7$;--.

Signed and Sealed this

Twenty-fifth Day of March, 2008

JON W. DUDAS
*Director of the United States Patent and Trademark Office*